(12) United States Patent
Oh

(10) Patent No.: US 12,400,369 B2
(45) Date of Patent: Aug. 26, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Hyunmook Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 652 days.

(21) Appl. No.: 17/727,358

(22) Filed: Apr. 22, 2022

(65) Prior Publication Data

US 2022/0351421 A1    Nov. 3, 2022

(30) Foreign Application Priority Data

Apr. 22, 2021  (KR) .................. 10-2021-0052422
Apr. 23, 2021  (KR) .................. 10-2021-0053237

(51) Int. Cl.
*G06T 9/00*      (2006.01)
*G06T 9/40*      (2006.01)

(52) U.S. Cl.
CPC ............... *G06T 9/001* (2013.01); *G06T 9/40* (2013.01)

(58) Field of Classification Search
None
See application file for complete search history.

(56) References Cited

U.S. PATENT DOCUMENTS

| | | | | |
|---|---|---|---|---|
| 11,017,591 B2 * | 5/2021 | Oh | ............................ | G06T 7/60 |
| 11,151,742 B2 * | 10/2021 | Oh | ....................... | H04N 19/597 |
| 11,170,556 B2 * | 11/2021 | Oh | .......................... | G06T 15/04 |
| 11,282,239 B2 * | 3/2022 | Han | ....................... | H04N 19/64 |
| 11,341,687 B2 * | 5/2022 | Oh | .......................... | G06T 9/001 |
| 11,394,979 B2 * | 7/2022 | Oh | .................... | H04N 21/440245 |
| 11,395,004 B2 * | 7/2022 | Hur | ....................... | H04N 19/597 |
| 11,483,363 B2 * | 10/2022 | Hur | ........................ | G06T 9/004 |
| 11,544,877 B2 * | 1/2023 | Oh | ..................... | H04N 21/2362 |
| 11,601,488 B2 * | 3/2023 | Hur | ......................... | H04L 65/70 |
| 11,606,547 B2 * | 3/2023 | Oh | .......................... | G06T 9/001 |
| 11,765,387 B2 * | 9/2023 | Oh | ......................... | H04N 19/96 |
| | | | | 375/240.12 |
| 11,803,986 B2 * | 10/2023 | Hur | .......................... | G06T 9/40 |
| 11,818,190 B2 * | 11/2023 | Oh | .......................... | G06T 9/001 |
| 11,895,341 B2 * | 2/2024 | Oh | ....................... | H04N 19/119 |
| 11,902,348 B2 * | 2/2024 | Hur | ........................ | H04L 67/06 |
| 11,908,168 B2 * | 2/2024 | Lee | ............................ | G06T 9/00 |

(Continued)

FOREIGN PATENT DOCUMENTS

| KR | 20200007735 | 1/2020 |
|---|---|---|
| KR | 20200111410 | 9/2020 |

OTHER PUBLICATIONS

International Search Report and Written Opinion in International Appln. No. PCT/KR2022/005061, dated Jul. 26, 2022, 10 pages.

(Continued)

*Primary Examiner* — Lindsay J Uhl

(74) *Attorney, Agent, or Firm* — Fish & Richardson P.C.

(57) ABSTRACT

Disclosed herein is a method for transmitting point cloud data, including encoding point cloud data, and transmitting a bitstream including the point cloud data. Disclosed herein is a method for receiving point cloud data, including receiving a bitstream including point cloud data, and decoding the point cloud data.

13 Claims, 63 Drawing Sheets

(56) References Cited

U.S. PATENT DOCUMENTS

| | | | |
|---|---|---|---|
| 11,968,393 B2* | 4/2024 | Oh | H04N 21/434 |
| 12,021,910 B2* | 6/2024 | Lee | H04L 65/762 |
| 12,058,370 B2* | 8/2024 | Park | H04N 19/70 |
| 12,149,579 B2* | 11/2024 | Oh | H04L 65/762 |
| 12,149,751 B2* | 11/2024 | Hur | H04N 19/96 |
| 2020/0043182 A1 | 2/2020 | Janus et al. | |
| 2021/0105488 A1 | 4/2021 | Lancia | |
| 2021/0407148 A1* | 12/2021 | Flynn | H04N 19/1883 |
| 2022/0312035 A1* | 9/2022 | Takahashi | H04N 21/816 |
| 2023/0237705 A1* | 7/2023 | Wan | G06T 9/40 |
| | | | 382/232 |

OTHER PUBLICATIONS

WG 7 & MPEG 3D Graphics Coding, "G-PCC codec description," ISO/IEC JTC 1/SC 29/WG 7 N0011, International Organization for Standardization, 148 pages.

* cited by examiner

FIG. 6
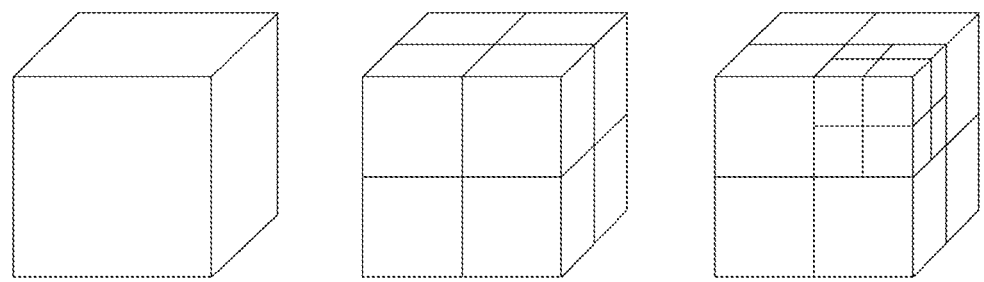
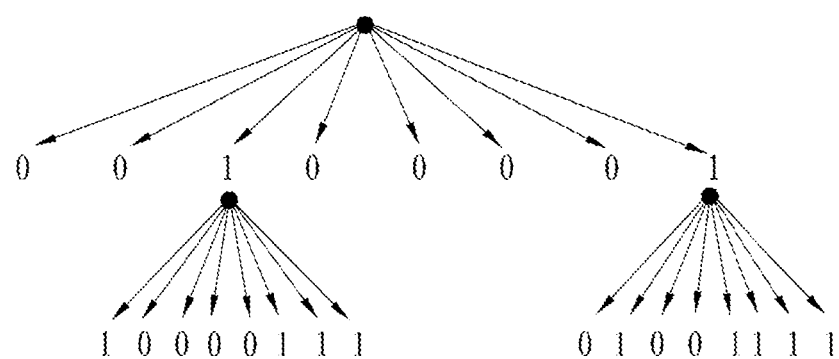

FIG. 7
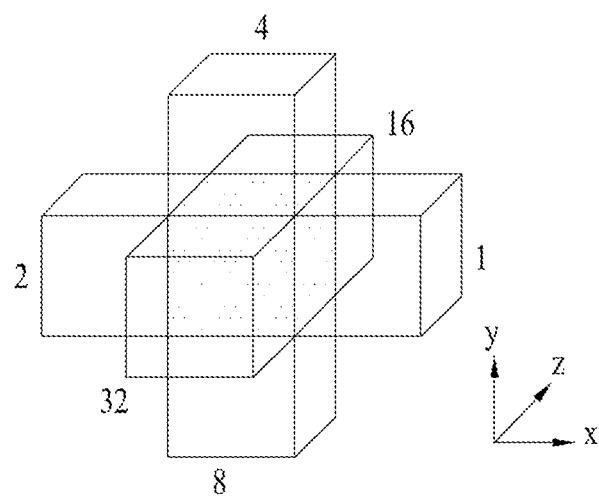
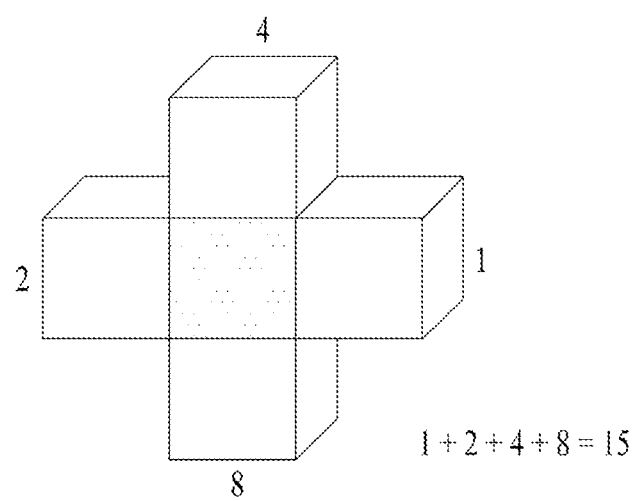

FIG. 19
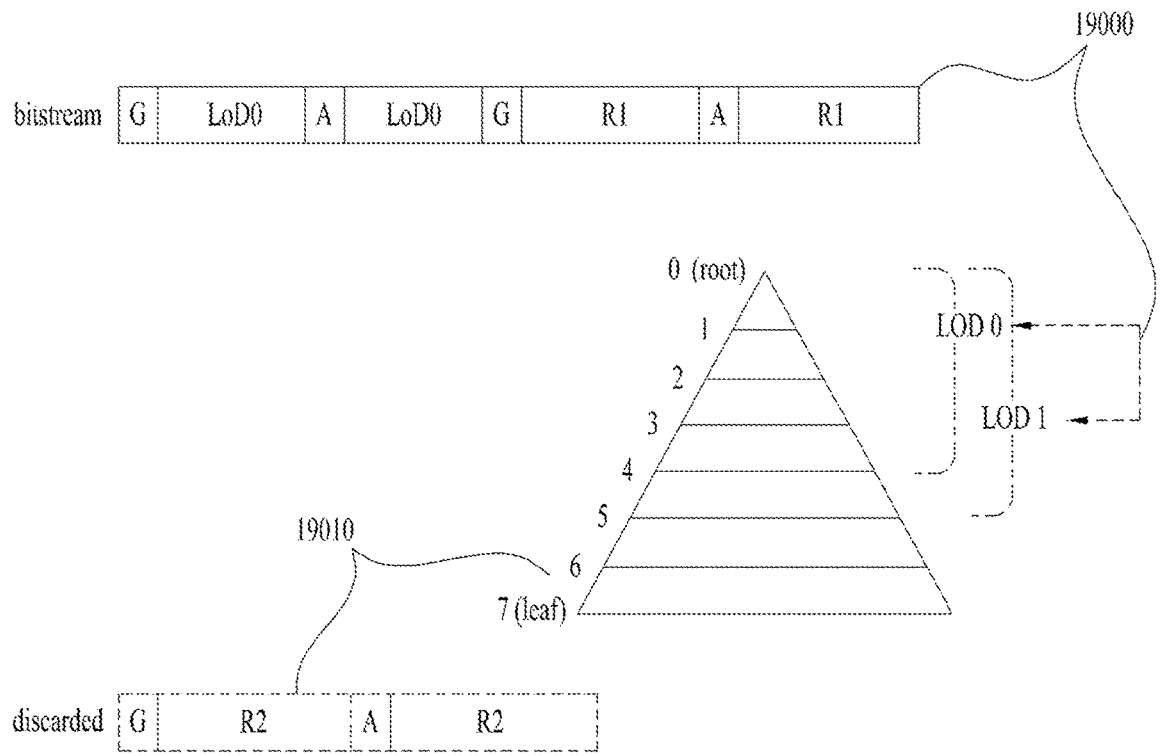
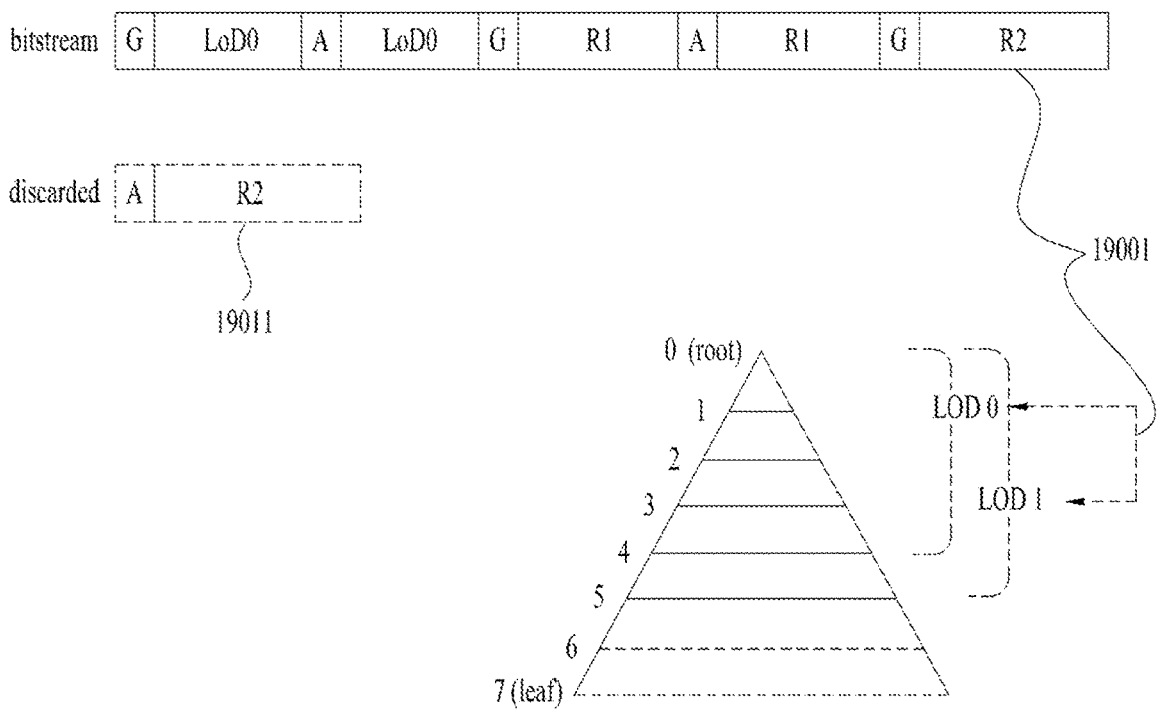

FIG. 22

| seq_parameter_set( ) { | Descriptor |
|---|---|
| ...... | |
| scalable_transmission_enable_flag | u(1) |
| ...... | |
| } | |

| geometry_parameter_set( ) { | Descriptor |
|---|---|
| ...... | |
| if(scalable_transmission_enable_flag) { | |
|   geom_scalable_transmission_enable_flag | u(1) |
|   if( geom_scalable_transmission_enable_flag ) { | |
|     num_scalable_layers | ue(v) |
|     for(i=0; i<num_scalable_layers; i++) { | |
|       scalable_layer_id[i] | u(8) |
|       if(geom_tree_type == 0 ) // octree | |
|         num_octree_layers_in_scalable_layer[i] | u(8) |
|         tree_depth_start[i] | u(8) |
|         tree_depth_end[i] | u(8) |
|         node_size[i] | u(8) |
|         num_nodes[i] | u(8) |
|       } | |
|       num_slices_in_scalable_layer[i] | u(8) |
|       for( j=0; j<num_slices_in_scalable_layers; j++) | |
|         slice_id[i][j] | u(8) |
|       } | |
|     } | |
|   } | |
| ...... | |
| } | |

FIG. 23

| attribute_parameter_set( ) { | Descriptor |
|---|---|
| ...... | |
| if(scalable_transmission_enable_flag ) { | |
|   attr_scalable_transmission_enable_flag | u(1) |
|   if( attr_scalable_transmission_enable_flag ) { | |
|     aligned_slice_structure_enabled_flag | u(1) |
|     if( aligned_slice_structure_enabled_flag ) { | |
|       num_scalable_layers | ue(v) |
|       for(i=0; i<num_scalable_layers; i++) | |
|         num_slices_in_scalable_layer[i] | u(8) |
|         for( j=0; j<num_slices_in_scalable_layers; j++) | |
|           slice_id_offsets[i][j] | u(8) |
|     } | |
|     else { | |
|       num_scalable_layers | ue(v) |
|       for(i=0; i<num_scalable_layers; i++) { | |
|         scalable_layer_id[i] | u(8) |
|         corresponding_geom_scalable_layer[i] | u(8) |
|         num_octree_layers_in_scalable_layer[i] | u(8) |
|         tree_depth_start[i] | u(8) |
|         tree_depth_end[i] | u(8) |
|         node_size[i] | u(8) |
|         num_nodes[i] | u(8) |
|         num_slices_in_scalable_layer[i] | u(8) |
|         for( j=0; j<num_slices_in_scalable_layers; j++) | |
|           slice_id[i][j] | u(8) |
|       } | |
|     } | |
|   } | |
| } | |
| ...... | |
| } | |

FIG. 24

| geometry_data_unit_header( ) { | Descriptor |
|---|---|
| ...... | |
| slice_id | u(8) |
| if( geom_scalable_transmission_enable_flag ) { | |
| scalable_layer_id | u(8) |
| num_tree_depth_in_data_unit | u(8) |
| for(i=0; i<num_tree_depth_in_data_unit; i++) { | |
| tree_depth[i] | u(8) |
| num_nodes[i] | u(8) |
| } | |
| } | |
| ref_slice_id | u(8) |
| ...... | |
| } | |

FIG. 25

| attribute_data_unit_header( ) { | Descriptor |
|---|---|
| ...... | |
| slice_id | u(8) |
| if( attr_scalable_transmission_enable_flag ) { | |
| if (aligned_slice_structure_enabled_flag ) | |
| aligned_geom_data_unit_id | u(8) |
| else { | |
| scalable_layer_id | u(8) |
| num_tree_depth_in_data_unit | u(8) |
| for(i=0; i<num_tree_depth_in_data_unit; i++) { | |
| tree_depth[i] | u(8) |
| num_nodes[i] | u(8) |
| } | |
| } | |
| } | |
| ref_slice_id | u(8) |
| ...... | |
| } | |

FIG. 29

| geometry_parameter_set( ) { | Descriptor |
|---|---|
| ...... | |
| num_layer_groups_minus1 | u(8) |
| for(i=0; i<=num_layer_groups_minus1; i++) { | |
| layer_group_id[i] | u(8) |
| num_tree_depth[i] | u(8) |
| num_subgroups[i] | u(8) |
| } | |
| ...... | |
| } | |

| attribute_parameter_set( ) { | Descriptor |
|---|---|
| ...... | |
| aligned_layer_group_structure_flag | u(1) |
| if( aligned_layer_group_structure_flag ) | |
| geom_parameter_set_id | |
| else { | |
| num_groups_minus1 | u(8) |
| for(i=0; i<=num_groups_minus1; i++) { | |
| layer_group_id[i] | u(8) |
| num_tree_depth_minus1[i] | u(8) |
| num_subgroups_minus1[i] | u(8) |
| } | |
| } | |
| ...... | |
| } | |

FIG. 30

| geometry_data_unit_header( ) { | Descriptor |
|---|---|
| ...... | |
|     layer_group_id | u(8) |
|     subgroup_id | u(8) |
| ...... | |
| } | |

| attribute_data_unit_header( ) { | Descriptor |
|---|---|
| ...... | |
|     layer_group_id | u(8) |
|     subgroup_id | u(8) |
| ...... | |
| } | |

FIG. 37

| seq_parameter_set( ) { | Descriptor |
|---|---|
| ...... | |
|    scalable_transmission_enable_flag | u(1) |
| ...... | |
| } | |

| geometry_parameter_set( ) { | Descriptor |
|---|---|
| ...... | |
|   if(scalable_transmission_enable_flag ) { | |
|     geom_scalable_transmission_enable_flag | u(1) |
|     if( geom_scalable_transmission_enable_flag ) { | |
|       num_scalable_layers | ue(v) |
|       for(i=0; i<num_scalable_layers; i++) { | |
|         scalable_layer_id[i] | u(8) |
|         if(geom_tree_type == 0 ) // octree | |
|           num_octree_layers_in_scalable_layer[i] | u(8) |
|           tree_depth_start[i] | u(8) |
|           tree_depth_end[i] | u(8) |
|           node_size[i] | u(8) |
|           num_nodes[i] | u(8) |
|         } | |
|         num_slices_in_scalable_layer[i] | u(8) |
|         for( j=0; j<num_slices_in_scalable_layers; j++) | |
|           sub_group_id[i][j] | u(8) |
|           num_nodes_in_subgroup[i][j] | u(8) |
|           bitstream_type[i][j] | u(8) |
|           slice_id[i][j] | u(8) |
|         } | |
|       } | |
|     } | |
|   ...... | |
| } | |

FIG. 38

| geometry_data_unit_header( ) { | Descriptor |
|---|---|
| ...... | |
|   slice_id | u(8) |
|   bitstream_type | |
|   if( geom_scalable_transmission_enable_flag ) { | |
|     scalable_layer_id | u(8) |
|     if(num_slices_in_scalable_layer[scalable_layer_id]) | |
|       sub_group_id | u(8) |
|     num_tree_depth_in_data_unit | u(8) |
|     for(i=0; i<num_tree_depth_in_data_unit; i++) { | |
|       tree_depth[i] | u(8) |
|       num_nodes[i] | u(8) |
|       num_nodes_in_subgroup[i][sub_group_id] | u(8) |
|     } | |
|     bitstream_type | u(2) |
|     if( bitstream_type == 2 ) { | |
|       dc_bitstream_offset | u(8) |
|       dc_bitstream_length | u(8) |
|       dc_backward_enabled_flag | u(1) |
|     } | |
|   } | |
|   ref_slice_id | u(8) |
|   ...... | |
| } | |

FIG. 42

| number of skipped layer-groups | 0 | 1 | 2 | 3 |
|---|---|---|---|---|
| number of tree depth | 10 | 9 | 8 | 7 |
| number of output points | 100993 | 245513 | 60003 | 14614 |
| bitstream size | 97474 B | 26399 B | 7486 B | 2197 B |
| encoding time (encode full depth + slice selection) | 0.562 s | 0.64 s | 0.625 s | 0.625 s |
| decoding time | 0.359 s | 0.109 s | 0.062 s | 0.015 s | lossy geometry, lossy attributes [all intra]

| C2_ai | End-to-End BD-AttrRate [%] | | | | Avg. Dec Time [%] | |
|---|---|---|---|---|---|---|
| | Luma | Chroma Cb | Chroma Cr | Reflectance | D1 | D2 |
| Cat1-A average | #DIV/0! | #DIV/0! | #DIV/0! | | 0.5% | 0.5% |
| Cat1-B average | #DIV/0! | #DIV/0! | #DIV/0! | | 0.2% | 0.2% |
| Cat3-fused average | #DIV/0! | #DIV/0! | #DIV/0! | | 0.0% | 0.0% |
| Cat3-frame average | #DIV/0! | #DIV/0! | #DIV/0! | #DIV/0! | 0.7% | 0.7% |
| Overall average | #DIV/0! | #DIV/0! | #DIV/0! | #DIV/0! | 0.4% | 0.4% |
| Avg. Enc Time [%] | #NUM! | | | | | |
| Avg. Dec Time [%] | #NUM! | | | | | | lossy geometry, lossy attributes [all intra]

| CW_ai | bpip ratio [%] | | | |
|---|---|---|---|---|
| | Geometry | Colour | Reflectance | Total |
| Cat1-A average | 100.0% | #DIV/0! | | 100.0% |
| Cat1-B average | 100.0% | #DIV/0! | | 100.0% |
| Cat3-fused average | 100.0% | #DIV/0! | #DIV/0! | 100.0% |
| Cat3-frame average | 100.2% | | #DIV/0! | 100.3% |
| Overall average | 100.0% | | | 100.1% |
| Avg. Enc Time [%] | #NUM! | | | |
| Avg. Dec Time [%] | #NUM! | | | |

| | {1,2,4,8} full slices | {1,2,4,8} ROI | {1,8,8,8} ROI | {1,1,8,8} ROI |
|---|---|---|---|---|
| number of subgroups in each layer-group | 10 | 10 | 10 | 10 |
| number of tree depth | 100993 | 306094 | 306094 | 306094 |
| number of output points | 100726 B | 38945 B | 35745 B | 51066 B |
| bitstream size | 15 | 4 | 4 | 4 |
| number of decoded slices | 0.703s | 0.687 s | 0.765 s | 0.703s |
| encoding time (encode full depth + selection) | 0.515 s | 0.14 s | 0.171 s | 0.203 s |
| decoding time | | | | |

FIG. 44

| C2_ai | lossy geometry, lossy attributes [all intra] | | | | | |
|---|---|---|---|---|---|---|
| | End-to-End BD-AttrRate [%] | | | | Geom. BD-TotGeomRate [%] | |
| | Luma | Chroma Cb | Chroma Cr | Refletance | D1 | D2 |
| Cat1-A average | #DIV/0! | #DIV/0! | #DIV/0! | | 6.8% | 6.9% |
| Cat1-B average | #DIV/0! | #DIV/0! | #DIV/0! | | 1.7% | 1.7% |
| Cat3-fused average | #DIV/0! | #DIV/0! | #DIV/0! | #DIV/0! | 0.3% | 0.3% |
| Cat3-frame average | | | | #DIV/0! | 3.5% | 3.4% |
| Overall average | #DIV/0! | #DIV/0! | #DIV/0! | #DIV/0! | 3.9% | 3.9% |
| Avg. Enc Time [%] | 16% | | | | | |
| Avg. Dec Time [%] | 35% | | | | | |

| CW_ai | lossy geometry, lossless attributes [all intra] bpip ratio [%] | | | |
|---|---|---|---|---|
| | Geometry | Colour | Refletance | Total |
| Cat1-A average | 100.8% | #DIV/0! | | 100.8% |
| Cat1-B average | 100.1% | #DIV/0! | | 100.1% |
| Cat3-fused average | 100.0% | #DIV/0! | #DIV/0! | 100.0% |
| Cat3-frame average | 100.8% | | #DIV/0! | 101.0% |
| Overall average | 100.2% | #DIV/0! | #DIV/0! | 100.3% |
| Avg. Enc Time [%] | 38% | | | |
| Avg. Dec Time [%] | 24% | | | |

- Input : Egyptian mask vox12.ply
  - Bounding box size : 4096×4096×4096
- Encoding option : disableAttributeCoding=1(IDCM on, Planar on, N6 on (boundary=8))
  - Num Layer-groups=5
  - Num sub-groups={1, 1, 4, 8, 8} :Configuring the box to be equally divided along the x-axis, y-axis, and z-axis directions

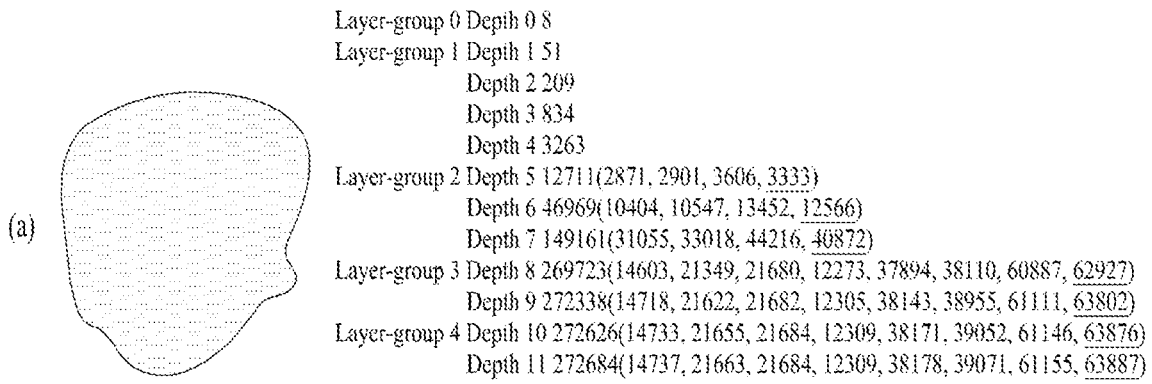

Layer-group 0 Depth 0 8
Layer-group 1 Depth 1 51
                Depth 2 209
                Depth 3 834
                Depth 4 3263
Layer-group 2 Depth 5 12711(2871, 2901, 3606, 3333)
                Depth 6 46969(10404, 10547, 13452, 12566)
                Depth 7 149161(31055, 33018, 44216, 40872)
Layer-group 3 Depth 8 269723(14603, 21349, 21680, 12273, 37894, 38110, 60887, 62927)
                Depth 9 272338(14718, 21622, 21682, 12305, 38143, 38955, 61111, 63802)
Layer-group 4 Depth 10 272626(14733, 21655, 21684, 12309, 38171, 39052, 61146, 63876)
                Depth 11 272684(14737, 21663, 21684, 12309, 38178, 39071, 61155, 63887)

(a)

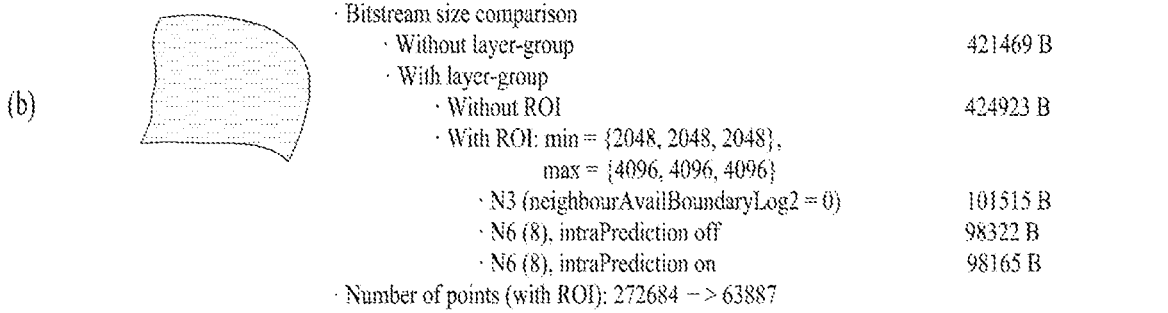

(b)

- Bitstream size comparison
  - Without layer-group                                          421469 B
  - With layer-group
    - Without ROI                                                424923 B
    - With ROI: min = {2048, 2048, 2048},
                max = {4096, 4096, 4096}
      - N3 (neighbourAvailBoundaryLog2 = 0)                      101515 B
      - N6 (8), intraPrediction off                               98322 B
      - N6 (8), intraPrediction on                                98165 B
- Number of points (with ROI): 272684 -> 63887

FIG. 45

| geometry_data_unit_header( ) | Descriptor |
|---|---|
| ...... | |
| layer_group_enabled_flag | u(1) |
| if(layer_group_enabled_flag) | |
| num_layer_groups_minus1 | u(8) |
| layer_group_id | u(8) |
| dependent_slice_flag | u(1) |
| if(dependent_slice_flag) | |
| ref_slice_id | u(8) |
| ref_layer_group_id | u(8) |
| } | |
| num_layers_minus1 | u(8) |
| layer_group_stream_len_bits | ue(v) |
| layer_group_stream_len | u(v) |
| subgroup_enabled_flag | u(1) |
| if(subgroup_enabled_flag) | |
| num_subgroups_minus1 | u(8) |
| subgroup_id | u(8) |
| ref_subgroup_id | u(8) |
| } | |
| num_points_bits_minus1 | ue(v) |
| num_points | u(v) |
| subgroup_bbox_origin_bits_minus1 | ue(v) |
| for(i=0; i<3; i++) | |
| subgroup_bbox_origin[i] | u(v) |
| subgroup_bbox_size_bits_minus1 | ue(v) |
| for(i=0; i<3; i++) | |
| subgroup_bbox_size[i] | u(v) |
| } | |
| ...... | |
| | |

FIG. 46

| geometry_data_unit_footer( ) | Descriptor |
|---|---|
| ...... | |
| if(layer_group_enabled_flag) | |
| num_skipped_layer_groups | u(8) |
| num_skipped_layers | u(8) |
| | |
| ...... | |
| | |

Region of interest (high data resolution)

Non-interested region (low data resolution)

FIG. 52

| geometry_parameter_set( ) { | Descriptor |
|---|---|
| ...... | |
|   num_layer_groups_minus1 | u(8) |
|   for(i=0; i<=num_layer_groups_minus1; i++) { | |
|     layer_group_id[i] | u(8) |
|     num_tree_depth_minus1[i] | u(8) |
|     num_subgroups_minus1[i] | u(8) |
|     for( j=0; j<=num_subgroups_minus1[i]; j++ ) { | |
|       subgroup_id[i][j] | u(8) |
|       for( k=0; k<3; k++ ) { | |
|         subgroup_bbox_origin[i][j][k] | u(8) |
|         subgroup_bbox_size[i][j][k] | u(8) |
|       } | |
|       num_child_subgroups_minus1[i][j] | u(8) |
|       for( k=0; k<=num_child_subgroups_minus1[i][j]; k++ ) | |
|         child_subgroup_id[i][j][k] | u(8) |
|     } | |
|   } | |
|   ...... | |
| } | |

FIG. 53

| attribute_parameter_set( ) { | Descriptor |
|---|---|
| ...... | |
| aligned_layer_group_structure_flag | u(1) |
| if( aligned_layer_group_structure_flag ) | |
| geom_parameter_set_id | |
| else { | |
| num_layer_groups_minus1 | u(8) |
| for(i=0; i<=num_layer_groups_minus1; i++) { | |
| layer_group_id[i] | u(8) |
| num_tree_depth_minus1[i] | u(8) |
| num_subgroups_minus1[i] | u(8) |
| for( j=0; j<=num_subgroups_minus1[i]; j++ ) { | |
| subgroup_id[i][j] | u(8) |
| for( k=0; k<3; k++ ) { | |
| subgroup_bbox_origin[i][j][k] | u(8) |
| subgroup_bbox_size[i][j][k] | u(8) |
| } | |
| num_child_subgroups_minus1[i][j] | u(8) |
| for( k=0; k<=num_child_subgroups_minus1[i][j]; k++ ) | |
| child_subgroup_id[i][j][k] | u(8) |
| } | |
| } | |
| } | |
| ...... | |
| } | |

FIG. 54

| geometry_data_unit_header( ) { | Descriptor |
|---|---|
| ...... | |
|    layer_group_id | u(8) |
|    subgroup_id | u(8) |
|    for( k=0; k<3; k++ ) { | |
|      subgroup_bbox_origin[k] | u(8) |
|      subgroup_bbox_size[k] | u(8) |
|    } | |
|    ...... | |
| } | |

| attribute_data_unit_header( ) { | Descriptor |
|---|---|
| ...... | |
|    layer_group_id | u(8) |
|    subgroup_id | u(8) |
|    for( k=0; k<3; k++ ) { | |
|      subgroup_bbox_origin[k] | u(8) |
|      subgroup_bbox_size[k] | u(8) |
|    } | |
|    ...... | |
| } | |

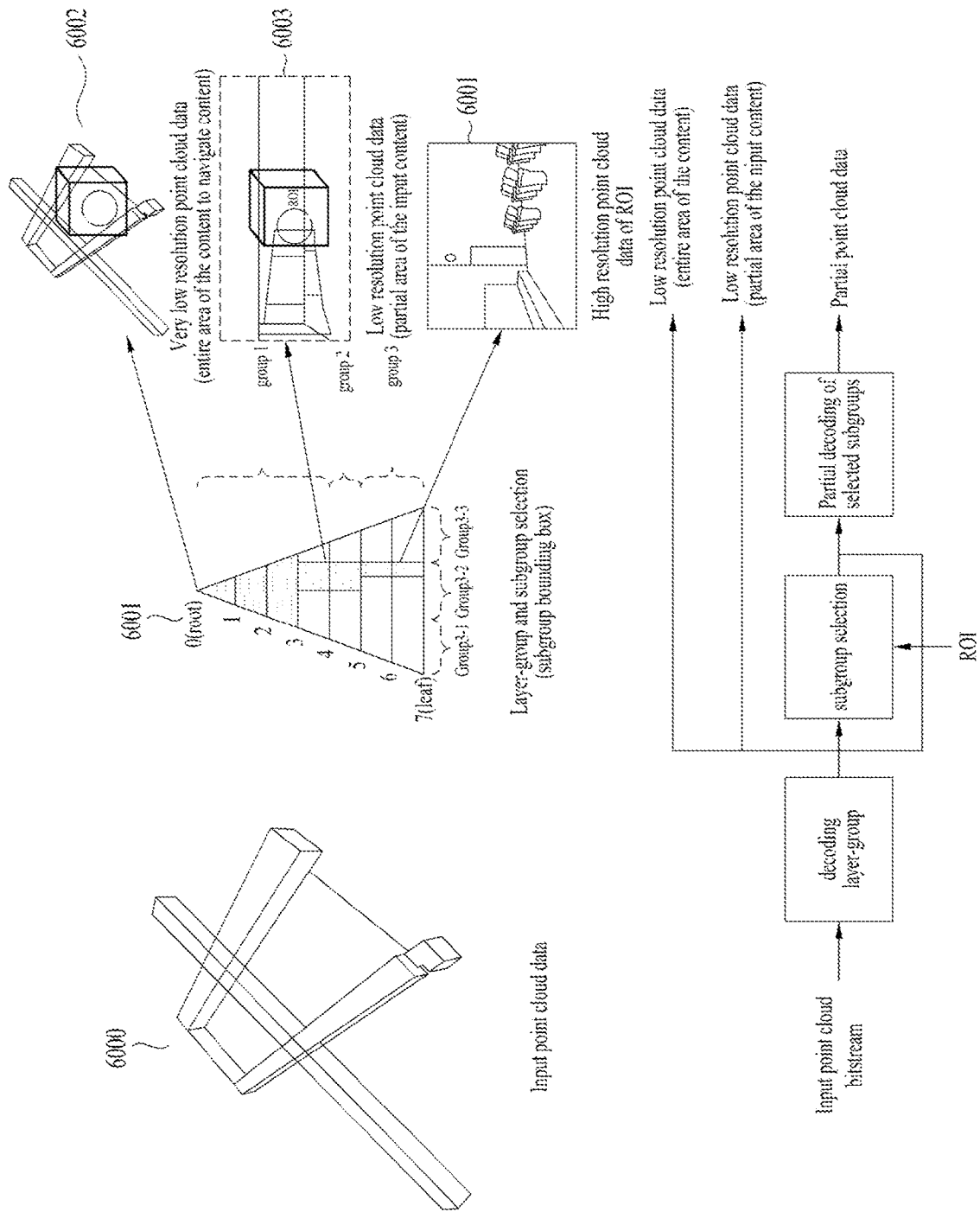

FIG. 61

| layer_group_info( ) { | Descriptor |
|---|---|
|     layer_group_enabled_flag | u(1) |
|     if(layer_group_enabled_flag) { | |
|         num_layer_groups_minus1 | u(8) |
|         layer_group_id | u(8) |
|         dependent_slice_flag | u(1) |
|         if(dependent_slice_flag) { | |
|             ref_slice_id | u(8) |
|             ref_layer_group_id | u(8) |
|         } | |
|         num_layers_minus1 | u(8) |
|         layer_group_stream_len_bits | ue(v) |
|         layer_group_stream_len | u(v) |
|         subgroup_enabled_flag | u(1) |
|         if(subgroup_enabled_flag) { | |
|             num_subgroups_minus1 | u(8) |
|             subgroup_id | u(8) |
|             ref_subgroup_id | u(8) |
|         } | |
|         num_points_bits_minus1 | ue(v) |
|         num_points | u(v) |
|         subgroup_bbox_origin_bits_minus1 | ue(v) |
|         for(i=0; i<3; i++) | |
|             subgroup_bbox_origin[i] | u(v) |
|         subgroup_bbox_size_bits_minus1 | ue(v) |
|         for(i=0; i<3; i++) | |
|             subgroup_bbox_size[i] | u(v) |
|         num_skipped_layer_groups | u(8) |
|         num_skipped_layers | u(8) |
|     } | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application claims the benefit of Korean Patent Application Nos. 10-2021-0052422, filed on Apr. 22, 2021, and 10-2021-0053237, filed on Apr. 23, 2021, which are hereby incorporated by reference as if fully set forth herein.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding point cloud data, and transmitting a bitstream including the point cloud data. In another aspect of the present disclosure, a method of receiving point cloud data may include receiving a bitstream including point cloud data, and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 19 illustrates a method of selecting geometry data and attribute data according to embodiments;

FIG. 22 shows the syntax of a sequence parameter set and a geometry parameter set according to embodiments;

FIG. 23 shows the syntax of an attribute parameter set according to embodiments;

FIG. 24 shows the syntax of a geometry data unit header according to embodiments;

FIG. 25 shows the syntax of an attribute data unit header according to embodiments;

FIG. 29 shows syntax of parameter sets according to embodiments;

FIG. 30 shows a geometry data unit header according to embodiments;

FIG. 37 shows a sequence parameter set (SPS) (seq_parameter_set( )) and a geometry parameter set according to embodiments;

FIG. 38 shows a syntax structure of a geometry data unit header (or referred to as a geometry slice header) according to embodiments;

FIG. 42 illustrates comparison of a result of layer-based point cloud representation according to embodiments;

FIG. 44 illustrates an example of a decoding effect according to a layer group structure and subgroup structure according to embodiments;

FIG. 45 shows a geometry data unit header according to embodiments;

FIG. 46 shows a geometry data unit footer according to embodiments;

FIG. 52 shows a geometry parameter set according to embodiments;

FIG. 53 shows an attribute parameter set according to embodiments;

FIG. 54 shows a geometry data unit header and an attribute data unit header according to embodiments;

FIG. 60 illustrates an efficient region-of-interest processing process according to embodiments;

FIG. 61 shows layer_group_information according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
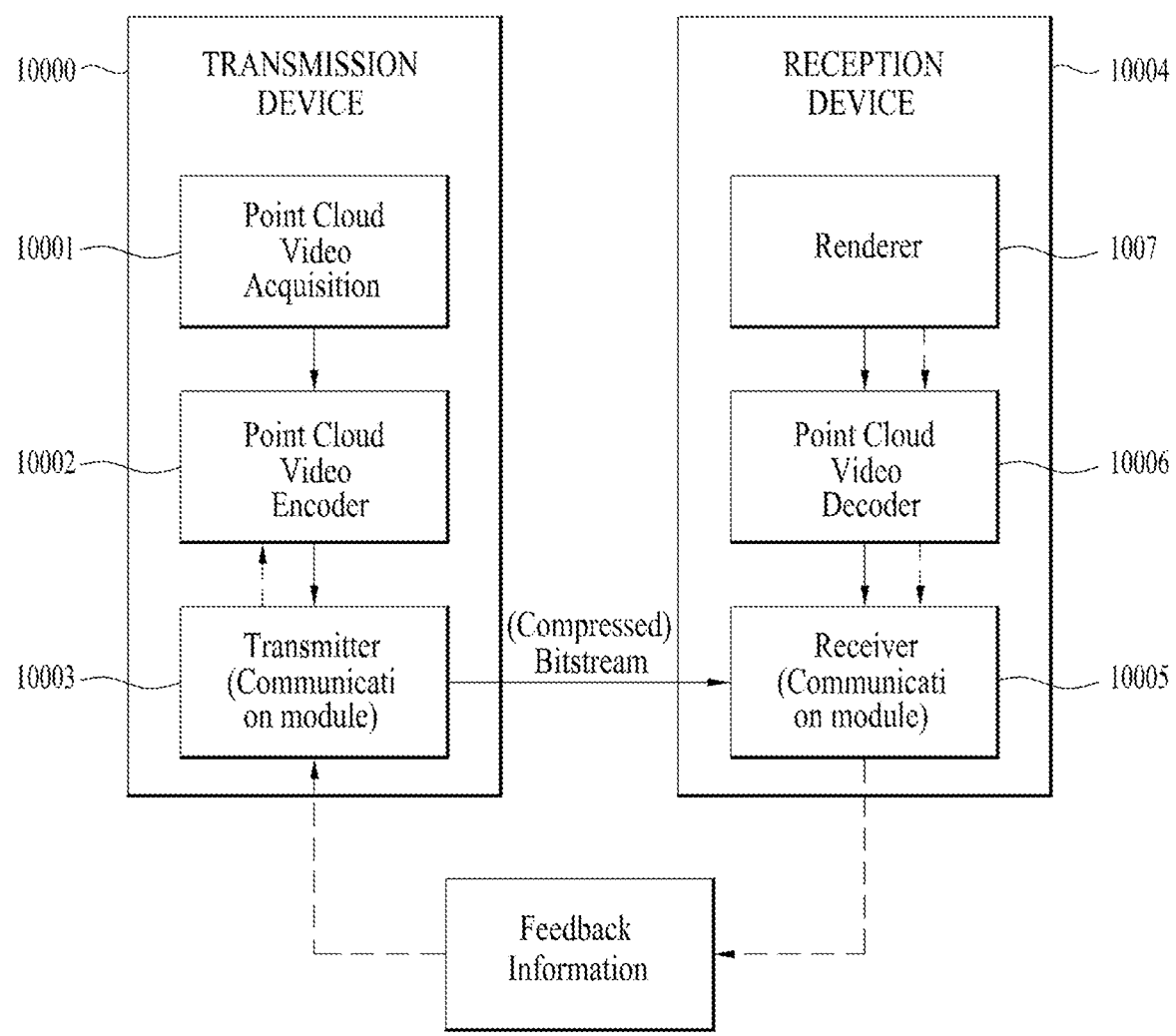
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
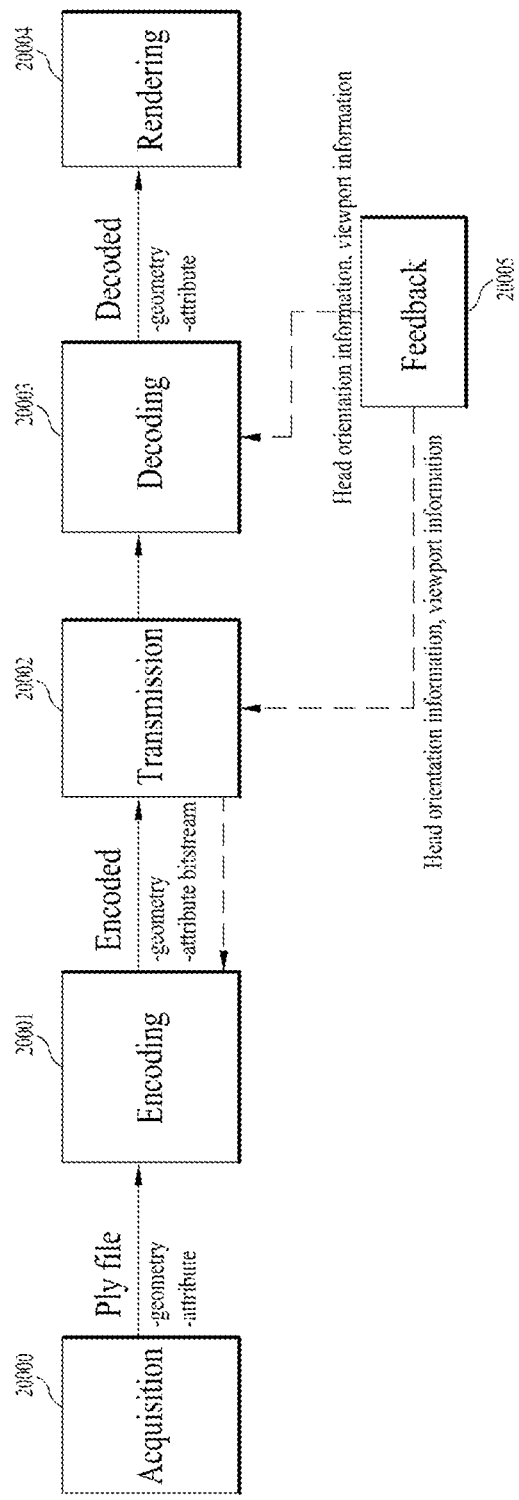
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
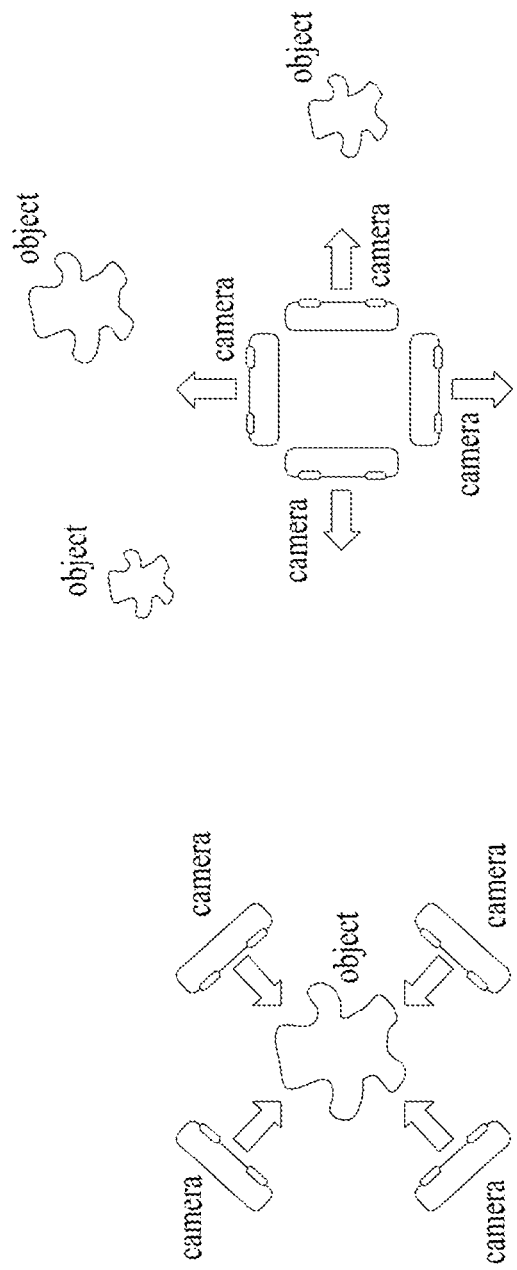
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
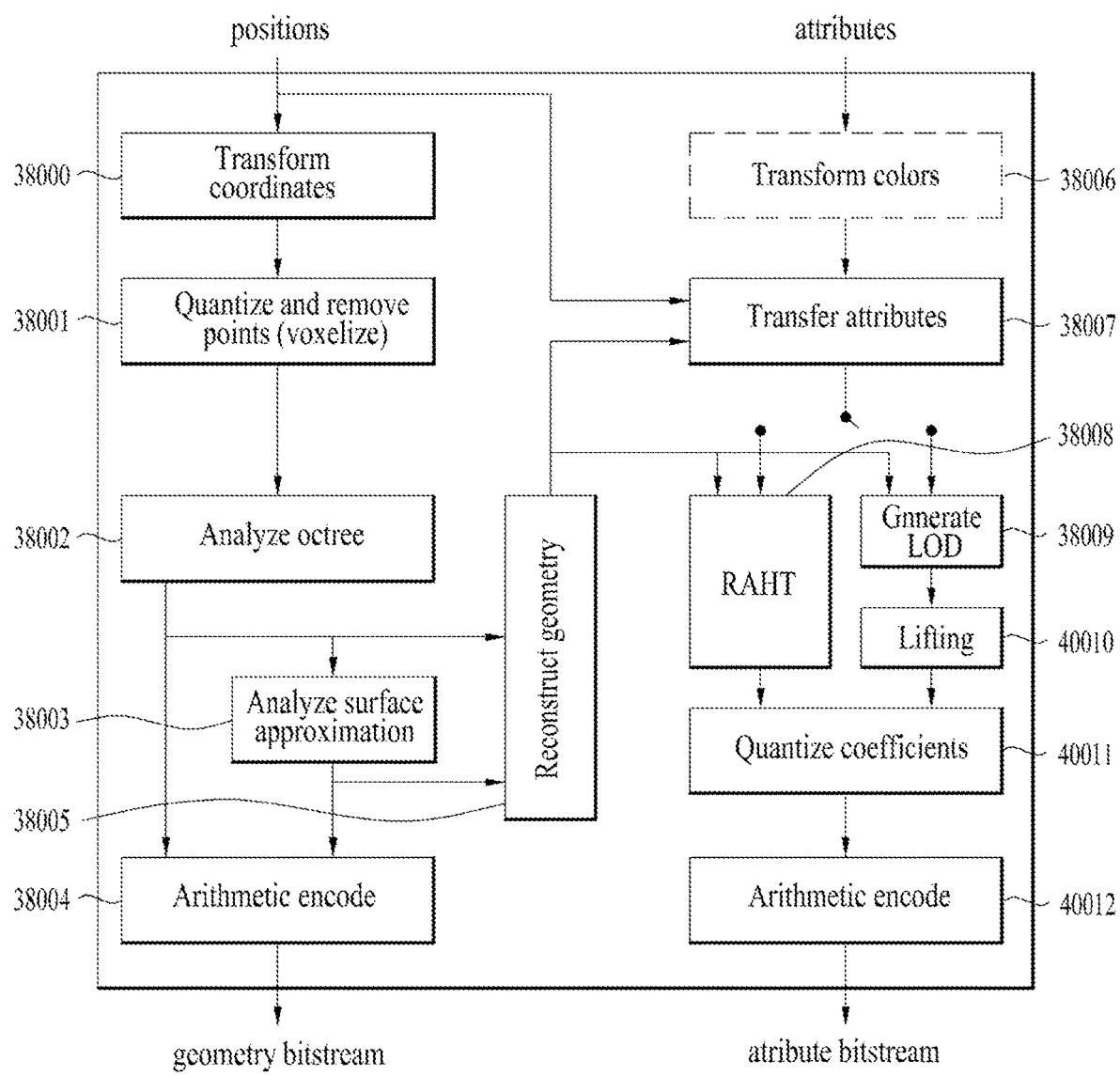
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
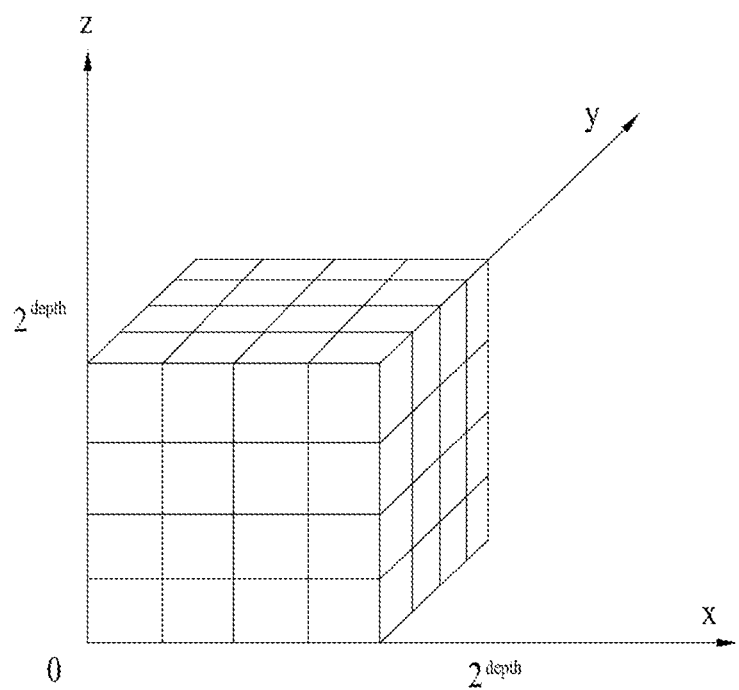
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = Ceil(Log2(Max(x_n^{int}, y_n^{int}, z_n^{int}, n = 1, ..., N) + 1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad \text{i)}$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through atan2(bi, ai), and the vertices are ordered based on the value of $\theta$. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1 Triangles formed from vertices ordered 1, . . . , n n triangles
3 (1,2,3)
4 (1,2,3), (3,4,1)
5 (1,2,3), (3,4,5), (5,1,3)
6 (1,2,3), (3,4,5), (5,6,1), (1,3,5)
7 (1,2,3), (3,4,5), (5,6,7), (7,1,3), (3,5,7)
8 (1,2,3), (3,4,5), (5,6,7), (7,8,1), (1,3,5), (5,7,1)
9 (1,2,3), (3,4,5), (5,6,7), (7,8,9), (9,1,3), (3,5,7), (7,9,3)
10 (1,2,3), (3,4,5), (5,6,7), (7,8,9), (9,10,1), (1,3,5), (5,7,9), (9,1,5)
11 (1,2,3), (3,4,5), (5,6,7), (7,8,9), (9,10,11), (11,1,3), (3,5,7), (7,9,11), (11,3,7)
12 (1,2,3), (3,4,5), (5,6,7), (7,8,9), (9,10,11), (11,12,1), (1,3,5), (5,7,9), (9,11,1), (1,5,9)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
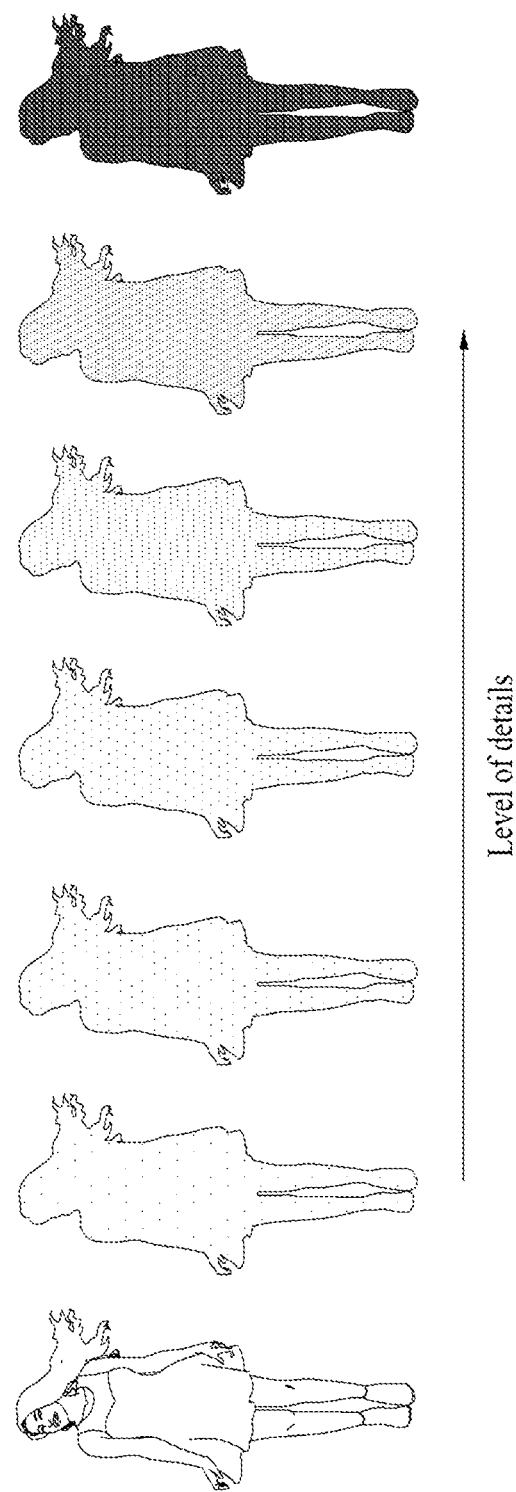
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
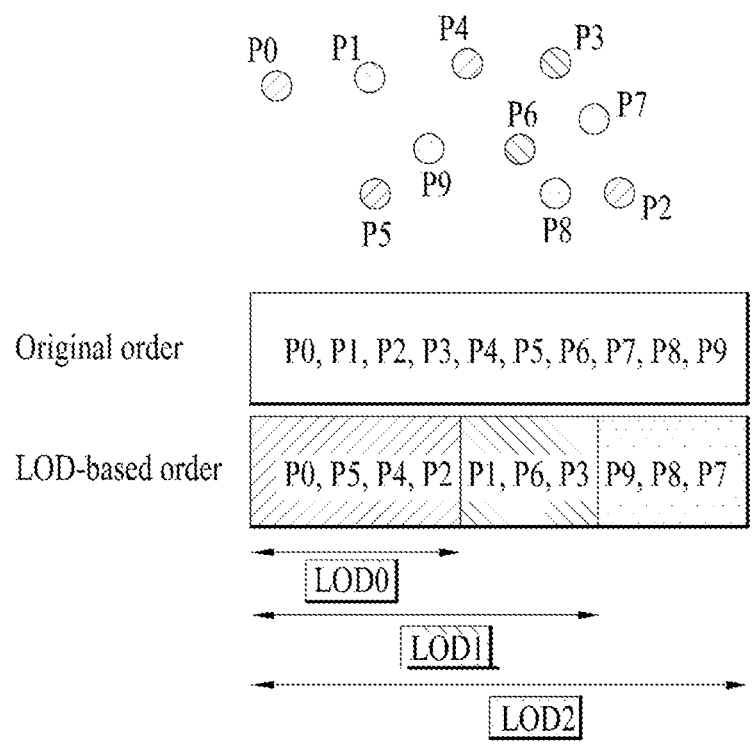
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code

```
int PCCQuantization(int value, int quantStep) {
   if( value >=0) {
      return floor(value / quantStep + 1.0 / 3.0);
   } else {
      return -floor(-value / quantStep + 1.0 / 3.0);
   }
}
```

TABLE

Attribute prediction residuals inverse quantization pseudo code

```
int PCCInverseQuantization(int value, int quantStep) {
   if( quantStep ==0) {
      return value;
   } else {
      return value * quantStep;
   }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h0_{0,0,0} \end{bmatrix} = T_{w1000w1001} \begin{bmatrix} g_{1_{0,0,0,z}} \\ g_{1_{0,0,1}} \end{bmatrix}$$

The value of gDC is also quantized and subjected to entropy coding like the high-pass coefficients.

Figure 10:
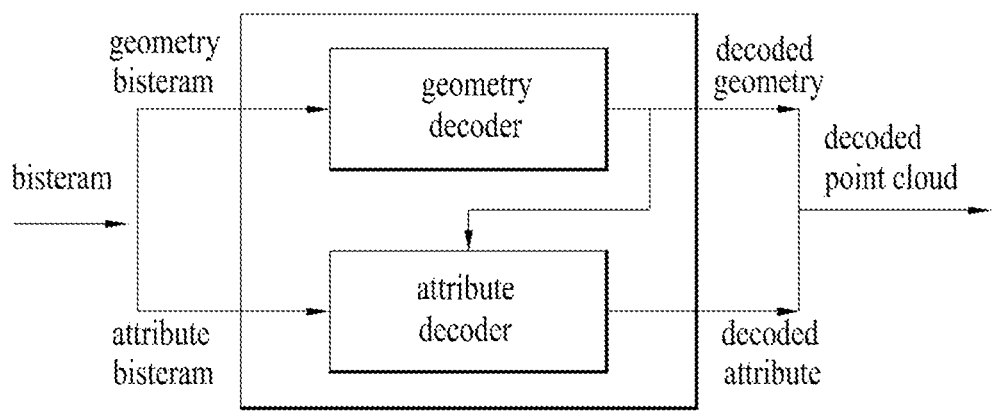
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
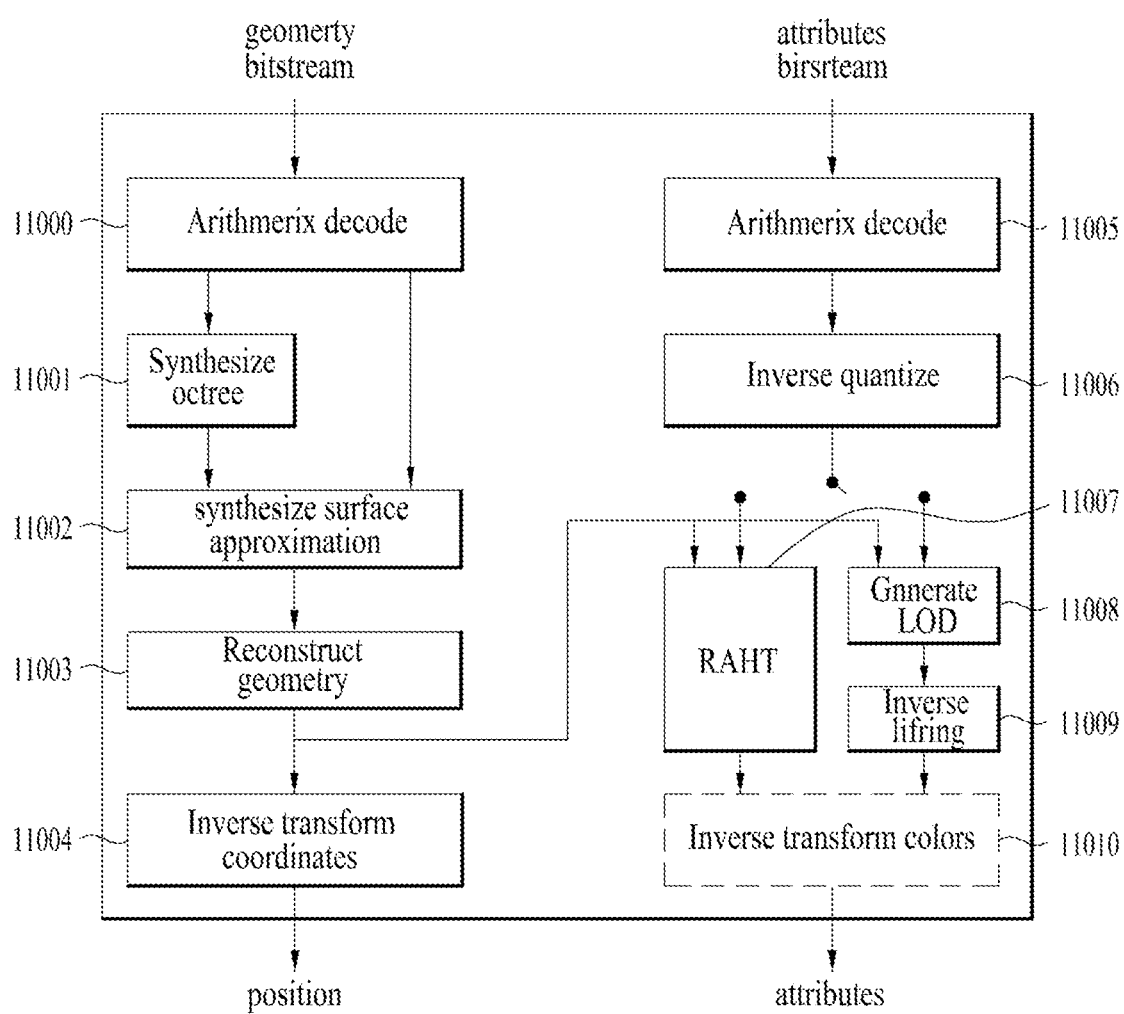
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
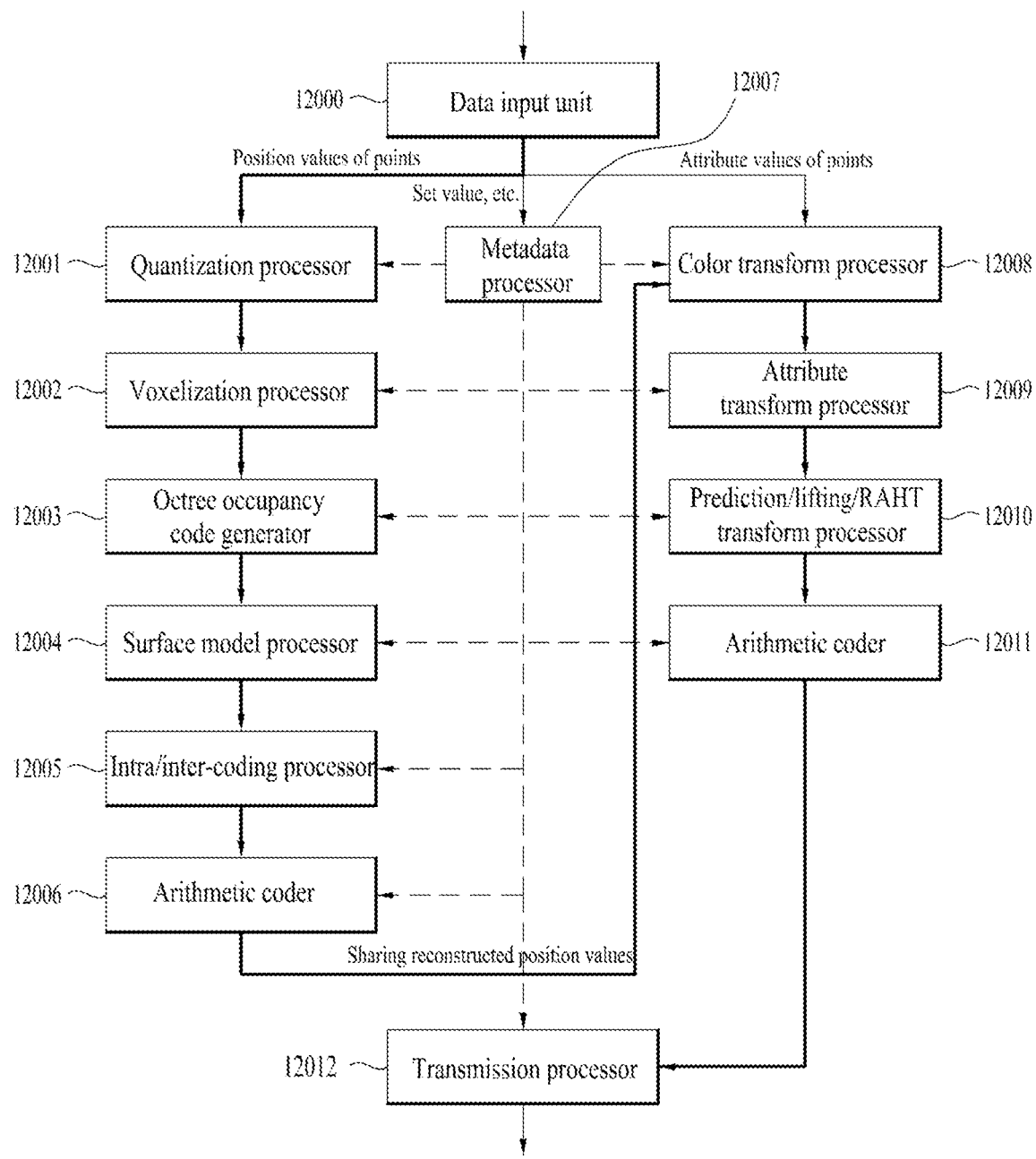
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice_identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
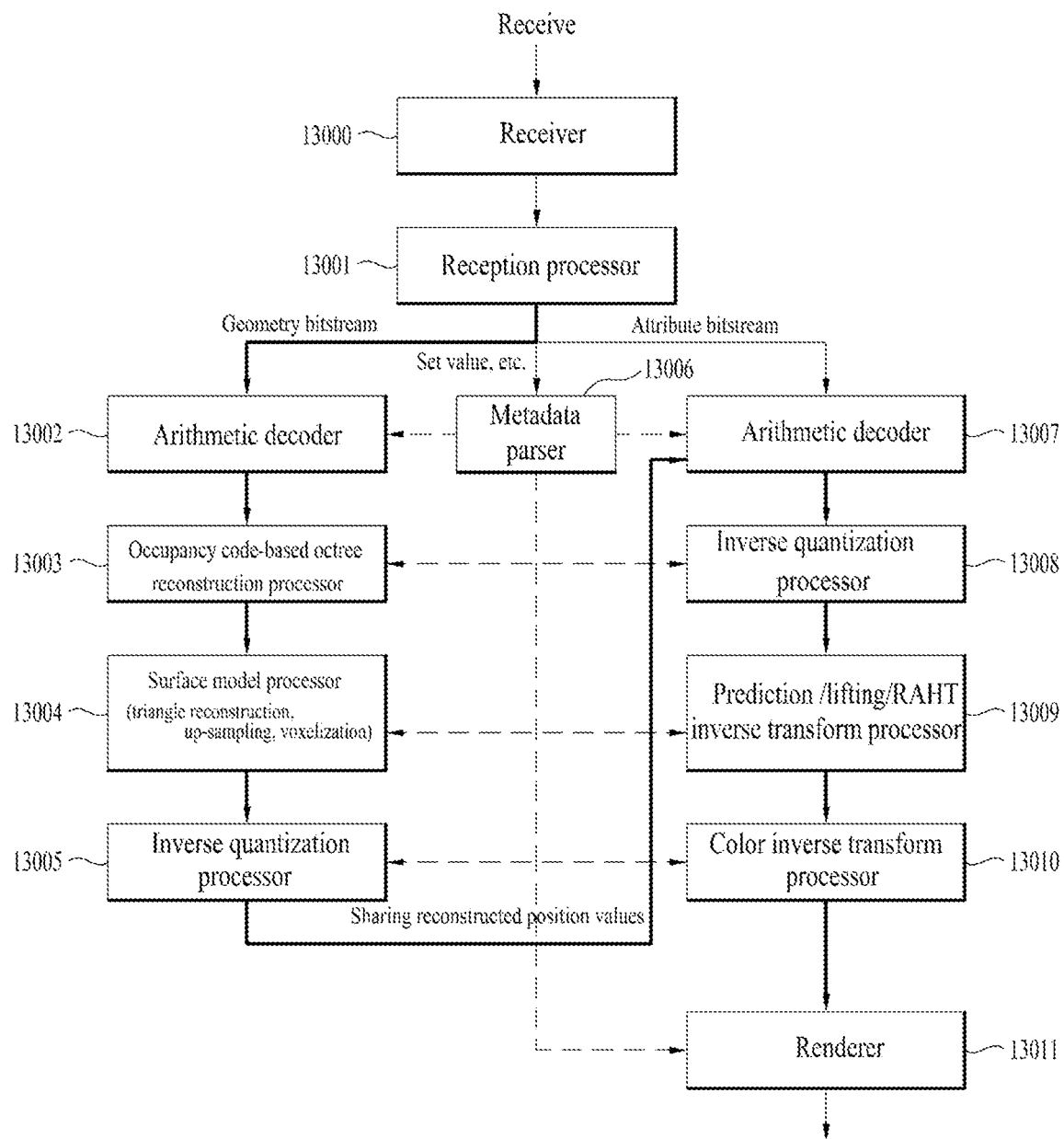
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
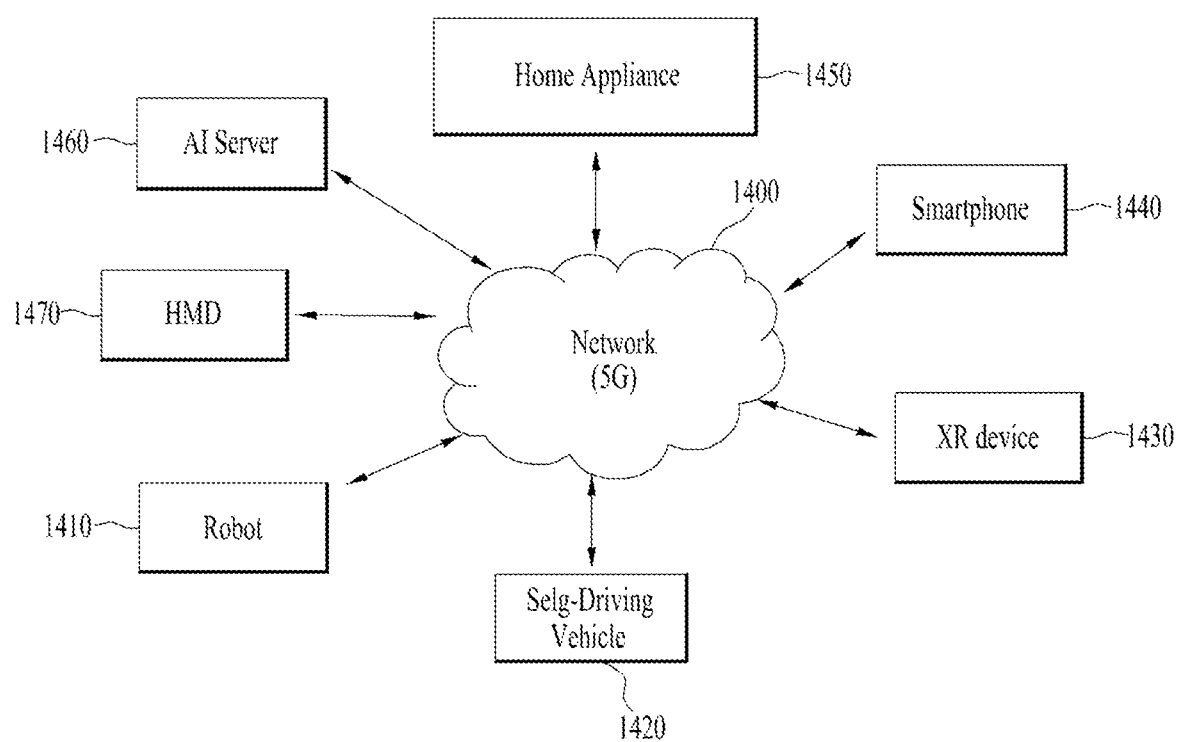
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
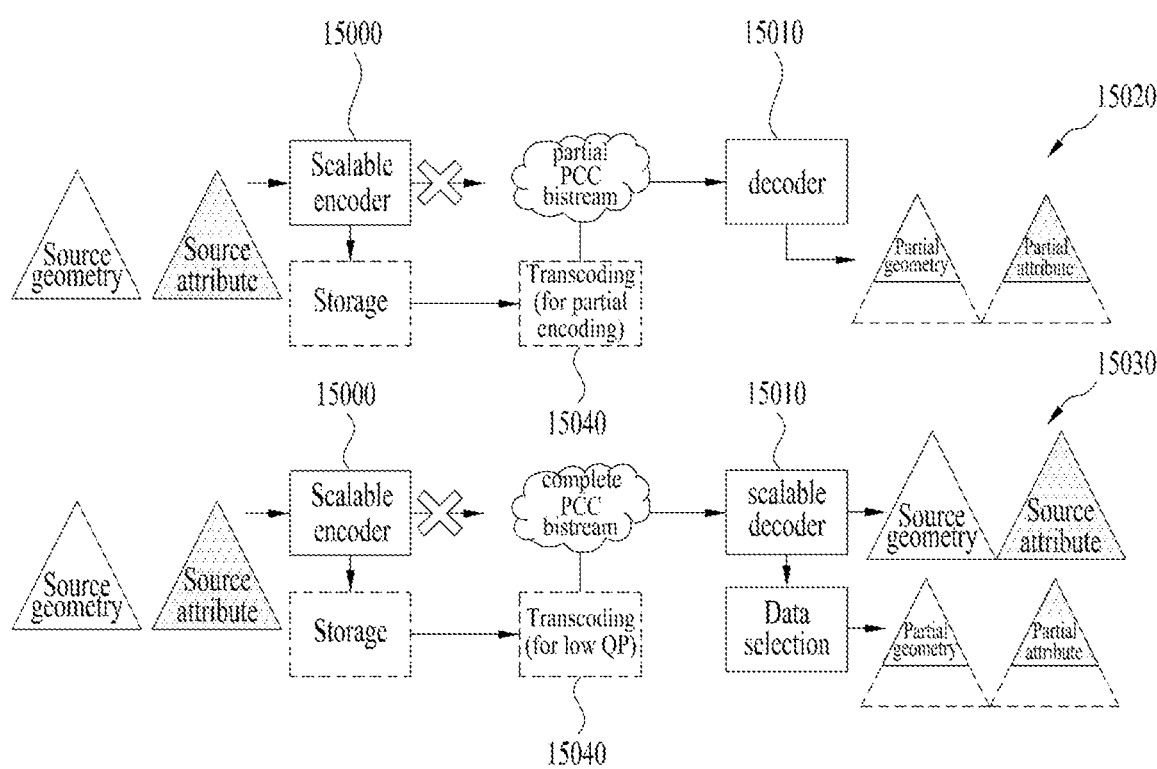
FIG. 15 illustrates a process of encoding, transmission, and decoding point cloud data according to embodiments.
Figure 48:
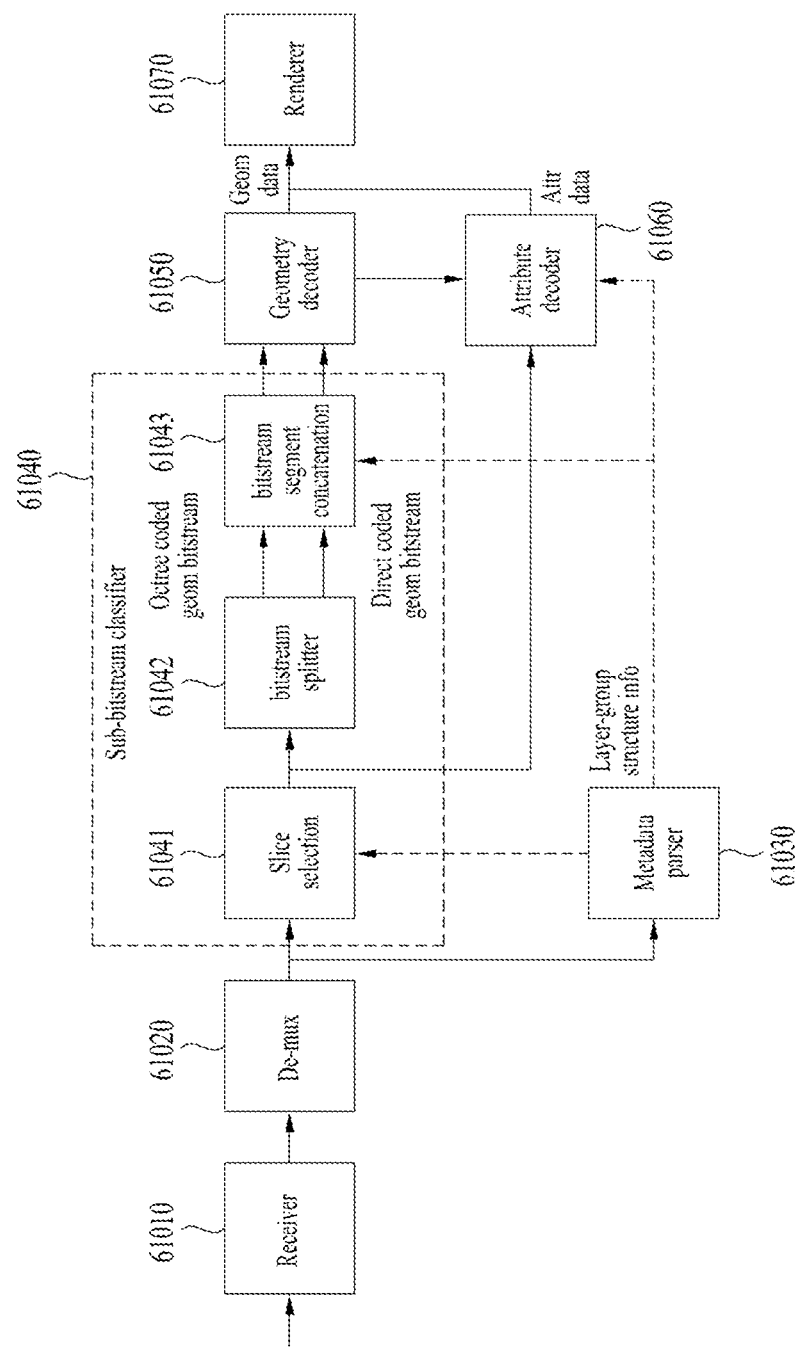
FIG. 48 shows a point cloud data reception device according to embodiments.
Figure 50:
FIG. 50 illustrates an example of efficient processing of a main region of point cloud data by a point cloud data transmission/reception device according to embodiments.
Figure 56:
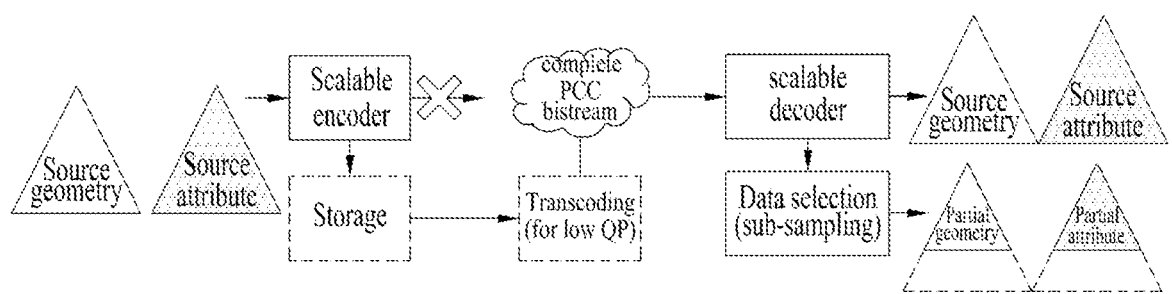
FIG. 56 illustrates a method for transmitting and receiving point cloud data according to embodiments.
Figure 57:
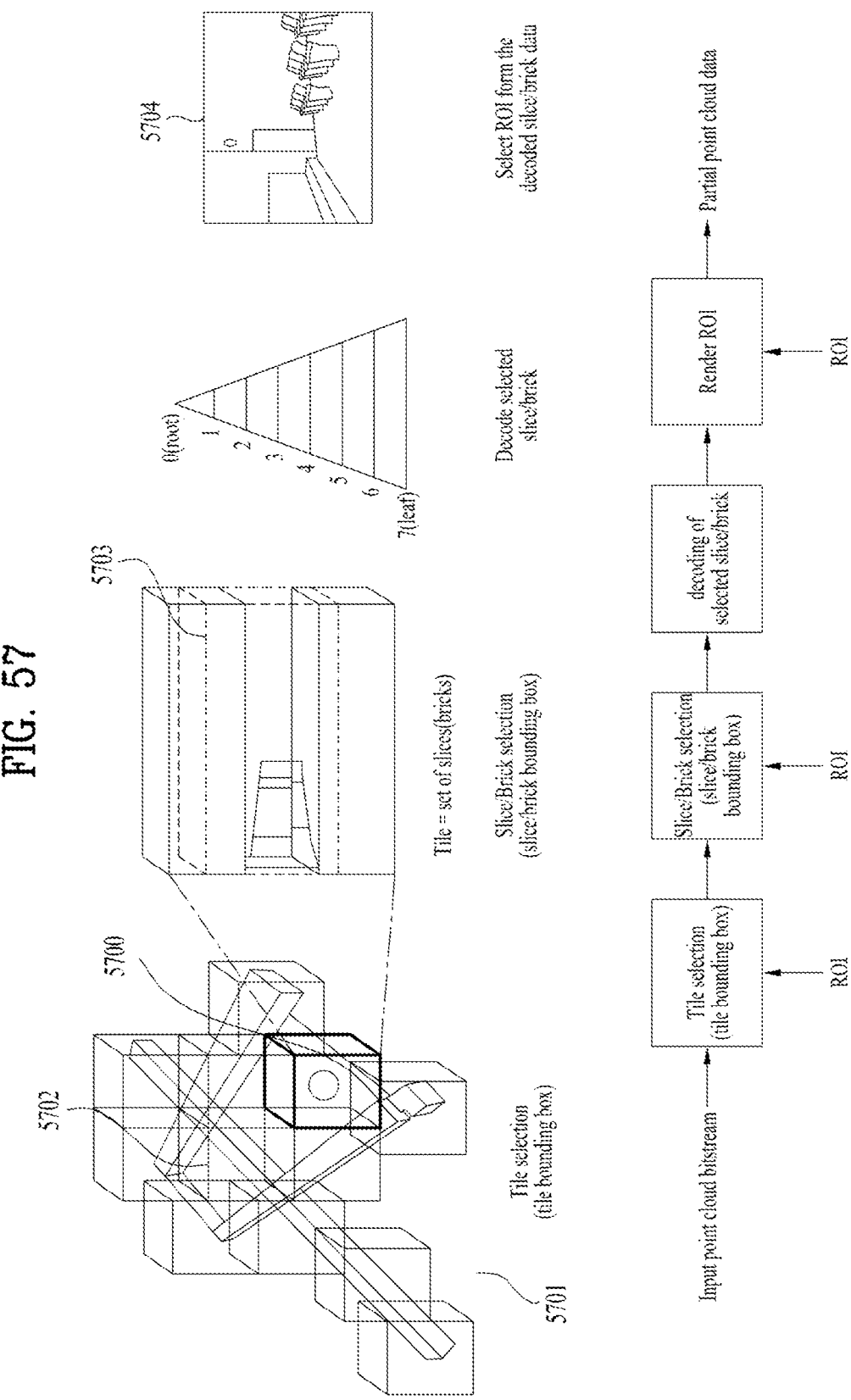
FIG. 57 illustrates an efficient region-of-interest processing process according to embodiments.
Figure 63:
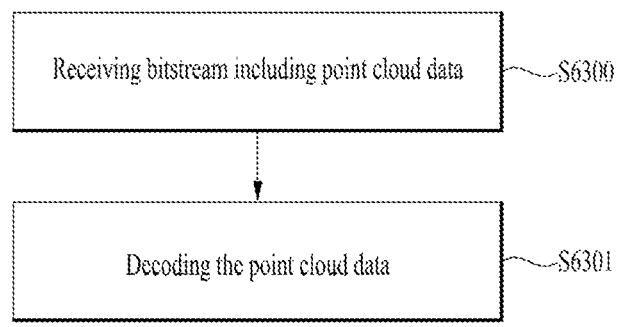
FIG. 63 illustrates a method for receiving point cloud data according to embodiments.

The point cloud data transmission method/device according to embodiments may be construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 48, the sub-bitstream classifier of FIG. 50, the encoder of FIGS. 56 and 57, the transmission method of FIG. 63, and the like.

Figure 49:
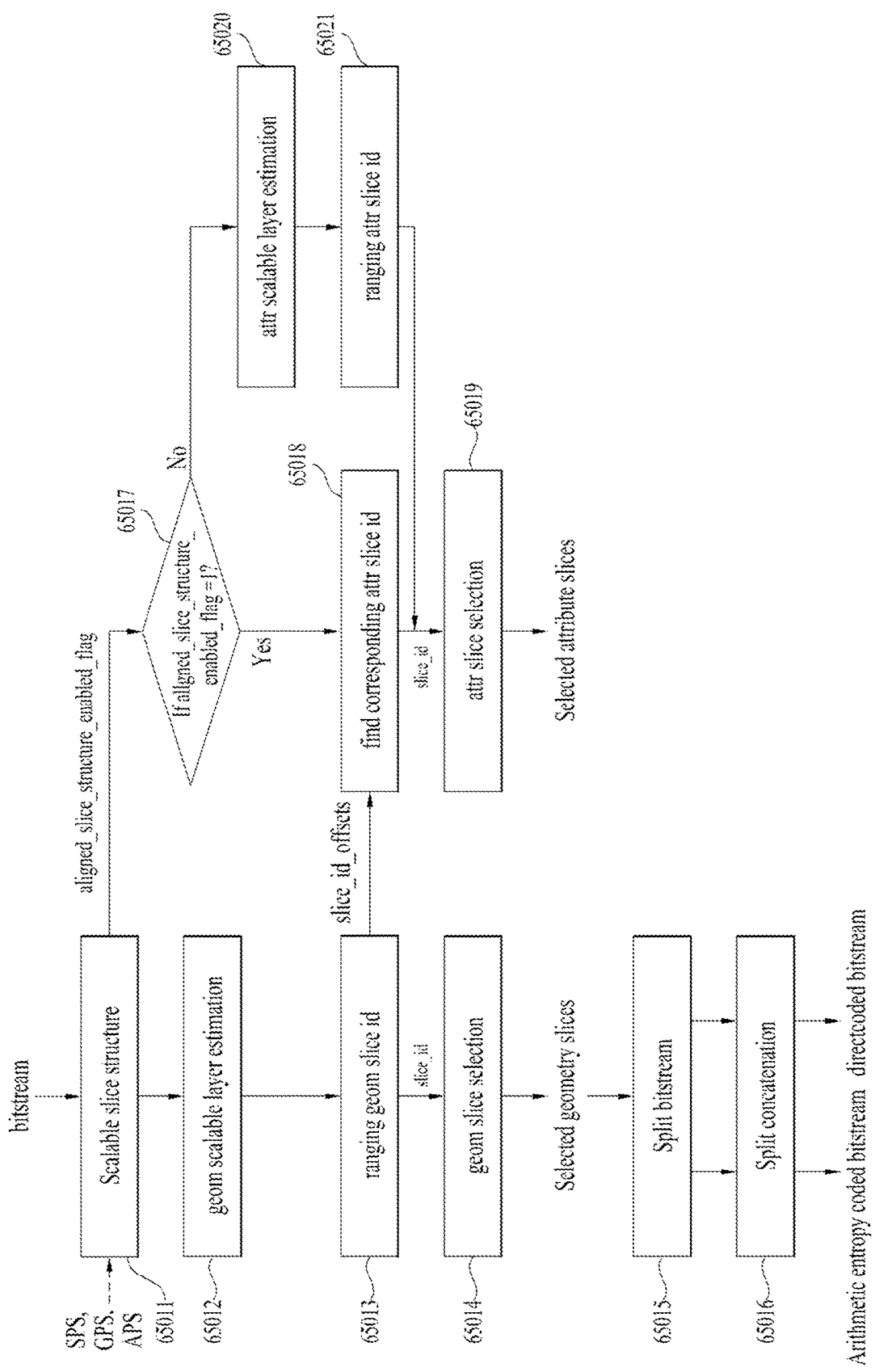
FIG. 49 is a flowchart of a point cloud data reception device according to embodiments.

The point cloud data reception method/device according to embodiments may be construed as a term referring to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 49, the sub-bitstream classifier of FIG. 50, the decoder of FIGS. 56 and 57, the decoder/renderer of FIGS. 58 to 61, the reception method of FIG. 64, and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

The transmission/reception method/device according to the embodiments may carry out a method for segmentation and transmission/reception of point cloud data for local access (slice segmentation for spatial random access).

The embodiments provide a method for efficiently supporting the selective decoding when a part of data needs to be selectively decoded due to receiver performance, the transmission speed, or the like in transmitting and receiving point cloud data. The embodiments provide a method for selecting necessary information or removing unnecessary information in a bitstream unit by dividing geometry and attribute data delivered in data units into semantic units such as geometry octree and levels of detail (LoD).

Embodiments include a method for constructing a data structure composed of a point cloud. Specifically, the embodiments include a packing and signaling method for effectively delivering PCC data configured based on layers is described, and a method for applying the same to a scalable PCC-based service. In particular, the embodiments include a method for constructing and transmitting/receiving a slice segment to be more suitable for a scalable PCC service when a direct compression mode is used for position compression.

Referring to FIGS. 4 and 11, the point cloud data includes geometry (e.g., XYZ coordinates) and attributes (e.g., color, reflectance, intensity, grayscale, opacity, etc.) of each data. In point cloud compression (PCC), octree-based compression is performed to efficiently compress non-uniform distribution in a three-dimensional space, and attribute information is compressed based on the octree-based compression. FIGS. 4 and 11 are flowcharts of a PCC transmission device and reception device. Operations according to the embodiments may be processed by each component of the PCC transmission device and reception device.

FIG. 15 illustrates a process of encoding, transmission, and decoding point cloud data according to embodiments.

Each component of FIG. 15 may correspond to hardware, software, a processor, and/or a combination thereof.

A point cloud encoder 15000 is a transmission device carrying out a transmission method according to embodiments, and may scalably encode and transmit point cloud data.

A point cloud decoder 15010 is a reception device carrying out a reception method according to embodiments, and may scalably decode the point cloud data.

Source data received by the encoder 15000 may include geometry data and/or attribute data.

The encoder 15000 scalably encodes the point cloud data, but does not immediately generate a partial PCC bitstream. Instead, when it receives full geometry data and full attribute data, it stores the data in a storage connected to the encoder. Then, the encoder may perform transcoding for partial encoding, and generate and transmit a partial PCC bitstream. The decoder 15010 may receive and decode the partial PCC bitstream to reconstruct partial geometry and/or partial attributes.

Upon receiving the full geometry and full attributes, the encoder 15000 may store the data in the storage connected to the encoder, and transcode the point cloud data with a low quantization parameter (QP) to generate and transmit a complete PCC bitstream. The decoder 15010 may receive and decode the complete PCC bitstream to reconstruct full geometry and/or full attributes. The decoder 15010 may select a partial geometry and/or a partial attribute from the complete PCC bitstream through data selection.

The method/device according to the embodiment compresses and transmits the point cloud data by dividing the position information about data points and feature information such as color/brightness/reflectance, which are the point cloud data, into geometry information and attribute information. In this case, an octree structure having layers may be configured according to the degree of detail or PCC data may be configured according to levels of detail (LoDs). Then, scalable point cloud data coding and representation may be performed based the configured structure or data. In this case, only a part of the point cloud data may be decoded or represented due to the performance of the receiver or the transfer rate.

In this process, the method/device according to the embodiments may remove unnecessary data in advance. In other words, when only a part of the scalable PCC bitstream needs to be transmitted (i.e., only some layers are decoded in scalable decoding), there is no way to select and send only the necessary part. Therefore, 1) the necessary part needs to be re-encoded (15020) after decoding, or 2) the receiver must selectively apply an operation after the whole data is transferred thereto (15030). However, in case 1), delay may occur due to the time for decoding and re-encoding (15020). In case 2), bandwidth efficiency may be degraded due to transmission of unnecessary data. Further, when a fixed bandwidth is used, data quality may need to be lowered for transmission (15030).

Accordingly, the method/device according to the embodiments may define a slice segmentation structure of point cloud data, and signal a scalable layer and slice structure for scalable transmission.

In embodiments, to ensure efficient bitstream delivery and decoding, the bitstream may be divided into specific units to be processed.

For octree-based geometry compression, the method/device according to the embodiments may use entropy-based coding and direct coding together. In this case, a slice configuration for efficiently utilization of scalability is needed.

The unit according to the embodiments may be referred to as an LOD, a layer, a slice, or the like. LOD is the same term as LOD in attribute data coding, but may mean a data unit for a layered structure of a bitstream. It may be a concept corresponding to one depth or a bundle of two or more depths based on the hierarchical structure of point cloud data, for example, depths (levels) of an octree or multiple trees. Similarly, a layer is provided to generate a unit of a sub-bitstream, and is a concept that corresponds to one depth or a bundle of two or more depths, and may correspond to one LOD or two or more LODs. Also, a slice is a unit for configuring a unit of a sub-bitstream, and may correspond to one depth, a part of one depth, or two or more depths. Also, it may corresponds one LOD, a part of one LOD, or two or more LODs. According to embodiments, the LOD, the layer, and the slice may correspond to each other or one of the LOD, the layer, and the slice may be included in another one. Also, a unit according to embodiments may include an LOD, a layer, a slice, a layer group, or a subgroup, and may be referred to as complementary to each other.

In the method/device according to embodiments, a sub-division structure of slices for point cloud data is proposed.

In the method/device according to embodiments, signaling information on a scalable layer and slice structure for scalable transmission is proposed.

In the method/device according according to embodiments, a definition of a layer group and/or a subgroup and slice segmentation is proposed.

In the method/device according to embodiments, an independent slice configuration method and signaling information for increasing scalability efficiency when direct coding is used are proposed.

In the method/device according to embodiments, layer-group-based slice configuration method and signaling for increasing scalability efficiency when direct coding is used are proposed.

Figure 16:
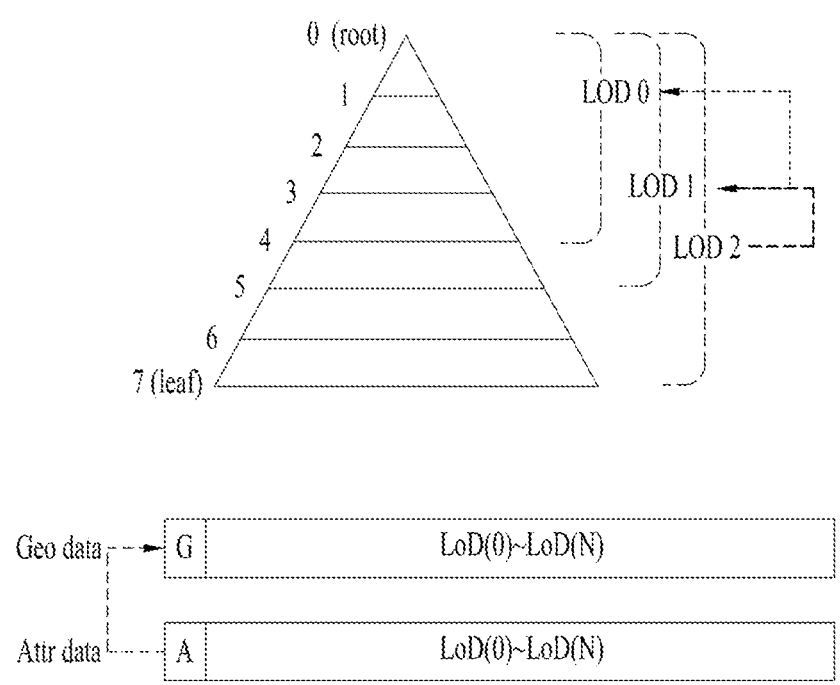
FIG. 16 shows a layer-based point cloud data configuration and a structure of geometry and attribute bitstreams according to embodiments.

FIG. 16 shows a layer-based point cloud data configuration and a structure of geometry and attribute bitstreams according to embodiments.

The transmission method/device according to the embodiments may configure layer-based point cloud data as shown in FIG. 16 to encode and decode the point cloud data.

Layering of point cloud data may have a layer structure in terms of SNR, spatial resolution, color, temporal frequency, bit depth, or the like depending on the application field, and may construct layers in a direction in which data density increases based on the octree structure or LoD structure.

The method/device according to the embodiments may configure, encode, and decode a geometry bitstream and an attribute bitstream based on the layering as shown in FIG. 16.

A bitstream acquired through point cloud compression by the transmission device/encoder according to the embodiments may be divided into a geometry data bitstream and an attribute data bitstream according to the type of data and transmitted.

Each bitstream according to the embodiments may be composed of slices. Regardless of layer information or LoD information, the geometry data bitstream and the attribute data bitstream may each be configured as one slice and delivered. In this case, when only a part of the layer or LoD is to be used, operations of 1) decoding the bitstream, 2) selecting only a desired part and removing unnecessary parts, and 3) performing encoding again based on only the necessary information should be performed.

Figure 17:
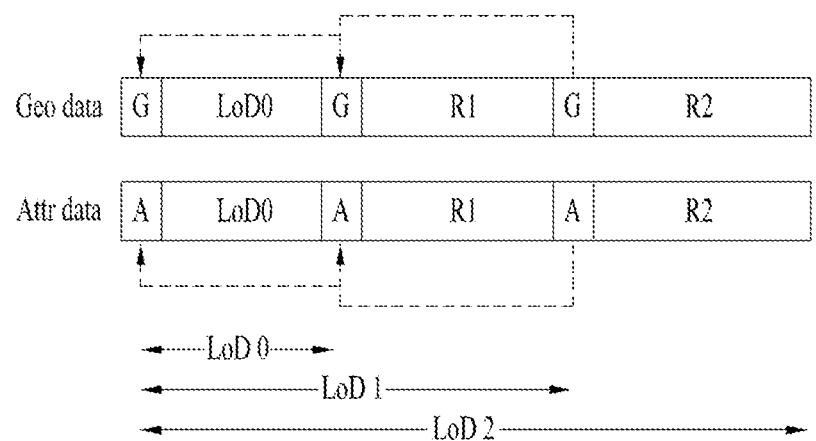
FIG. 17 shows a bitstream configuration according to embodiments.

FIG. 17 shows a bitstream configuration according to embodiments.

The transmission method/device according to the embodiments may generate a bitstream as shown in FIG. 17, and the reception method/device according to the embodiments may decode point cloud data included in the bitstream as shown in FIG. 17.

Bitstream Configuration According to Embodiments

In embodiments, in order to avoid unnecessary intermediate processes, a bitstream may be divided into layers (or LoDs) and transmitted.

For example, in the LoD-based PCC structure, a lower LoD is included in a higher LoD. Information included in the current LoD but not included in the previous LoD, that is, information newly included in each LoD may be referred to as R (Rest). As shown in FIG. 17, the initial LoD information and the information R newly included in each LoD may be divided and transmitted in each independent unit.

The transmission method/device according to the embodiments may encode geometry data and generate a geometry bitstream. The geometry bitstream may be configured for each LOD or layer. The geometry bitstream may include a header (geometry header) for each LOD or layer. The header may include reference information for the next LOD or the next layer. The current LOD (layer) may further include information R (geometry data) not included in the previous LOD (layer).

The reception method/device according to the embodiments may encode attribute data and generate an attribute bitstream. The attribute bitstream may be configured for each LOD or layer, and the attribute bitstream may include a header (attribute header) for each LOD or layer. The header may include reference information for the next LOD or the next layer. The current LOD (layer) may further include information R (attribute data) not included in the previous LOD (layer).

The reception method/device according to the embodiments may receive a bitstream composed of LODs or layers and efficiently decode only necessary data without a complicated intermediate process.

Figure 18A:
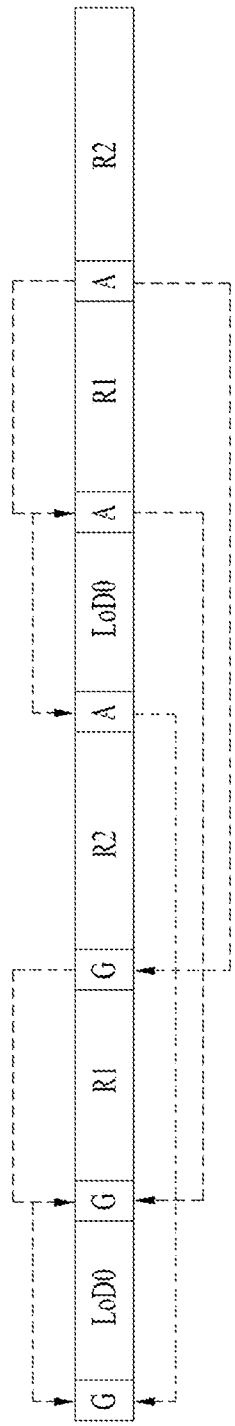
FIGS. 18A and 18B illustrate a bitstream sorting method according to embodiments.
Figure 18B:
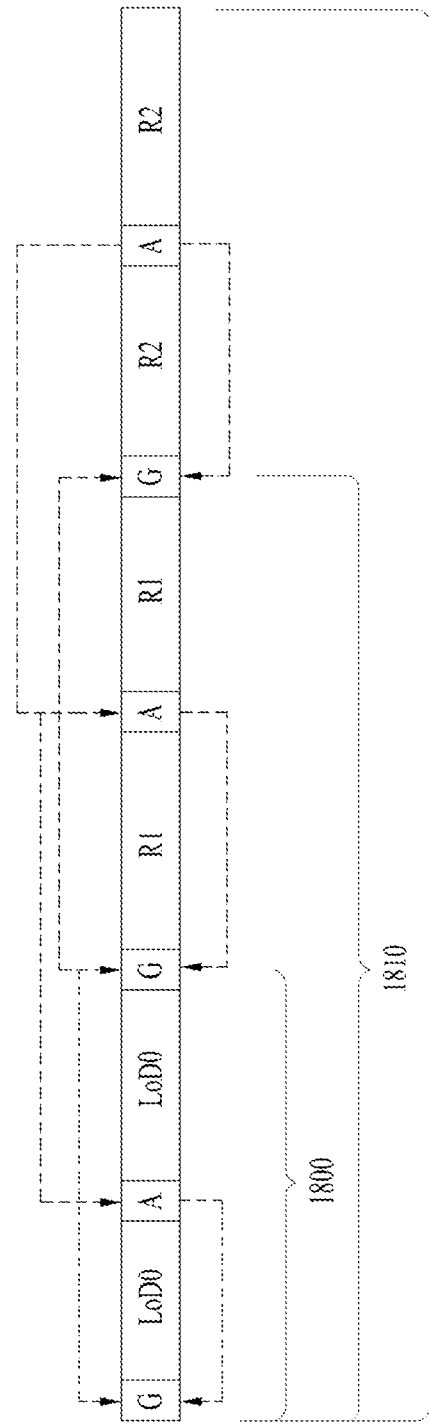

FIGS. 18A and 18B illustrate a bitstream sorting method according to embodiments.

The method/device according to the embodiments may sort the bitstreams of FIG. 17 as shown in FIGS. 18A and 18B.

Bitstream Sorting Method According to Embodiments

In transmitting a bitstream, the transmission method/device according to the embodiments may serially transmit geometry and attributes as shown in FIGS. 18A and 18B. In this case, depending on the type of data, the whole geometry information (geometry data) may be transmitted first, and then the attribute information (attribute data) may be transmitted. In this case, the geometry information may be quickly reconstructed based on the transmitted bitstream information.

In FIG. 18A, for example, layers (LODs) containing geometry data may be positioned first in the bitstream, and layers (LODs) containing attribute data may be positioned after the geometry layers. Since the attribute data is dependent on the geometry data, the geometry layer may be placed first. In addition, the positions may be changed differently according to embodiments. Reference may also be made between geometry headers and between an attribute header and a geometry header.

Referring to FIG. 18B, bitstreams constituting the same layer including geometry data and attribute data may be collected and delivered. In this case, by using a compression technique capable of parallel decoding of geometry and attributes, the decoding execution time may be shortened. In this case, information that needs to be processed first (lower LoD, wherein geometry must precede attribute) may be placed first.

A first layer 1800 includes geometry data and attribute data corresponding to the lowest LOD 0 (layer 0) together with each header. A second layer 1810 includes LOD 0 (layer 0), and also includes the geometry data and attribute data of points for a new and more detailed layer 1 (LOD1), which are not included in LOD 0 (layer 0), as information R1. A third layer 1820 may be subsequently placed in a similar manner.

The transmission/reception method/device according to the embodiments may efficiently select a layer (or LoD) desired in an application field at a bitstream level when a bitstream is transmitted and received. In the bitstream sorting method according to the embodiments, collecting and transmitting geometry information (FIGS. 18A and 18B) may produce an empty part in the middle after bitstream level selection. In this case, the bitstream may need to be rearranged. In the case where geometry and attributes are bundled and delivered according to each layer (FIGS. 18A and 18B), unnecessary information may be selectively removed according to the application field as follows.

Figure 21:
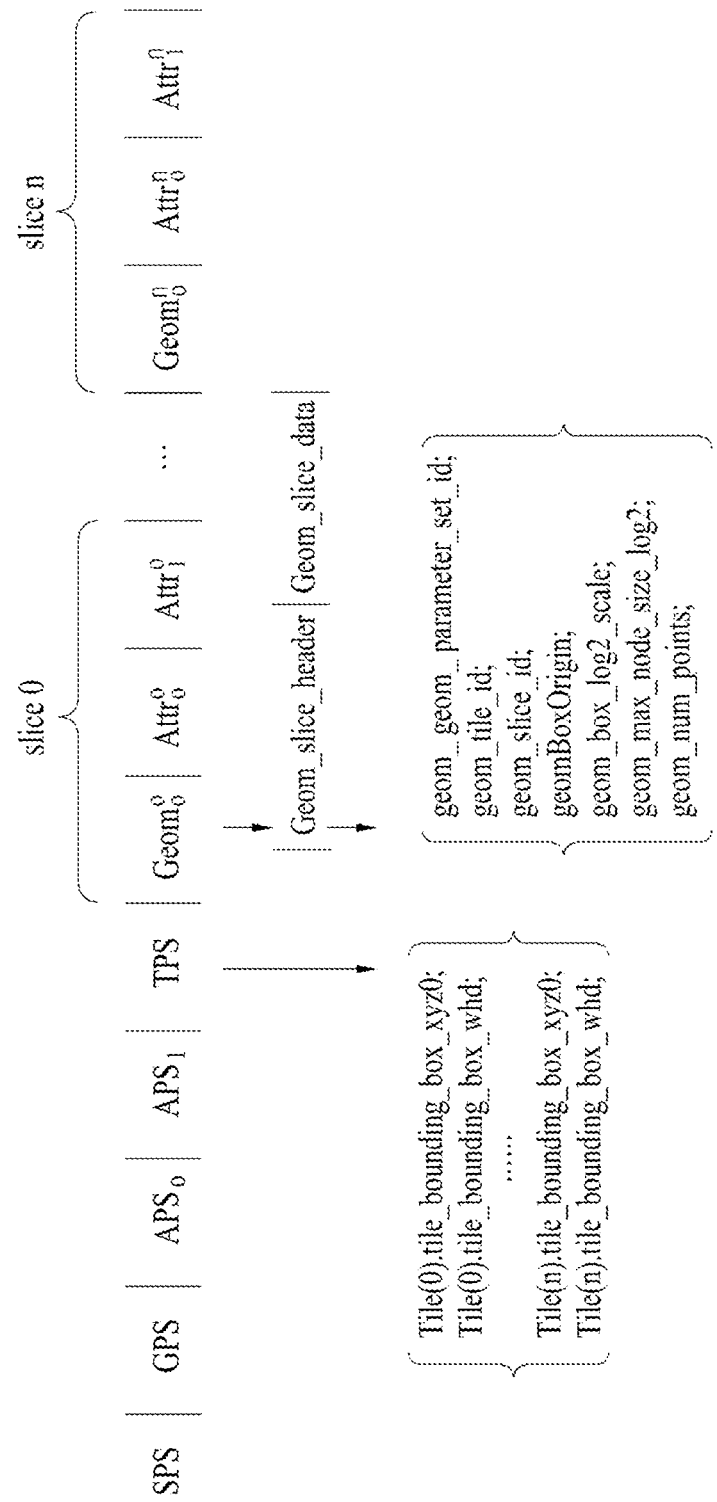
FIG. 21 shows a bitstream configuration according to embodiments.

FIG. 19 illustrates a method of selecting geometry data and attribute data according to embodiments.
Bitstream Selection According to Embodiments When a bitstream needs to be selected as described above, the method/device according to the embodiments may select data at the bitstream level as shown in FIG. 21: 1) symmetric selection of geometry and attributes; 2) asymmetrical selection of geometry and attributes; or 3) A combination of the above two methods.
1) Symmetric Selection of Geometry and Attributes Referring to FIG. 19, which illustrates a case where LoDs only up to LoD1 (LOD 0+R1) are selected (19000) and transmitted or decoded, information corresponding to R2 (new portion in LOD 2) corresponding to an upper layer is removed for transmission/decoding.
2) Asymmetric Selection of Geometry and Attributes A method/device according to embodiments may transmit geometry and attributes asymmetrically. Only the attribute of the upper layer (Attribute R2) is removed (19001), and the full geometry (from level 0 (root level) to level 7 (leaf level) in the triangular octree structure) may be selected and transmitted/decoded (19011).

Referring to FIG. 16, when point cloud data is represented in an octree structure and hierarchically divided into LODs (or layers), scalable encoding/decoding (scalability) may be supported.

The scalability function according to the embodiments may include slice level scalability and/or octree level scalability.

The LoD (level of detail) according to the embodiments may be used as a unit for representing a set of one or more octree layers. In addition, it may mean a bundle of octree layers to be configured as a slice.

In attribute encoding/decoding, the LOD according to the embodiments may be extended and used as a unit for dividing data in detail in a broader sense.

That is, spatial scalability by an actual octree layer (or scalable attribute layer) may be provided for each octree layer. However, when scalability is configured in slices before bitstream parsing, selection may be made in LoDs according to embodiments.

In the octree structure, LOD0 may correspond to the root level to level 4, LOD1 may correspond to the root level to level 5, and LOD2 may correspond to the root level to level 7, which is the leaf level.

That is, as shown in FIG. 16, when scalability is utilized in slices, as in the case of scalable transmission, the provided scalable step may correspond to three steps of LoD0, LoD1, and LoD2, and the scalable step that may be provided by the octree structure in the decoding operation may correspond to eight steps from the root to the leaf.

According to embodiments, for example, in FIG. 16, when LoD0 to LoD2 are configured as respective slices, a transcoder (the transcoder 15040 of FIG. 15) of the receiver or the transmitter may select 1) LoD0 only, select 2) LoD0 and LoD1, or select 3) LoD0, LoD1, and LoD2 for scalable processing.

Example 1: When only LoD0 is selected, the maximum octree level may be 4, and one scalable layer may be selected from among octree layers 0 to 4 in the decoding process. In this case, the receiver may consider a node size obtainable through the maximum octree depth as a leaf node, and may transmit the node size through signaling information.

Example 2: When LoD0 and LoD1 are selected, layer 5 may be added. Thus, the maximum octree level may be 5, and one scalable layer may be selected from among octree layers 0 to 5 in the decoding process. In this case, the receiver may consider a node size obtainable through the maximum octree depth as a leaf node, and may transmit the node size through signaling information.

According to embodiments, an octree depth, an octree layer, and an octree level may be a unit in which data is divided in detail.

Example 3: When LoD0, LoD1, and LoD2 are selected, layers 6 and 7 may be added. Thus, the maximum octree level may be 7, and one scalable layer may be selected from among octree layers 0 to 7 in the decoding process. In this case, the receiver may consider a node size obtainable through the maximum octree depth as a leaf node, and may transmit the node size through signaling information.

FIGS. 20A to 20C illustrate a method of configuring a slice including point cloud data according to embodiments.
Slice Configuration According to Embodiments The transmission method/device/encoder according to the embodiments may configure a G-PCC bitstream by segmenting the bitstream in a slice structure. A data unit for detailed data representation may be a slice.

For example, one or more octree layers may be matched to one slice.

The transmission method/device according to the embodiments, for example, the encoder, may configure a slice 2001-based bitstream by scanning a node (point) included in an octree in the direction of scan order 2000.

In FIG. 20A, some nodes in an octree layer may be included in one slice.

The octree layer (e.g., level 0 to level 4) may constitute one slice 2002.

Partial data of an octree layer, for example, level 5 may constitute each slice 2003, 2004, 2005.

Partial data of an octree layer, for example, level 6 may constitute each slice.

In FIGS. 20B and 20C, when multiple octree layers are matched to one slice, only some nodes of each layer may be included. In this way, when multiple slices constitute one geometry/attribute frame, information necessary to configure a layer may be delivered for the receiver. The information may include information about layers included in each slice and information about nodes included in each layer.

In FIG. 20B, octree layers, for example, level 0 to level 3 and partial data of level 4 may be configured as one slice.

Octree layers, for example, partial data of level 4 and partial data of level 5 may be configured as one slice.

Octree layers, for example, partial data of level 5 and partial data of level 6 may be configured as one slice.

An octree layer, for example, partial data of level 6 may be configured as one slice.

In FIG. 20C, octree layers, for example, data of level 0 to level 4 may be configured as one slice.

Partial data from each of octree layer level 5, level 6, and level 7 may be configured as one slice.

The encoder and the device corresponding to the encoder according to the embodiments may encode the point cloud data, and may generate and transmit a bitstream including the encoded data and parameter information related to the point cloud data.

Furthermore, in generating the bitstream, the bitstream may be generated based on the bitstream structure according to embodiments (see, for example, FIGS. 16 to 20C). Accordingly, the reception device, the decoder, and a corresponding device according to the embodiments may receive and parse a bitstream configured to be suitable for selective partial data decoding, and partially decode and efficiently provide the point cloud data (see FIG. 15).

Scalable Transmission According to Embodiments

The point cloud data transmission method/device according to the embodiments may scalably transmit a bitstream including point cloud data, and the point cloud data reception method/device according to the embodiments may scalably receive and decode the bitstream.

When the bitstream according to embodiments shown in FIGS. 16 to 20C is used for scalable transmission, information needed to select a slice required by the receiver may be transmitted to the receiver. Scalable transmission may mean transmitting or decoding only a part of a bitstream, rather than decoding the entire bitstream, and the result thereof may be low resolution point cloud data.

When scalable transmission is applied to the octree-based geometry bitstream, point cloud data may need to be configured with information ranging only up to a specific octree layer for the bitstream of each octree layer (FIG. 16) from a root node to a leaf node.

To this end, the target octree layer should have no dependency on information about the lower octree layer. This may be a constraint applied to geometry coding and attribute coding in common.

In addition, in scalable transmission, a scalable structure used for the transmitter/receiver to select a scalable layer needs to be delivered. Considering the octree structure according to the embodiments, all octree layers may support the scalable transmission, or the scalable transmission may be allowed only for a specific octree layer or lower layers. When a slice includes some of the octree layers, a scalable layer in which the slice is included may be indicated. Thereby, it may be determined whether the slice is necessary/not necessary in the bitstream stage. In the example of FIG. 20A, the yellow part starting from the root node constitutes one scalable layer without supporting scalable transmission. Following octree layers may be matched to scalable layers in a one-to-one correspondence. In general, scalability may be supported for a part corresponding to the leaf node. As shown in FIG. 20C, when multiple octree layers are included in a slice, it may be defined that one scalable layer shall be configured for the layers.

In this case, scalable transmission and scalable decoding may be used separately according to the purpose. The scalable transmission may be used at the transmitting/receiving side for the purpose of selecting information up to a specific layer without involving a decoder. The scalable decoding is used to select a specific layer during coding. That is, the scalable transmission may support selection of necessary information without involving a decoder in a compressed state (in the bitstream stage), such that the information may be transmitted or determined by the receiver. On the other hand, the scalable decoding may support encoding/decoding data only up to a required part in the encoding/decoding process, and may thus be used in such a case as scalable representation.

In this case, the layer configuration for scalable transmission may be different from the layer configuration for scalable decoding. For example, the three bottom octree layers including leaf nodes may constitute one layer in terms of scalable transmission. However, when all layer information is included in terms of scalable decoding, scalable decoding may be performed for each of leaf node layer n, leaf node layer n−1, leaf node layer n−2.

Hereinafter, a slice structure for the layer configuration described above and a signaling method for scalable transmission will be described.

FIG. 21 shows a bitstream configuration according to embodiments.

The method/device according to the embodiments may generate a bitstream as shown in FIG. 21. The bitstream may include encoded geometry data and attribute data, and also include parameter information.

Syntax and semantics for the parameter information are described below.

According to embodiments, information on a separated slice may be defined in a parameter set of the bitstream and an SEI message as follows.

The bitstream may include a sequence parameter set (SPS), a geometry parameter set (GPS), an attribute parameter set (APS), a geometry slice header, and an attribute slice header. In this regard, depending on the application or system, the range and method to be applied may be defined in a corresponding or separate position and used differently. That is, a signal may have different meanings depending on the position where the signal is transmitted. If the signal is defined in the SPS, it may be equally applied to the entire sequence. If the signal is defined in the GPS, this may indicate that the signal is used for position reconstruction. If the signal is defined in the APS, this may indicate that the signal is applied to attribute reconstruction. If the signal is defined in the TPS, this may indicate that the signal is applied only to points within a tile. If the signal is delivered in a slice, this may indicate that the signal is applied only to the slice. In addition, the range and method to be applied may be defined in a corresponding position or a separate position depending on the application or system so as to be used differently. In addition, when the syntax elements defined below are applicable to multiple point cloud data streams as well as the current point cloud data stream, they may be carried in a superordinate parameter set.

Abbreviations used herein are: SPS: Sequence Parameter Set; GPS: Geometry Parameter Set; APS: Attribute Parameter Set; TPS: Tile Parameter Set; Geom: Geometry bitstream=geometry slice header+geometry slice data; Attr: Attribute bitstream=attribute slice header+attribute slice data.

While the embodiments define the information independently of the coding technique, the information may be defined in connection with the coding technique. In order to support regionally different scalability, the information may be defined in the tile parameter set of the bitstream. In addition, when syntax elements defined below are applicable not only to the current point cloud data stream but also to multiple point cloud data streams, they may be carried in a superordinate parameter set or the like.

Alternatively, a network abstract layer (NAL) unit may be defined for a bitstream and relevant information for selecting a layer, such as layer_id, may be delivered. Thereby, a bitstream may be selected at a system level.

Hereinafter, parameters (which may be referred to as metadata, signaling information, or the like) according to the embodiments may be generated in the process of the transmitter according to the embodiments, and transmitted to the receiver according to the embodiments so as to be used in the reconstruction process.

For example, the parameters may be generated by a metadata processor (or metadata generator) of the transmission device according to the embodiments, which will be described later, and may be acquired by a metadata parser of the reception device according to the embodiments.

Hereinafter, syntax/semantics of parameters included in a bitstream will be described with reference to FIGS. 22 to 25.

FIG. 22 shows the syntax of a sequence parameter set and a geometry parameter set according to embodiments.

FIG. 23 shows the syntax of an attribute parameter set according to embodiments.

FIG. 24 shows the syntax of a geometry data unit header according to embodiments.

FIG. 25 shows the syntax of an attribute data unit header according to embodiments.

scalable_transmission_enable_flag: When equal to 1, it may indicate that a bitstream is configured to be suitable for scalable transmission. That is, as the bitstream is composed of multiple slices, information may be selected at the bitstream stage. Scalable layer configuration information may be transmitted to indicate that slice selection is available in the transmitter or receiver, and the geometry and/or attributes are compressed to enable partial decoding. When scalable_transmission_enable_flag is 1, a transcoder of the receiver or transmitter may be used to determine whether geometry and/or attribute scalable transmission is allowed. The transcoder may be coupled to or included in the transmission device and the reception device.

geom_scalable_transmission_enable_flag and attr_scalable_transmission_enable_flag: When equal to 1, they may indicate that the geometry or attribute is compressed to enable scalable transmission.

For example, for geometry, the flag may indicate that the geometry is composed of octree-based layers or that slice partitioning (see FIG. 23) is has been performed in consideration of scalable transmission.

When geom_scalable_transmission_enable_flag or attr_scalable_transmission_enable_flag is 1, the receiver may know that scalable transmission is available for the geometry or attributes.

For example, geom_scalable_transmission_enable_flag_equal to 1 may indicate that octree-based geometry coding is used, and QTBT is disabled, or the geometry is coded in such a form as an octree by performing coding in order of BT-QT-OT.

attr_scalable_transmission_enable_flag to 1 may indicate that pred-Lifting coding is used by using scalable LOD generation or that scalable RAHT (e.g. Haar-based RAHT) is used.

num_scalable_layers may indicate the number of layers supporting scalable transmission. According to embodiments, a layer may mean an LOD.

scalable_layer_id specifies an indicator for a layer constituting scalable transmission. When a scalable layer is composed of multiple slices, common information may be carried in a parameter set by scalable_layer_id, and different information may be carried in a data unit header according to slices.

num_octree_layers_in_scalable_layer may indicate the number of octree layers included in or corresponding to a layer constituting scalable transmission. When the scalable layer is not configured based on the octree, it may refer to a corresponding layer.

tree_depth_start may indicate a starting octree depth (relatively closest to the root) among octree layers included in or corresponding to a layer constituting scalable transmission.

tree_depth_end may indicate the last octree depth (relatively closest to the leaf) among the octree layers included in or corresponding to a layer constituting scalable transmission.

node_size may indicate the node size of the output point cloud data when the scalable layer is reconstructed through scalable transmission. For example, when node_size equal to 1 may indicate the leaf node. Although the embodiments assume that the XYZ node size is constant, an arbitrary node size may be indicated by signaling the size in the XYZ directions or each direction in transformation coordinates such as (r(radius), phi, theta).

num_nodes may indicate the number of nodes included in the corresponding scalable layer.

num_slices_in_scalable_layer may indicate the number of slices belonging to the scalable layer.

slice_id specifies an indicator for distinguishing a slice or a data unit, and may deliver an indicator for a data unit belonging to the scalable layer.

aligned_slice_structure_enabled_flag: When equal to 1, it may indicate that the attribute scalable layer structure and/or slice configuration matches the geometry scalable layer structure and/or slice configuration. In this case, information on the attribute scalable layer structure and/or slice configuration may be identified through the information on the geometry scalable layer structure and/or slice configuration. That is, the geometry layer/slice structure is the same as the attribute layer/slice structure.

slice_id_offset may indicate an offset for obtaining an attribute slice or data unit based on the geometry slice_id. According to embodiments, when aligned_slice_structure_enabled_flag is 1, that is, when the attribute slice structure matches the geometry slice structure, the attribute slice_id may be obtained based on the geometry slice_id as follows.

Slice_id (attr)=slice_id(geom)+slice_id_offset

In this case, the values provided in the geometry parameter set may be used for num_scalable_layers, scalable_layer_id tree_depth_start, tree_depth_end, node_size, num_nodes, and num_slices_in_scalable_layer, which are variables for configuring the attribute slice structure.

corresponding_geom_scalable_layer may indicate a geometry scalable layer corresponding to the attribute scalable layer structure.

num_tree_depth_in_data_unit may indicate a tree depth in which nodes belonging to a data unit are included.

tree_depth may indicate a tree depth.

num_nodes may indicate the number of nodes belonging to tree_depth among the nodes belonging to the data unit.

aligned_geom_data_unit_id may indicate a geometry data unit ID when the attribute data unit conforms to the scalable transmission layer structure/slice structure of the corresponding geometry data unit.

ref_slice_id may be used to refer to a slice that should precede the current slice for decoding (see, for example, FIGS. 18A to 20C).

Figure 26A:
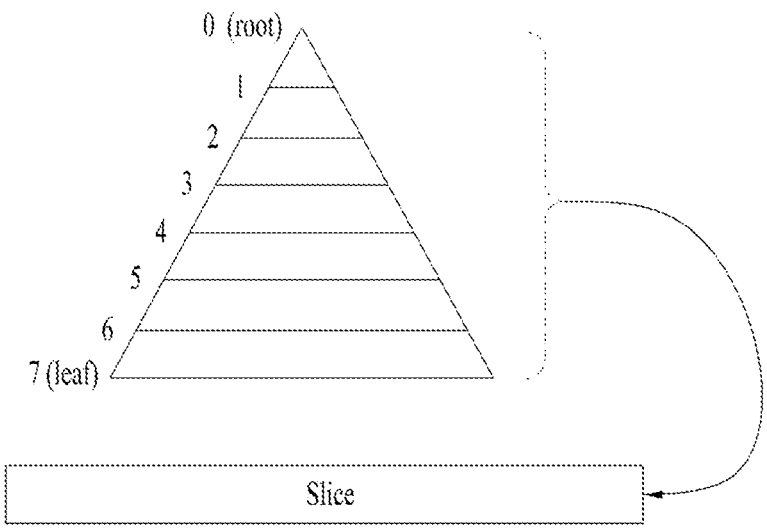
FIGS. 26A and 26B show a single slice-based geometry tree structure and a segmented slice-based geometry tree structure according to embodiments.
Figure 26B:
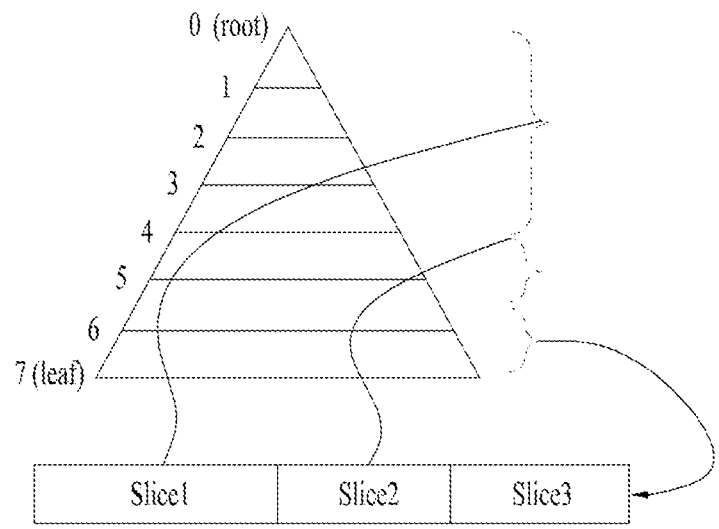

FIGS. 26A and 26B show a single slice-based geometry tree structure and a segmented slice-based geometry tree structure according to embodiments.

The method/device according to the embodiments may configure slices for transmitting point cloud data as shown in FIGS. 26A and 26B.

FIGS. 26A and 26B show a geometry tree structure contained in different slice structures. According to G-PCC technology, the entire coded bitstream may be included in a single slice. For multiple slices, each slice may contain a sub-bitstream. The order of the slices may be the same as the order of the sub-bitstreams. The bitstreams may be accumulated in breadth-first order of the geometry tree, and each slice may be matched to a group of tree layers (see FIGS. 26A and 26B). The segmented slices may inherit the layering structure of the G-PCC bitstream.

Slices may not affect previous slices, just as a higher layer does not affect lower layers in the geometry tree.

The segmented slices according to the embodiments are effective in terms of error robustness, effective transmission, support of region of interest, and the like.

1) Error Resilience

Compared to a single slice structure, a segmented slice may be more resilient to errors. When a slice contains the entire bitstream of a frame, data loss may affect the entire frame data. On the other hand, when the bitstream is segmented into multiple slices, some slices that are not affected by the loss even may be decoded even when some other slices are lost.

2) Scalable Transmission

Multiple decoders having different capabilities may be supported. When coded data is in a single slice, the LOD of the coded point cloud may be determined prior to encoding. Accordingly, multiple pre-encoded bitstreams having different resolutions of the point cloud data may be independently transmitted. This may be inefficient in terms of large bandwidth or storage space.

When a PCC bitstream is generated and included in segmented slices, the single bitstream may support decoders of different levels. From the decoder perspective, the receiver may select target layers and may deliver the partially selected bitstream to the decoder. Similarly, by using a single PCC bitstream without partitioning the entire bitstream, a partial PCC bitstream may be efficiently generated at the transmitter side.

3) Region Based Spatial Scalability

Regarding the G-PCC requirement, region based spatial scalability may be defined as follows. A compressed bitstream may be configured to have one or more layers. A particular region of interest may have a high density with additional layers, and the layers may be predicted from lower layers.

To support this requirement, it is necessary to support different detailed representations of a region. For example, in a VR/AR application, a distant object may be represented with low accuracy and a nearby object may be represented with high accuracy. Alternatively, the decoder may increase the resolution of the region of interest according to a request. This operation may be implemented using the scalable structure of G-PCC, such as the geometry octree and scalable attribute coding scheme. Decoders should access the entire bitstream based on the current slice structure including the entire geometry or attributes. This may lead to inefficiency in terms of bandwidth, memory, and decoder. On the other hand, when the bitstream is segmented into multiple slices, and each slice includes sub-bitstreams according to scalable layers, the decoder according to the embodiments may select slices as needed before efficiently parsing the bitstream.

Figures 27A, 27B:
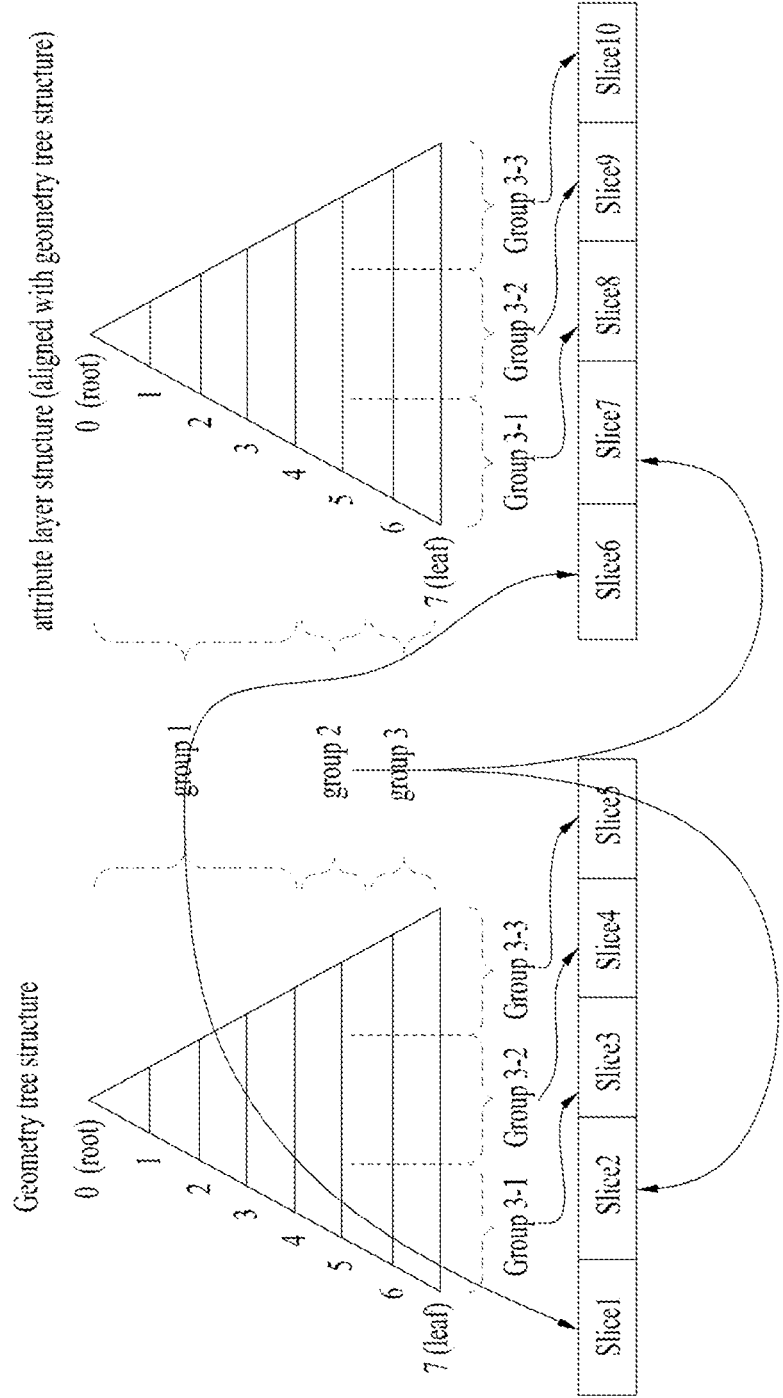
FIGS. 27A and 27B show a layer group structure of a geometry coding tree and an aligned layer group structure of an attribute coding tree according to embodiments.

FIGS. 27A and 27B show a layer group structure of a geometry coding tree and an aligned layer group structure of an attribute coding tree according to embodiments.

The method/device according to the embodiments may generate a slice layer group using the hierarchical structure of point cloud data as shown in FIGS. 27A and 27B.

The method/device according to the embodiments may apply segmentation of geometry and attribute bitstreams included in different slices. In addition, from the perspective of tree depth, a coding tree structure of geometry and attribute coding and each slice included in the partial tree information may be used.

FIG. 27A shows an example of a geometry tree structure and a proposed slice segments.

For example, 8 layers may be configured in an octree, and 5 slices may be used to contain sub-bitstreams of one or more layers. A group represents a group of geometry tree layers. For example, group 1 includes layers 0 to 4, group 2 includes layer 5, and group 3 includes layers 6 and 7. Also, a group may be divided into three subgroups. Parent and child pairs exist in each subgroup. Groups 3-1 to 3-3 are subgroups of group 3. When scalable attribute coding is used, the tree structure is identical to the geometry tree structure. The same octree-slice mapping may be used to create attribute slice segments (FIG. 27B).

A layer group represents a bundle of layer structure units generated in G-PCC coding, such as an octree layer and a LoD layer.

A subgroup may represent a set of neighboring nodes based on position information for one layer group. Alternatively, a set of neighbor nodes may be configured based on the lowest layer (which may be the layer closest to the root side, and may be layer 6 in the case of group 3 in FIGS. 27A and 27B) in the layer group, may be configured by Morton code order, may be configured based on distance, or may be configured according to coding order. Additionally, a rule may be defined such that nodes having a parent-child relationship are present in the same subgroup.

When a subgroup is defined, a boundary may be formed in the middle of a layer. Regarding whether continuity is maintained at the boundary, sps_entropy_continuation_enabled_flag, gsh_entropy_continuation_flag, and the like may be used to indicate whether entropy is used continuously, and ref_slice_id may be provided. Thereby, a continuation from the previous slice may be maintained.

Figures 28A, 28B:
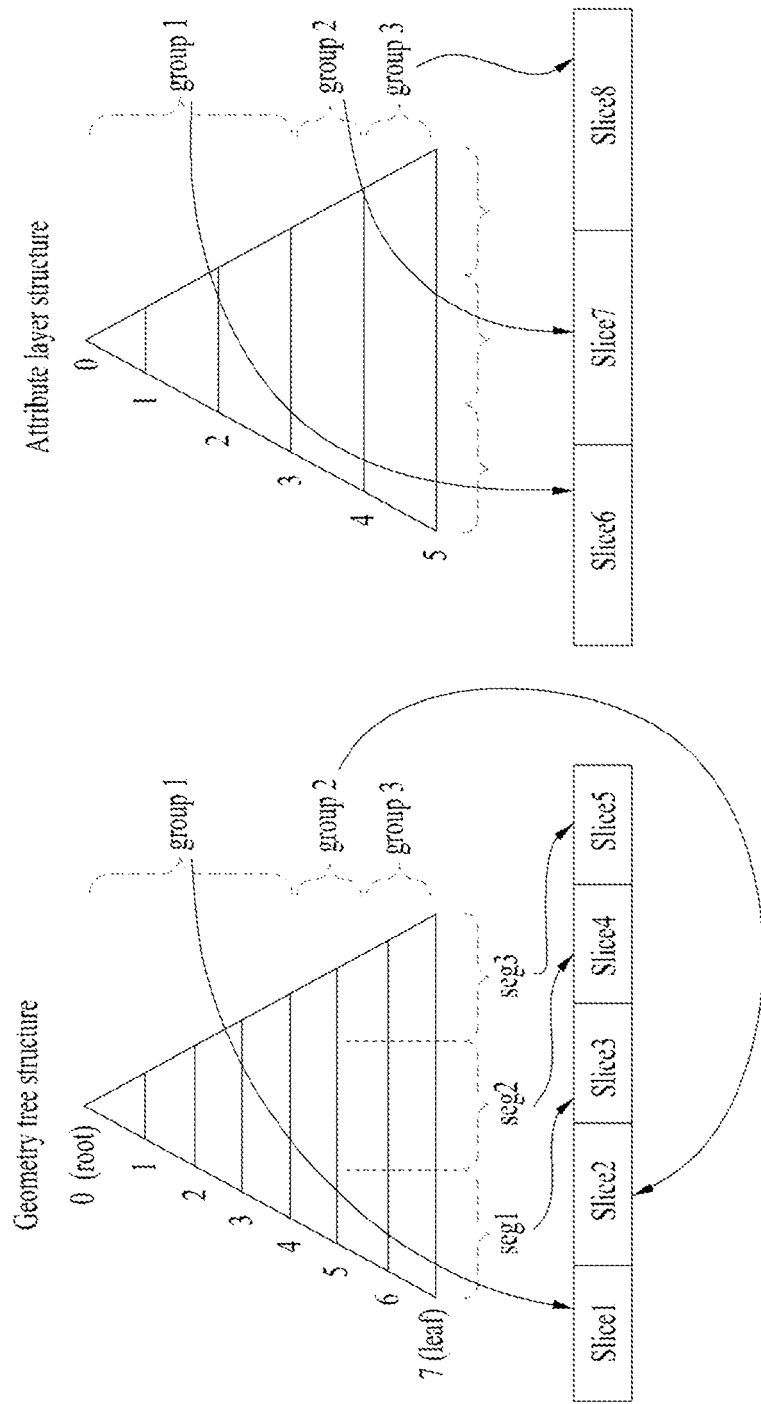
FIGS. 28A and 28B show a layer group of a geometry tree and an independent layer group structure of an attribute coding tree according to embodiments.

FIGS. 28A and 28B show a layer group of a geometry tree and an independent layer group structure of an attribute coding tree according to embodiments.

The method/device according to the embodiments may generate geometry-based slice layers and attribute-based slice layers as shown in FIGS. 28A and 28B.

The attribute coding layer may have a structure different from that of the geometry coding tree. Referring to FIG. 28B, groups may be defined independently of the geometry tree structure.

For efficient use of the layered structure of the G-PCC, segmentation of slices paired with the geometry and attribute layered structure may be provided.

For the geometry slice segments, each slice segment may contain coded data from a layer group. Here, the layer group is defined as a group of consecutive tree layers, the start and end depths of the tree layers may be a specific number in the tree depth, and the start depth is less than the end depth.

For the attribute slice segments, each slice segment may contain coded data from a layer group. Here, the layers may be tree depths or LODs according to an attribute coding scheme.

The order of the coded data in the slice segments may be the same as the order of the coded data in a single slice.

As parameter sets included in the bitstream, the following may be provided.

In the geometry parameter sets, a layer group structure corresponding to the geometry tree layers needs to be described by, for example, the number of groups, the group identifier, the number of tree depth(s) in the group, and the number of subgroup(s) in the group.

In the attribute parameter sets, indication information indicating whether the slice structure is aligned with the geometry slice structure is necessary. The number of groups, the group identifier, the number of tree depth(s), and the number of segment(s) are defined to describe the layer group structure.

The following elements are defined in the slice headers.

In the geometry slice header, a group identifier, a subgroup_identifier, and the like may be defined to identify the group and subgroups of each slice.

In the attribute slice header, when the attribute layer structure is not aligned with the geometry group, it is necessary to identify the group and subgroups of each slice.

FIG. 29 shows syntax of parameter sets according to embodiments.

The syntax of FIG. 29 may be included together with parameter information of FIGS. 22 to 25 in the bitstream of FIG. 21.

num_layer_groups_minus1 plus 1 specifies the number of layer groups where the layer group represents a group of consecutive tree layers that are part of the geometry or attribute coding tree structure.

layer_group_id specifies the layer_group_identifier of the i-th layer group.

num_tree_depth_minus1 plus 1 specifies the number of tree depths contained in the i-th layer group.

num_subgroups_minus1 plus 1 specifies the number of subgroups in the i-th layer group.

aligned_layer_group_structure_flag_equal to 1 specifies that the layer group and subgroup structure of the attribute slices is identical to the geometry layer group and subgroup structure. aligned_layer_group_structure_flag_equal to 0 specifies that the layer group and subgroup structure of the attribute slices is not identical to the geometry layer group and subgroup structure.

geom_parameter_set_id specifies the geometry parameter set identifier that contains the layer group and subgroup structure information that is aligned with the attribute layer group structure.

FIG. 30 shows a geometry data unit header according to embodiments.

The header of FIG. 30 may be included together with parameter information of FIGS. 22 to 25 in the bitstream of FIG. 21.

subgroup_id specifies an indicator of a subgroup in a layer group indicated by layer_group_id. The range of subgroup_id may be 0 to num_subgroups_minus1.

layer_group_id and subgroup_id may be used to indicate the order of slices, and may be used to sort the slices in bitstream order.

The transmission method/device and the encoder according to the embodiments may transmit the point cloud data by dividing the point cloud data into units for transmission. Through the bitstream generator, the data may be divided and packed into units (FIGS. 33 to 35) suitable for selecting necessary information in a bitstream unit according to the layered structure information.

Figure 33:
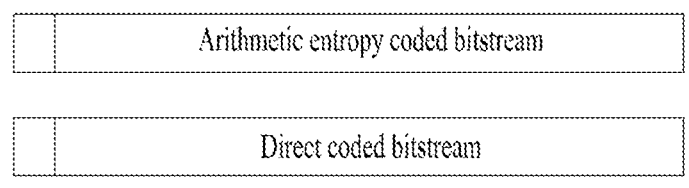
FIG. 33 illustrates an example of an arithmetic entropy coded (AEC) bitstream and a direct coded (DC) bitstream according to embodiments.
Figure 34:
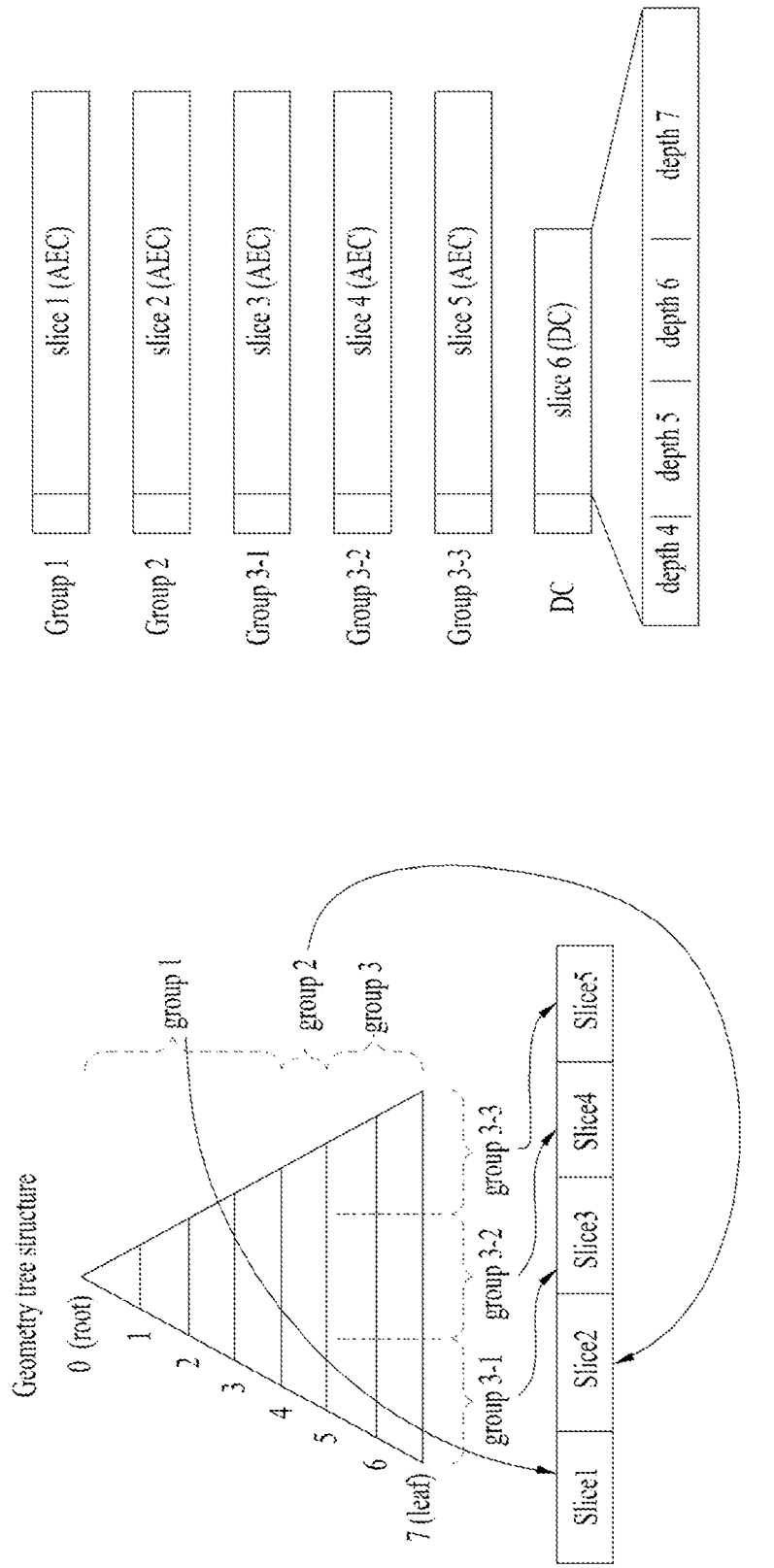
FIG. 34 shows an example of a geometry tree structure and slice segments and an example of multiple AEC slices and one DC slice according to embodiments.
Figure 35:
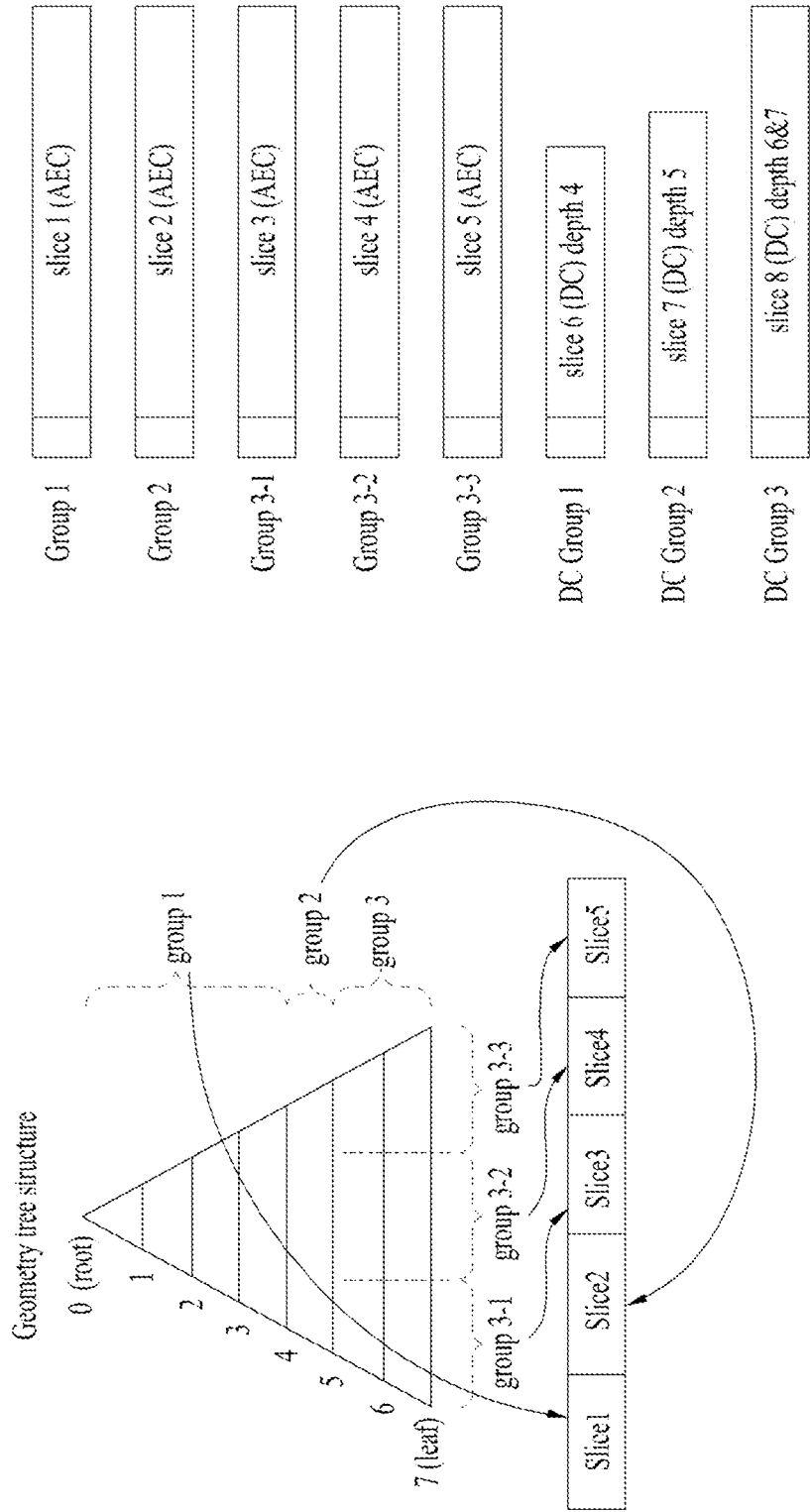
FIG. 35 shows an example of a geometry tree structure and slice segments and an example of AEC slices and DC slices according to embodiments.

The reception method/device and decoder according to the embodiments may reconstruct geometry data and attribute data based on the bitstream layer (FIGS. 33 to 35).

In this case, the sub-bitstream classifier may deliver appropriate data to the decoder based on the information in the bitstream header. Alternatively, in this process, a layer required by the receiver may be selected.

Based on the slice layering bitstream of FIGS. 26A to 28B, a geometry slice and/or an attribute slice may be selected with reference to necessary parameter information, and then decoded and rendered.

Based on the embodiments of FIGS. 26A to 28B, compressed data may be divided and transmitted according to layers, and only a necessary part of the pre-compressed data may be selectively transmitted in the bitstream stage without a separate transcoding process. This scheme may be efficient in terms of storage space as only one storage space per stream is required. It also enables efficient transmission in terms of (bitstream selector) bandwidth because only the necessary layers are selected before transmission.

In addition, the reception method/device according to the embodiments may receive the bitstream on a slice-by-slice basis, and the receiver may selectively transmit the bitstream to the decoder according to the density of point cloud data to be represented according to decoder performance or application field. In this case, since selection is made before decoding, decoder efficiency may be increased, and decoders of various performances may be supported.

Figure 31:
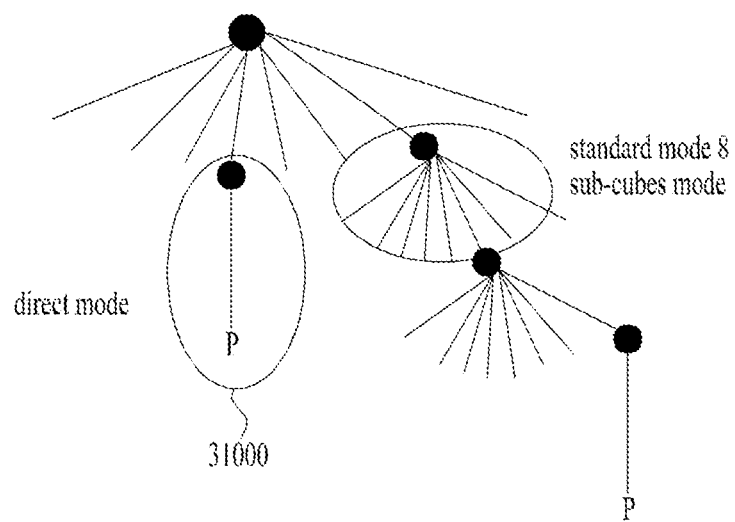
FIG. 31 illustrates an example of combining a tree coding mode and a direct coding mode according to embodiments.

FIG. 31 illustrates an example of combining a tree coding mode and a direct coding mode according to embodiments.

That is, when octree-based compression is performed, the positions of points present at similar positions may be represented in a bundle, and therefore the number of required bits may be reduced. However, as shown in FIG. 31, when there is no sibling node among the descendent nodes of an occupied node (31000), the octree-based compression may not have a significant effect. Accordingly, in this case, by performing direct coding of the node (i.e., point) 31000 in a direct mode, coding efficiency and compression speed may be improved.

That is, referring to the octree structure, a maximum of 8 descendent nodes may be provided based on the current point (node). The 8 descendent nodes may include an occupied node and/or unoccupied nodes.

If there are no descendent nodes and/or sibling nodes based on the current point, it is highly likely that similar neighbor points are not present. Accordingly, a residual value is generated by generating an expected value between nodes (points), the residual may become large, the accuracy may be lowered, or latency may occur. In this case, the position value of the point may be transmitted by direct coding of the point (e.g., 31000 in FIG. 31).

As a method to determine whether the direct coding is performed, the method/device according to the embodiments may determine use of the direct coding based on a relationship with neighbor nodes as follows. That is, the direct compression method may be operated when the following specific conditions are satisfied.

1) Condition for parent-based eligibility: Only the current node is an occupied child from the perspective of the parent node of the current node (point), and there is at most one occupied child (i.e., occupied sibling of the parent) (i.e., there are 2 occupied children) from the perspective of the parent (grand-parent) of the parent.

2) Condition for 6N eligibility: From the perspective of the parent node, only the current node is an occupied child, and 6 neighbors (nodes contacting face to face) are unoccupied.

For example, in this case, it may be determined that direct coding is available. In this case, only when the number of included points is less than or equal to a threshold, the inferred direct coding mode (IDCM) may be applied. When the IDCM is executed, information indicating that the IDCM is executed, the number of points, and information indicating the XYZ values of the point positions (that is, the portion corresponding to the remaining depths that are not octree-coded) may be included in at least one of the parameter sets and delivered to the reception device.

Figure 32:
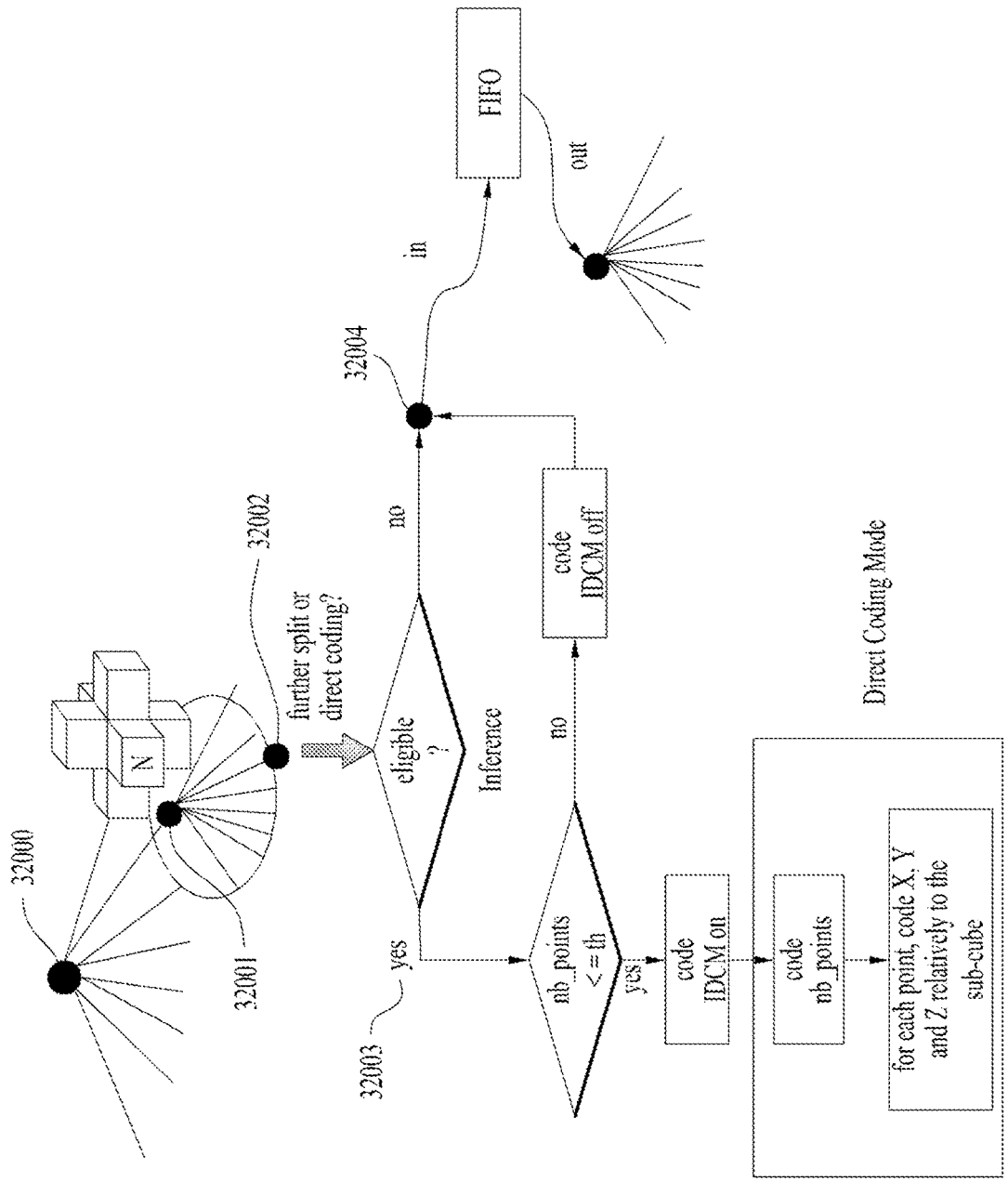
FIG. 32 shows an overview of an inferred direct coding mode (IDCM) according to embodiments.

FIG. 32 shows an overview of the IDCM according to embodiments.

Figures 39A, 39B:
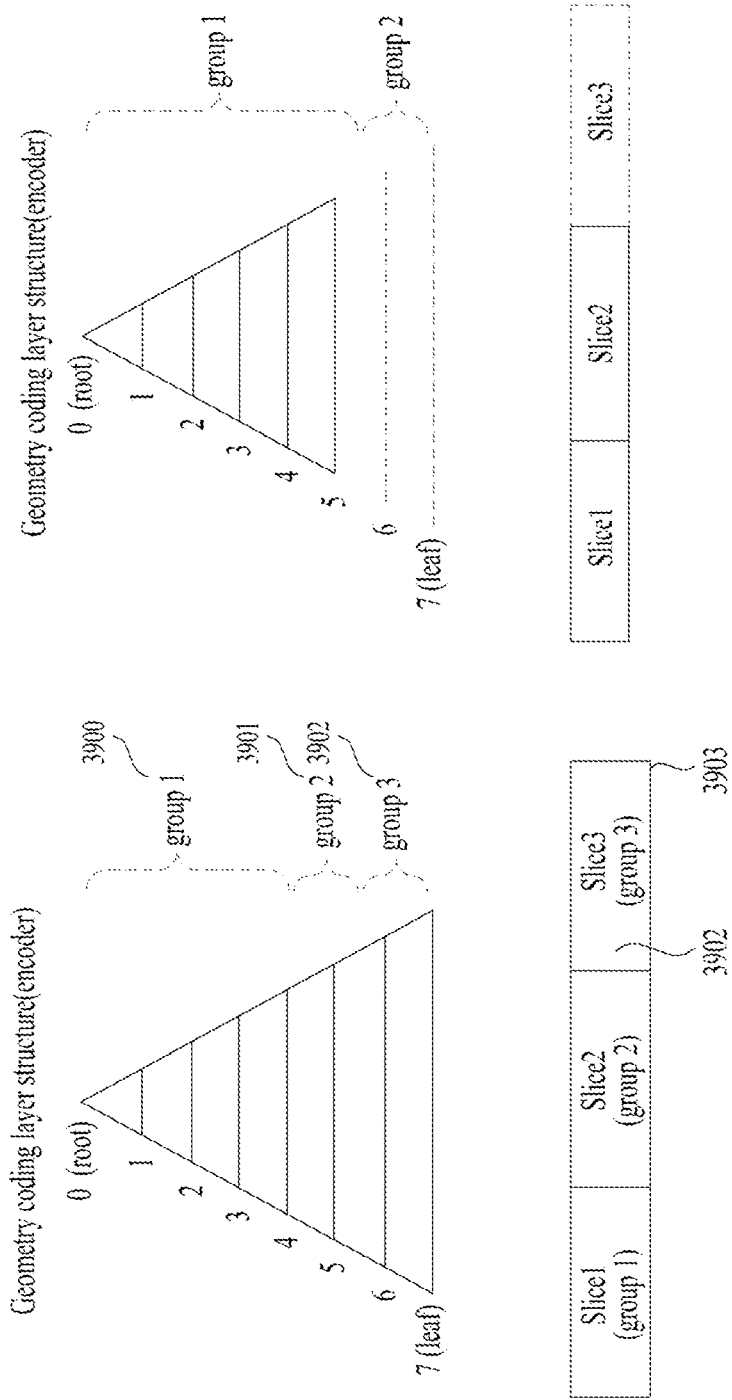
FIGS. 39A and 39B illustrate a geometry coding layer structure according to embodiments.

The direct compression operation according to the embodiments may be performed by one or more processors or integrated circuits configured to communicate with the transmission device 10000 of FIG. 1, the point cloud video encoder 10002 of FIG. 1, the encoding of FIG. 2, the point cloud video encoder of FIG. 4, the transmission device of FIG. 12, the device of FIG. 14, the point cloud data transmission device of FIGS. 39A and 39B, or one or more memories corresponding thereto. The one or more memories may store programs for processing/controlling the operations according to the embodiments. Each component of the point cloud transmission device/method according to the embodiments may be implemented in hardware, software, processor, and/or a combination thereof. The one or more processors may control various operations described herein. The processor may be referred to as a controller or the like. In some embodiments, operations may be performed by firmware, software, and/or a combination thereof. The firmware, software, and/or a combination thereof may be stored in a processor or a memory.

The direct decompression operation according to the embodiments may be performed by one or more processors or integrated circuits configured to communicate with the reception device 10004 of FIG. 1, the point cloud video decoder 10006 of FIG. 1, the decoding of FIG. 2, the decoder of FIG. 10, the decoder of FIG. 11, the reception device of FIG. 13, the device of FIG. 14, the point cloud data reception device of FIG. 50, or one or more memories corresponding thereto. The one or more memories may store programs for processing/controlling the operations according to the embodiments. Each component of the point cloud reception device/method according to the embodiments may be implemented by hardware, software, a processor, and/or a combination thereof. The one or more processors may control various operations described herein. The processor may be referred to as a controller or the like. In some embodiments, operations may be performed by firmware, software, and/or a combination thereof. The firmware, software, and/or a combination thereof may be stored in a processor or a memory.

Referring to FIG. 32 as an example, a parent node 32000 may have up to 8 children according to the distribution of points, and a specific child 32001 may further have a child 32002. In this case, the child 32001 is the parent node of the child 32002. In addition, it may be determined whether to additionally perform octree splitting and prediction coding or direct mode coding at the child 32002.

When it is determined that direct mode coding is available (32003), it is checked whether the number of neighbor nodes (neighbor points) for the point 32002 is less than or equal to a threshold th. When the number of neighbor nodes (neighbor points) for the point 32002 is less than or equal to the threshold th, the direct mode may be enabled. In addition, x, y, and z coordinate information for position values may be directly coded for each of the one or more points. According to embodiments, the position values may be represented based on a sub-cube for the octree.

In another embodiment, when the number of neighbor nodes (neighbor points) for the point 32002 exceeds the threshold th, the compression efficiency of prediction coding may be higher than that of direct coding, and thus the direct mode is disabled and the node may be further split to generate an octree. That is, when it is determined that the direct mode coding is not available (32004), the octree may be additionally split into octree-based sub-cubes based on the point.

As described above, when direct compression is performed, the x, y, and z position information of the current depth or less is directly transmitted to the reception device. In this case, each independent position information is compressed, and therefore the compression efficiency may not be high even when arithmetic entropy compression is used.

Therefore, in this case, the transmission device/method may perform direct compression (or referred to as coding) on the x, y, and z values. In this case, the direct coded bitstream (FIG. 33) may be transmitted independently of an arithmetic entropy coded bitstream (FIG. 33).

FIG. 33 illustrates an example of an arithmetic entropy coded (AEC) bitstream and a direct coded (DC) bitstream according to embodiments.

When the geometry tree structure is divided into layer group(s) and/or subgroup(s) for scalable transmission, slices may be configured by dividing the AEC bitstream according to each layer group and/or subgroup. In one embodiment, when multiple slices are configured, each slice includes a part of the AEC bitstream, that is, an AEC sub-bitstream. In addition, a separate slice may be configured for the DC bitstream. In this case, the type of a bitstream included in each slice may be divided into an AEC bitstream and a DC bitstream. Accordingly, when geometry partial decoding is performed, the reception device may select a slice including a required AEC bitstream, and select information on a DC point of a required depth among slices including a DC bitstream.

In the present disclosure, for simplicity, a slice including an AEC bitstream will be referred to as an AEC slice, and a slice including a DC bitstream will be referred to as a DC slice.

FIG. 34 shows an example of a geometry tree structure and slice segments and an example of multiple AEC slices and one DC slice according to embodiments.

That is, the DC bitstream is carried in one slice.

FIG. 34 illustrates a case where position compression is performed based on 7 octree depths. In this case, the geometry tree structure (i.e., the octree structure) has 3 groups and is divided into a total of 5 layer groups (e.g., one of the 3 groups is again divided into 3 subgroups), and the AEC bitstreams of the 5 layer groups are included in 5 slices (e.g., slice 1 to slice 5), respectively. In this case, when direct compression is used, the DC bitstream may be transmitted in a separate slice (e.g., slice 6). According to embodiments, DC bitstreams included in slice 6 may be sequentially transmitted according to the octree depth. Referring to FIG. 34-(b) as an example, a DC bitstream of depth 4, a DC bitstream of depth 5, a DC bitstream of depth 6, and a DC bitstream of depth 7 are included slice 6 in this order. This example corresponds to a case where direct coding is performed starting at depth 4.

When the reception device uses only information about depths up to octree depth 5 (i.e., group 2), the reception device may select slices 1 and 2 to reconstruct the AEC bitstream corresponding to octree depth 5 through the AEC decoder. Additionally, the reception device may select slice 6, and reselect DC bitstreams corresponding to depths 4 and 5 in slice 6 to reconstruct the bitstreams through a DC decoder. That is, the reception device may independently reconstruct the positions of direct-compressed points through the DC decoder.

In this case, the DC decoder may select and use only required information for a corresponding layer from the x, y, and z position information.

In the example below, the octree depth A is an octree depth at which direct coding is performed, and the octree depth B is an octree depth after the octree depth A and may be a value obtained by subtracting the octree depth A from the full octree depth N. That is, when it is defined that octree depth B=octree depth (N-A), the position of the DC compressed leaf node may be defined as the DC position at the AEC occupied node position before DC as shown in Equation 5 below. That is, when direct coding is performed, if a preset condition is satisfied while performing coding toward the leaf node by octree coding, direct coding is performed. In the example of Equation 5, when the depth at which direct coding starts is depth B, the final node position is obtained by concatenating the position of the previous depth (e.g., depth A, octree-coded depth) with respect to depth B to the direct coded position. In other words, it is an expression to find the position when decoding is fully performed.

Leaf node position(xor yor z)=occupied node position(from AEC bitstream of upper layer) at octree depth$A$<<octree depth$B$+$DC$ position after octree depth$A$ [Equation 5]

In Equation 5, "occupied node position at octree depth A<<octree depth B" means that the "occupied node position at octree depth A" should be bit-shifted to the left by "octree depth B."

In addition, when octree depth C is an octree depth targeted in partial decoding (where octree depth C<Full octree depth N, and octree depth C>octree depth A), if partial geometry decoding is performed, the position of the point/node may be defined as in Equation 6 below.

Partially decoded node position(xor yor z) at octree depth$C$=occupied node position(from AEC) at octree depth$A$<<octree depth$(C-A)$+$DC$ position after octree depth$A$>>octree depth$(B-(C-A))$ [Equation 6]

Equation 6 is an application of Equation 5. That is, since the position changes when partial decoding is performed. The position changed at this time is obtained in this equation.

For example, a DC position is added after a position that is decoded with the octree. In this case, a node (or depth) lost by partial decoding is taken into consideration in this equation. Considering the depth lost due to partial decoding, the positions of depths excluding this part are shifted and concatenated.

FIG. 35 shows an example of a geometry tree structure and slice segments and an example of AEC slices and DC slices according to embodiments.

That is, FIG. 35 illustrates another method for transmitting a DC bitstream. In this example, a DC bitstream is divided by octree depths and each divided DC bitstream is transmitted through each slice. That is, as many slices for DC as the number of divided DC bitstreams are segmented.

In this example, a DC bitstream is divided into three DC groups. The DC groups may be divided according to layer groups. For example, when the geometry tree structure is divided into three layer groups (group1, group2, and group3), the DC bitstream is also divided into three DC groups (DC group1, DC group2, and DC group3). Subgroups are not applied to the DC bitstream in this example. However, in an application field, subgroups may also be divided in the same manner. In this case, DC group 3 may be further divided into three DC groups, that is, DC group 3-1, DC group 3-2, and DC group 3-3 (i.e., three DC subgroups). According to embodiments, the DC bitstreams of the three DC groups (DC group1, DC group2, and DC group3) are transmitted in three slices (slice 6 to slice 8), respectively. In this example, a DC bitstream of depth 4 (i.e., DC group 1) is included in slice 6, a DC bitstream of depth 5 (i.e., DC group 2) is included in slice 7, and a DC bitstream of depths 6 and 7 (i.e., DC group 3) is included in slice 8.

Alternatively, the criterion for dividing the DC bitstream into groups and the criterion for dividing the AEC bitstream into groups may be separately applied according to the application field.

When the reception device decodes only information up to octree depth 5, it may select slices 1 and 2, and perform AEC decoding (i.e., reconstruction) on the AEC bitstreams included in slices 1 and 2 through the AEC decoder, and may perform DC decoding (i.e., reconstruction) on the DC bitstreams included in slice 6, 7 through the DC decoder.

In this case, to allow the reception device to select a DC slice according to the octree depth, layer-group or octree depth information of a bitstream included in each DC slice may be transmitted to the reception device.

Figure 36:
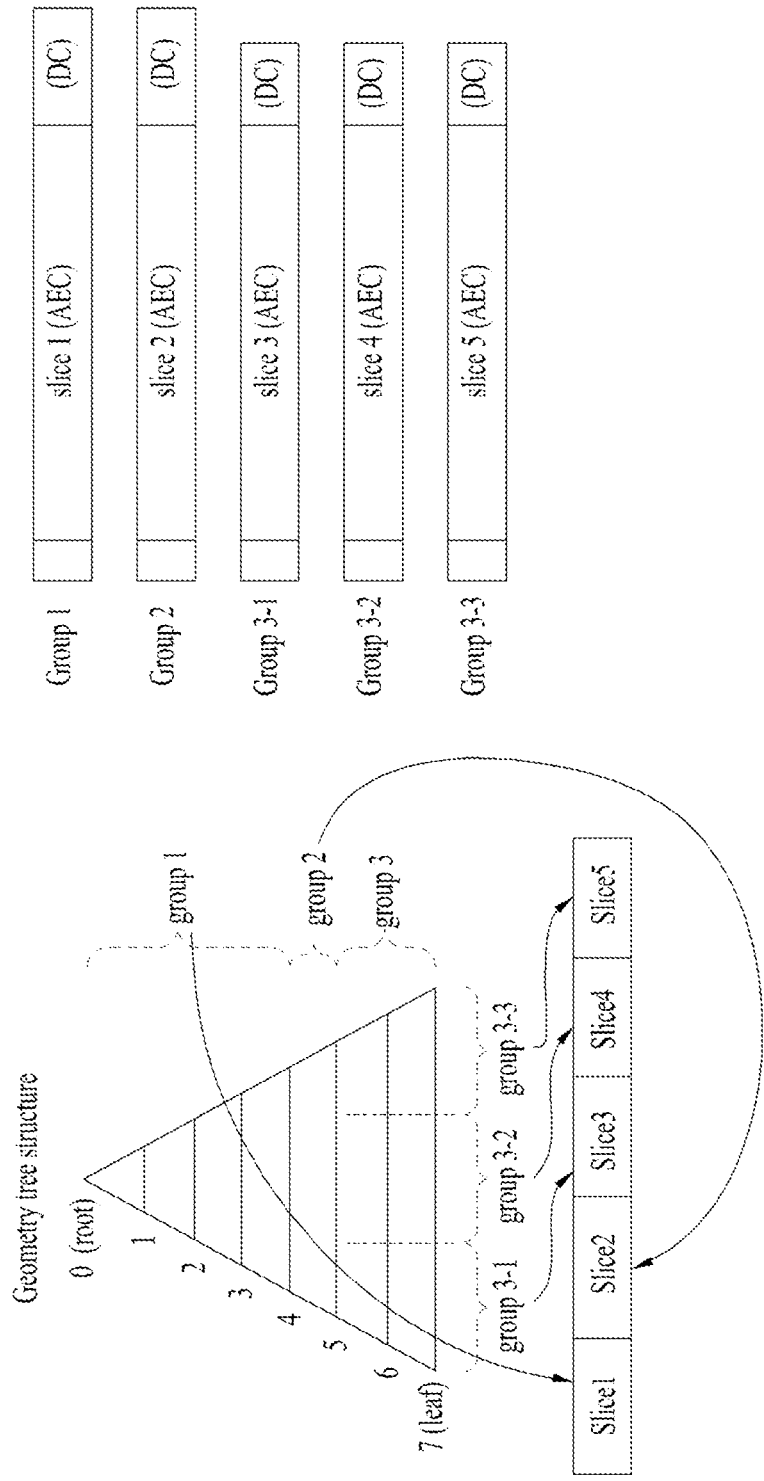
FIG. 36 shows an example of a geometry tree structure and slice segments and an example of AEC slices and DC slices according to embodiments.

FIG. 36 shows an example of a geometry tree structure and slice segments and an example of AEC slices and DC slices according to embodiments.

That is, FIG. 36 illustrates another method for transmitting a DC bitstream. In the illustrated example, an AEC bitstream and a DC bitstream matched to each other according to an octree depth are transmitted together through the same slice. In this case, in an embodiment, the criterion for dividing the AEC bitstream is the same as the criterion for dividing the DC bitstream. For example, the same layer-group partitioning method is used to divide the AEC bitstream and the DC bitstream.

When the reception device uses only information up to octree depth 5, slices 1 and 2 are selected. Slices 1 and 2 include an AEC bitstream and a DC bitstream belonging to group 1. Therefore, when slices 1 and 2 are selected, the AEC bitstream included in slices 1 and 2 may be subjected to AEC decoding through the AEC decoder, and the DC bitstream may be subjected to DC decoding through the DC decoder. In other words, in the case where the reception device uses octree depths only up to octree depth 5, slices 1 and 2 only need to be selected based on the layer-group information regardless of the AEC/DC bitstream_type. Accordingly, the slice selection process may be operated more efficiently.

While a method of including different geometry coding bitstreams in one slice is described in the present disclosure, the same method may be applied to an application field where different attribute coding bitstreams are included in one slice, or a geometry coding bitstream and an attribute bitstream are included in one slice. In this case, different types of bitstreams may have different layer-groups. Alternatively, different types of bitstreams may have the same layer-group structure. In this case, they may be efficiently used in application fields such as scalable transmission and spatial scalability.

FIG. 21 shows an exemplary bitstream structure of point cloud data for transmission/reception according to embodiments. According to embodiments, the bitstream output from the point cloud video encoder of any one of FIGS. 1, 2, 4, and 12 may take the form shown in FIG. 21.

According to embodiments, the bitstream of the point cloud data provides tiles or slices such that the point cloud data may be divided into regions and processed. The regions of the bitstream may have different importance levels. Accordingly, when the point cloud data is partitioned into tiles, different filters (encoding methods) or different filter units may be applied to the respective tiles. When the point cloud data is partitioned into slices, different filters or different filter units may be applied to the respective slices.

When the point cloud data is compressed by partitioning the data into regions, the transmission device and the reception device according to the embodiments may transmit and receive a bitstream in a high-level syntax structure for selective transmission of attribute information in the partitioned regions.

By transmitting the point cloud data according to the bitstream structure as shown in FIG. 21, the transmission device according to the embodiments may allow the encoding operation to be applied differently according to the importance level, and allow a good-quality encoding method to be used in an important region. In addition, it may support efficient encoding and transmission according to the characteristics of the point cloud data and provide attribute values according to user requirements.

As the the reception device according to the embodiments receives the point cloud data according to the bitstream structure as shown in FIG. 34, it may apply different filtering (decoding methods) to the respective regions (divided into tiles or slices) according to the processing capacity of the reception device, rather than using a complex decoding (filtering) method to the entire point cloud data. Thereby, a better image quality may be ensured for regions important to the user and appropriate latency may be ensured in the system.

When a geometry bitstream, an attribute bitstream, and/or a signaling bitstream (or signaling information) according to embodiments are configured in one bitstream (or G-PCC bitstream), the bitstream may include one or more sub-bitstreams. The bitstream according to the embodiments may include a sequence parameter set (SPS) for sequence-level signaling, a geometry parameter set (GPS) for signaling of geometry information coding, and one or more attribute parameter sets (APSs) (APS0, APS1) for signaling of attribute information coding, a tile inventory (or referred to as TPS) for tile-level signaling, and one or more slices (slice 0 to slice n). That is, the bitstream of point cloud data according to the embodiments may include one or more tiles. Each tile may be a slice group including one or more slices (slice 0 to slice n). The tile inventory (i.e., TPS) according to the embodiments may include information about each of one or more tiles (e.g., coordinate value information and height/size information about a tile bounding box). Each slice may include one geometry bitstream (Geom0) and/or one or more attribute bitstreams (Attr0, Attr1). For example, slice 0 may include one geometry bitstream Geom00 and one or more attribute bitstreams Attr00 and Attr10.

The geometry bitstream in each slice may be composed of a geometry slice header (geom_slice_header) and geometry slice data (geom_slice_data). According to embodiments, the geometry bitstream in each slice may be referred to as a geometry data unit, the geometry slice header may be referred to as a geometry data unit header, and the geometry slice data may be referred to as geometry data unit data.

Each attribute bitstream in each slice may be composed of an attribute slice header (attr_slice_header) and attribute slice data (attr_slice_data). According to embodiments, the attribute bitstream in each slice may be referred to as an attribute data unit, the attribute slice header may be referred to as an attribute data unit header, and the attribute slice data may be referred to as attribute data unit data.

According to embodiments, parameters required for encoding and/or decoding of point cloud data may be newly defined in parameter sets (e.g., SPS, GPS, APS, and TPS (or referred to as a tile inventory), etc.) of the point cloud data and/or the header of the corresponding slice. For example, they may be added to the GPS in encoding and/or decoding of geometry information, and may be added to the tile and/or slice header in tile-based encoding and/or decoding.

According to embodiments, information on segmented (separated) slices and/or information related to direct coding may be signaled in at least one of the SPS, the GPS, the APS, the TPS, or an SEI message. Also, the information on segmented (separated) slices and/or information related to direct coding may be signaled in at least one of the geometry slice header (or called a geometry data unit header) or the attribute slice header (or called an attribute data unit header).

According to embodiments, the information on segmented (separated) slices and/or information related to direct coding may be defined in a corresponding position or a separate position depending on an application or system such that the range and method to be applied may be used differently. A field, which is a term used in syntaxes that will be described later in the present disclosure, may have the same meaning as a parameter or a syntax element.

That is, the signal (i.e., the information on segmented (separated) slices and/or information related to direct coding) may have different meanings depending on the position where the signal is transmitted. If the signal is defined in the SPS, it may be equally applied to the entire sequence. If the signal is defined in the GPS, this may indicate that the signal is used for position reconstruction. If the signal is defined in the APS, this may indicate that the signal is applied to attribute reconstruction. If the signal is defined in the TPS, this may indicate that the signal is applied only to points within a tile. If the signal is delivered in a slice, this may indicate that the signal is applied only to the slice. In addition, when the fields (or referred to as syntax elements) are applicable to multiple point cloud data streams as well as the current point cloud data stream, they may be carried in a superordinate parameter set.

According to embodiments, parameters (which may be referred to as metadata, signaling information, or the like) may be generated by the metadata processor (or metadata generator), signaling processor, or processor of the transmission device, and transmitted to the reception device so as to be used in the decoding/reconstruction process. For example, the parameters generated and transmitted by the transmission device may be acquired by the metadata parser of the reception device.

In this embodiment, it has been described that information is defined independently of the coding technique. However, in other embodiments, the information may be defined in connection with the coding technique. In order to support regionally different scalability, the information may be defined in the tile parameter set. Alternatively, a network abstract layer (NAL) unit may be defined and relevant information (e.g., information about segmented (separated) slices and/or information related to direct coding) for selecting a layer, such as layer_id, may be delivered, such that a bitstream may be selected even at a system level.

FIG. 37 shows a sequence parameter set (SPS) (seq_parameter_set( )) and a geometry parameter set according to embodiments.

The parameter sets may be included in the bitstream of FIG. 21, and may be generated by an encoder and decoded by a decoder according to embodiments.

The SPS according to the embodiments may include a main_profile_compatibility_flag field, a unique_point_positions_constraint_flag field, a level_idc field, an sps_seq_parameter_set_id field, an sps_bounding_box_present_flag field, an sps_source_scale_factor_numerator_minus1 field, an sps_source_scale_factor_denominator_minus1 field, an sps_num_attribute_sets field, log 2_max_frame_idx field, an axis_coding_order field, an sps_bypass_stream_enabled_flag field, and an sps_extension_flag field.

The main_profile_compatibility_flag field may indicate whether the bitstream conforms to the main profile. For example, main_profile_compatibility_flag equal to 1 may indicate that the bitstream conforms to the main profile. For example, main_profile_compatibility_flag equal to 0 may indicate that the bitstream conforms to a profile other than the main profile.

When unique_point_positions_constraint_flag is equal to 1, in each point cloud frame that is referred to by the current SPS, all output points may have unique positions. When unique_point_positions_constraint_flag is equal to 0, in any point cloud frame that is referred to by the current SPS, two or more output points may have the same position. For example, even when all points are unique in the respective slices, slices in a frame and other points may overlap. In this case, unique_point_positions_constraint_flag is set to 0.

level_idc indicates a level to which the bitstream conforms.

sps_seq_parameter_set_id provides an identifier for the SPS for reference by other syntax elements.

The sps_bounding_box_present_flag field indicates whether a bounding box is present in the SPS. For example, sps_bounding_box_present_flag equal to 1 indicates that the bounding box is present in the SPS, and sps_bounding_box_present_flag equal to 0 indicates that the size of the bounding box is undefined.

According to embodiments, when sps_bounding_box_present_flag is equal to 1, the SPS may further include an sps_bounding_box_offset_x field, an sps_bounding_box_offset_y field, an sps_bounding_box_offset_z field, an sps_bounding_box_offset_log 2 scale field, an sps_bounding_box_size_width field, an sps_bounding_box_size_height field, and an sps_bounding_box_size_depth field.

sps_bounding_box_offset_x indicates the x offset of the source bounding box in Cartesian coordinates. When the x offset of the source bounding box is not present, the value of sps_bounding_box_offset_x is 0.

sps_bounding_box_offset_y indicates the y offset of the source bounding box in Cartesian coordinates. When the y offset of the source bounding box is not present, the value of sps_bounding_box_offset_y is 0.

sps_bounding_box_offset_z indicates the z offset of the source bounding box in Cartesian coordinates. When the z offset of the source bounding box is not present, the value of sps_bounding_box_offset_z is 0.

sps_bounding_box_offset_log 2 scale indicates a scale factor for scaling quantized x, y, and z source bounding box offsets.

sps_bounding_box_size_width indicates the width of the source bounding box in Cartesian coordinates. When the width of the source bounding box is not present, the value of sps_bounding_box_size_width may be 1.

sps_bounding_box_size_height indicates the height of the source bounding box in Cartesian coordinates. When the height of the source bounding box is not present, the value of sps_bounding_box_size_height may be 1.

sps_bounding_box_size_depth indicates the depth of the source bounding box in Cartesian coordinates. When the depth of the source bounding box is not present, the value of sps_bounding_box_size_depth may be 1.

sps_source_scale_factor_numerator_minus1 plus 1 indicates the scale factor numerator of the source point cloud.

sps_source_scale_factor_denominator_minus1 plus 1 indicates the scale factor denominator of the source point cloud.

sps_num_attribute_sets indicates the number of coded attributes in the bitstream.

The SPS according to the embodiments includes an iteration statement repeated as many times as the value of the sps_num_attribute_sets field. In an embodiment, i is initialized to 0, and is incremented by 1 each time the iteration statement is executed. The iteration statement is repeated until the value of i becomes equal to the value of the sps_num_attribute_sets field. The iteration statement may include an attribute_dimension_minus1[i] field and an attribute_instance_id[i] field. attribute_dimension_minus1[i] plus 1 indicates the number of components of the i-th attribute.

The attribute_instance_id[i] field specifies the instance ID of the i-th attribute.

According to embodiments, when the value of the attribute_dimension_minus1[i] field is greater than 1, the iteration statement may further include an attribute_secondary_bitdepth_minus1[i] field, an attribute_cicp_colour_primaries[i] field, an attribute_cicp_transfer_characteristics[i] field, an attribute_cicp_matrix_coeffs[i] field, and an attribute_cicp_video_full_range_flag[i] field.

attribute_secondary_bitdepth_minus1[i] plus 1 specifies the bitdepth for the secondary component of the i-th attribute signal(s).

attribute_cicp_colour_primaries[i] indicates the chromaticity coordinates of the color attribute source primaries of the i-th attribute.

attribute_cicp_transfer_characteristics[i] either indicates the reference opto-electronic transfer characteristic function of the color attribute as a function of a source input linear optical intensity with a nominal real-valued range of 0 to 1 or indicates the inverse of the reference electro-optical transfer characteristic function as a function of an output linear optical intensity attribute_cicp_matrix_coeffs[i] describes the matrix coefficients used in deriving luma and chroma signals from the green, blue, and red, or Y, Z, and X primaries of the i-th attribute.

attribute_cicp_video_full_range_flag[i] specifies the black level and range of the luma and chroma signals as derived from E'Y, E'PB, and E'PR or E'R, E'G, and E'B real-valued component signals of the i-th attribute.

The known_attribute_label_flag[i] field indicates whether a know_attribute_label[i] field or an attribute_label_four_bytes[i] field is signaled for the i-th attribute. For example, when known_attribute_label_flag[i] equal to 0 indicates the known_attribute_label[i] field is signaled for the i-th attribute. known_attribute_label_flag[i] equal to 1 indicates that the attribute_label_four_bytes[i] field is signaled for the i-th attribute.

known_attribute_label[i] specifies the type of the i-th attribute. For example, known_attribute_label[i] equal to 0 may specify that the i-th attribute is color. known_attribute_label[i] equal to 1 may specify that the i-th attribute is reflectance. known_attribute_label[i] equal to 2 may specify that the i-th attribute is frame index. Also, known_attribute_label[i] equal to 4 specifies that the i-th attribute is transparency. known_attribute_label[i] equal to 5 specifies that the i-th attribute is normals.

attribute_label_four_bytes[i] indicates the known attribute type with a 4-byte code.

According to embodiments, attribute_label_four_bytes[i] equal to 0 may indicate that the i-th attribute is color. attribute_label_four_bytes[i] equal to 1 may indicate that the i-th attribute is reflectance. attribute_label_four_bytes[i] equal to 2 may indicate that the i-th attribute is a frame index. attribute_label_four_bytes[i] equal to 4 may indicate that the i-th attribute is transparency. attribute_label_four_bytes[i] equal to 5 may indicate that the i-th attribute is normals.

log 2_max_frame_idx indicates the number of bits used to signal a syntax variable frame_idx.

axis_coding_order specifies the correspondence between the X, Y, and Z output axis labels and the three position components in the reconstructed point cloud RecPic [pointidx] [axis] with and axis=0.2.

sps_bypass_stream_enabled_flag equal to 1 specifies that the bypass coding mode may be used in reading the bitstream. As another example, sps_bypass_stream_enabled_flag equal to 0 specifies that the bypass coding mode is not used in reading the bitstream.

sps_extension_flag indicates whether the sps_extension_data syntax structure is present in the SPS syntax structure. For example, sps_extension_present_flag_equal to 1 indicates that the sps_extension_data syntax structure is present in the SPS syntax structure. sps_extension_present_flag_equal to 0 indicates that this syntax structure is not present.

When the value of the sps_extension_flag field is 1, the SPS according to the embodiments may further include an sps_extension_data_flag field.

sps_extension_data_flag may have any value.

FIG. 37 shows another embodiment of a syntax structure of the SPS (sequency_parameter_set( )) according to embodiments.

The SPS of FIG. 37 may further include a scalable_transmission_enable_flag field. scalable_transmission_enable_flag indicates whether a bitstream configuration is established to be suitable for scalable transmission. For example, scalable_transmission_enable_flag equal to 1 indicates that the bitstream configuration is established to be suitable for scalable transmission. That is, it may indicate that the geometry tree structure and/or attribute tree structure is composed of multiple slices, and thus information may be selected at the bitstream stage, indicate that information about segmented (separated) slices and/or information related to direct coding (e.g., scalable layer configuration information) is transmitted through the GPS, APS, TPS, slice header, SEI message, or the like to allow the transmission device or the reception device to perform slice selection, and indicate that geometry and/or attributes are compressed to enable partial decoding. That is, when the value of scalable_transmission_enable_flag is 1, the reception device or the transcoder of the reception device may identify that geometry and/or attribute scalable transmission is available, based on the value According to embodiments, the scalable_transmission_enable_flag field of FIG. 37 may be included in any position in the SPS of FIG. 37.

FIG. 37 shows an embodiment of a syntax structure of the GPS (geometry_parameter_set( )) according to the present disclosure. The GPS may include information on a method of encoding geometry information of point cloud data included in one or more slices.

According to embodiments, the GPS may include a gps_geom_parameter_set_id field, a gps_seq_parameter_set_id field, gps_box_present_flag field, a unique_geometry_points_flag field, a geometry_planar_mode_flag field, a geometry_angular_mode_flag field, a neighbour_context_restriction_flag field, a inferred_direct_coding_mode_enabled_flag field, a bitwise_occupancy_coding_flag field, an adjacent_child_contextualization_enabled_flag field, a log 2_neighbour_avail_boundary field, a log 2_intra_pred_max_node_size field, a log 2_trisoup_node_size field, a geom_scaling_enabled_flag field, a gp_implicit_geom_partition_flag field, and a gps_extension_flag field.

gps_geom_parameter_set_id provides an identifier for the GPS for reference by other syntax elements.

gps_seq_parameter_set_id specifies the value of sps_seq_parameter_set_id for the active SPS.

gps_box_present_flag indicates whether additional bounding box information is provided in a geometry slice header that references the current GPS. For example, gps_box_present_flag field equal to 1 may indicate that additional bounding box information is provided in the geometry slice header that references the current GPS. Accordingly, when the value of the gps_box_present_flag field is 1, the GPS may further include a gps_gsh_box_log 2_scale_present_flag field.

gps_gsh_box_log 2_scale_present_flag indicates whether gps_gsh_box_log 2 scale is signaled in each geometry slice header that references the current GPS. For example, gps_gsh_box_log 2_scale_present_flag_equal to 1 may indicate that gps_gsh_box_log 2 scale is signaled in each geometry slice header that references the current GPS. As another example, gps_gsh_box_log 2_scale_present_flag_equal to 0 may indicate that gps_gsh_box_log 2 scale is not signaled in each geometry slice header that references the current GPS, and that a common scale for all slices is signaled in the gps_gsh_box_log 2 scale field of the current GPS.

When the value of the gps_gsh_box_log 2_scale_present_flag field is 0, the GPS may further include a gps_gsh_box_log 2 scale field.

gps_gsh_box_log 2 scale indicates a common scale factor of the bounding box origin for all slices that references the current GPS.

unique_geometry_points_flag indicates whether all output points have unique positions in one slice in all slices currently referring to GPS. For example, unique_geometry_points_flag equal to 1 indicates that in all slices that refer to the current GPS, all output points have unique positions within a slice. unique_geometry_points_flag field equal to 0 indicates that in all slices that refer to the current GPS, the two or more of the output points may have same positions within a slice.

The geometry_planar_mode_flag field indicates whether the planar coding mode is activated. For example, geometry_planar_mode_flag equal to 1 indicates that the planar coding mode is active. geometry_planar_mode_flag equal to 0 indicates that the planar coding mode is not active.

When the value of the geometry_planar_mode_flag field is 1, that is, TRUE, the GPS may further include a geom_planar_mode_th_idcm field, a geom_planar_mode_th[1] field, and a geom_planar_mode_th[2] field.

The geom_planar_mode_th_idcm field may specify the value of the threshold of activation for the direct coding mode.

geom_planar_mode_th[i] specifies, for i in the range of 0 . . . 2, specifies the value of the threshold of activation for planar coding mode along the i-th most probable direction for the planar coding mode to be efficient.

geometry_angular_mode_flag indicates whether the angular coding mode is active. For example, geometry_angular_mode_flag field equal to 1 may indicate that the angular coding mode is active. geometry_angular_mode_flag field equal to 0 may indicate that the angular coding mode is not active.

When the value of the geometry_angular_mode_flag field is 1, that is, TRUE, the GPS may further include an lidar_head_position[0] field, a lidar_head_position[1] field, a lidar_head_position[2] field, a number_lasers field, a planar_buffer_disabled field, an implicit_qtbt_angular_max_node_min_dim_log 2_to_split_z field, and an implicit_qtbt_angular_max_diff_to_split_z field.

The lidar_head_position[0] field, lidar_head_position[1] field, and lidar_head_position[2] field may specify the (X, Y, Z) coordinates of the lidar head in the coordinate system with the internal axes.

number_lasers specifies the number of lasers used for the angular coding mode.

The GPS according to the embodiments includes an iteration statement that is repeated as many times as the value of the number_lasers field. In an embodiment, i is initialized to 0, and is incremented by 1 each time the iteration statement is executed. The iteration statement is repeated until the value of i becomes equal to the value of the number_lasers field. This iteration statement may include a laser angle[i] field and a laser_correction[i] field.

laser angle[i] specifies the tangent of the elevation angle of the i-th laser relative to the horizontal plane defined by the 0-th and the 1st internal axes.

laser_correction[i] specifies the correction, along the second internal axis, of the i-th laser position relative to the lidar_head_position[2].

planar_buffer_disabled equal to 1 indicates that tracking the closest nodes using a buffer is not used in process of coding the planar mode flag and the plane position in the planar mode. planar_buffer_disabled equal to 0 indicates that tracking the closest nodes using a buffer is used.

implicit_qtbt_angular_max_node_min_dim_log 2_to_split_z specifies the log 2 value of a node size below which horizontal split of nodes is preferred over vertical split.

implicit_qtbt_angular_max_diff_to_split_z specifies the log 2 value of the maximum vertical over horizontal node size ratio allowed to a node.

neighbour_context_restriction_flag equal to 0 indicates that geometry node occupancy of the current node is coded with the contexts determined from neighbouring nodes which is located inside the parent node of the current node. neighbour_context_restriction_flag equal to 1 indicates that geometry node occupancy of the current node is coded with the contexts determined from neighbouring nodes which is located inside or outside the parent node of the current node.

inferred_direct_coding_mode_enabled_flag indicates whether direct_mode_flag is present in the geometry node syntax. For example, inferred_direct_coding_mode_enabled_flag equal to 1 indicates that direct_mode_flag is present in the geometry node syntax. For example, inferred_direct_coding_mode_enabled_flag equal to 0 indicates that direct_mode_flag is not present in the geometry node syntax.

bitwise_occupancy_coding_flag indicates whether geometry node occupancy is encoded using bitwise contextualization of the syntax element occupancy map. For example, bitwise_occupancy_coding_flag equal to 1 indicates that geometry node occupancy is encoded using bitwise contextualization of the syntax element occupancy_map. For example, bitwise_occupancy_coding_flag equal to 0 indicates that geometry node occupancy is encoded using the directory encoded syntax element occupancy_byte.

adjacent_child_contextualization_enabled_flag indicates whether the adjacent children of neighboring octree nodes are used for bitwise occupancy contextualization. For example, adjacent_child_contextualization_enabled_flag equal to 1 indicates that the adjacent children of neighboring octree nodes are used for bitwise occupancy contextualization. For example, adjacent_child_contextualization_enabled_flag equal to 0 indicates that the children of neighboring octree nodes are is not used for the occupancy contextualization.

log 2_neighbour_avail_boundary specifies the value of NeighbAvailBoundary, a variable used in the decoding process. For example, when neighbour_context_restriction_flag is equal to 1, NeighbAvailabilityMask may be set to 1. For example, when neighbour_context_restriction_flag is equal to 0, NeighbAvailabilityMask may be set to 1<<log 2_neighbour_avail_boundary.

log 2_intra_pred_max_node_size specifies the octree nodesize eligible for occupancy intra prediction.

log 2_trisoup_node_size specifies the variable TrisoupNodeSize as the size of the triangle nodes.

geom_scaling_enabled_flag indicates specifies whether a scaling process for geometry positions is applied during the geometry slice decoding process. For example, geom_scaling_enabled_flag equal to 1 specifies that a scaling process for geometry positions is applied during the geometry slice decoding process. geom_scaling_enabled_flag equal to 0 specifies that geometry positions do not require scaling.

geom_base_qp indicates the base value of the geometry position quantization parameter.

gp_implicit_geom_partition_flag indicates whether the implicit geometry partition is enabled for the sequence or slice. For example, equal to 1 specifies that the implicit geometry partition is enabled for the sequence or slice. gp_implicit_geom_partition_flag equal to 0 specifies that the implicit geometry partition is disabled for the sequence or slice. When gp_implicit_geom_partition_flag is equal to 1, the following two fields, that is, a gps_max_num_implicit_qtbt_before_ot field and a gps_min_size_implicit_qtbt field, are signaled.

gps_max_num_implicit_qtbt_before_ot specifies the maximal number of implicit QT and BT partitions before OT partitions. Then, the variable K is initialized by gps_max_num_implicit_qtbt_before_ot as follows.

$$K=\text{gps\_max\_num\_implicit\_qtbt\_before\_ot}.$$

gps_min_size_implicit_qtbt specifies the minimal size of implicit QT and BT partitions. Then, the variable M is initialized by gps_min_size_implicit_qtbt as follows.

$$M=\text{gps\_min\_size\_implicit\_qtbt}$$

gps_extension_flag indicates whether a gps_extension_data syntax structure is present in the GPS syntax structure. For example, gps_extension_flag equal to 1 indicates that the gps_extension_data syntax structure is present in the GPS syntax. For example, gps_extension_flag equal to 0 indicates that the gps_extension_data syntax structure is not present in the GPS syntax.

When gps_extension_flag is equal to 1, the GPS according to the embodiments may further include a gps_extension_data_flag field.

gps_extension_data_flag may have any value. Its presence and value do not affect decoder conformance to profiles According to embodiments, the GPS may further include a geom tree type field. For example, geom tree type equal to 0 indicates that the position information (or geometry) is coded using an octree. geom tree type equal to 1 indicates that the position information (or geometry) is coded using a predictive tree.

According to embodiments, when the value of the scalable_transmission_enable_flag field included in the SPS is 1, the GPS may include a geom_scalable_transmission_enable_flag field.

In one embodiment, geom_scalable_transmission_enable_flag equal to 1 indicates that the geometry is compressed to enable scalable transmission.

For example, it may indicate that the geometry is composed of octree-based layers or that slice partitioning (see FIG. 24, etc.) is performed in consideration of scalable transmission.

For example, geom_scalable_transmission_enable_flag equal to 1 may indicate that octree-based geometry coding is used, and QTBT is disabled, or the geometry is coded in such a form as an octree by performing coding in order of BT (Binary-tree)-QT (Quad-tree)-OT (Octree).

When geom_scalable_transmission_enable_flag is equal to 1, the GPS may further include a num_scalable_layer field.

num_scalable_layers may indicate the number of layers supporting scalable transmission. A layer according to the embodiments may mean an LOD.

According to embodiments, the GPS includes an iteration statement repeated as many times as the value of the num_scalable_layers field. In an embodiment, i is initialized to 0, and is incremented by 1 each time the iteration statement is executed. The iteration statement is repeated until the value of i becomes equal to the value of the num_scalable_layers field. The iteration statement may include a scalable_layer_id[i] field and a num_slices_in_scalable_layer[i] field.

The scalable_layer_id[i] field may specify an identifier of the i-th scalable layer. That is, it specifies an indicator of a scalable layer constituting scalable transmission. According to embodiments, when a scalable layer is composed of multiple slices, common information may be transmitted through the scalable_layer_id field in a parameter set, and other individual information may be transmitted through a data unit header according to slices.

According to embodiments, when geom tree type is equal to 0, that is, when position information (i.e., geometry) is coded using an octree, the GPS may further include a num_octree_layers_in_scalable_layer[i] field, a tree_depth_start[i] field, a tree_depth_end[i] field, a node_size[i] field, and a num_nodes[i] field.

num_octree_layers_in_scalable_layer[i] may indicate the number of octree layers included in or corresponding to the i-th scalable layer constituting scalable transmission. When the scalable layer is not configured based on the octree, num_octree_layers_in_scalable_layer[i] may refer to a corresponding layer.

tree_depth_start[i] may indicate a starting octree depth (relatively closest to the root) among octree layers included in or corresponding to the i-th scalable layer constituting scalable transmission.

tree_depth_end[i] may indicate the last octree depth (relatively closest to the leaf) among the octree layers included in or corresponding to the i-th scalable layer constituting scalable transmission.

node_size[i] may indicate the node size of the output point cloud data when the i-th scalable layer is reconstructed through scalable transmission. For example, node_size[i] equal to 1 may indicate the leaf node. Although the embodiments assume that the XYZ node size is constant, an arbitrary node size may be indicated by signaling the size in the XYZ direction or each direction in transformation coordinates such as (r(radius), phi, theta).

num_slices_in_scalable_layer[i] may indicate the number of slices belonging to the i-th scalable layer.

According to embodiments, the GPS may include an iteration statement that is repeated as many times as the value of the num_slices_in_scalable_layer[i] field. In an embodiment, j is initialized to 0, and is incremented by 1 each time the iteration statement is executed. The iteration statement is repeated until the value of j becomes equal to the value of the num_slices_in_scalable_layer[i] field. This iteration statement may include a sub_group_id[i][j] field, a num_nodes in subgroup[i][j] field, a bitstream_type[i][j] field, and a slice_id[i][j] field.

The sub_group_id[i][j] field specifies an identifier of a subgroup included in the j-th slice belonging to the i-th scalable layer. That is, the sub_group_id[i][j] field specifies an indicator of a subgroup in the layer group indicated by the layer_group_id_field. The range of subgroup_id is 0 to num_subgroups_minus1[layer_group_id], where subgroup_id indicates the order of slices in the same layer_group_id.

num_nodes in subgroup[i][j] indicates the number of nodes related to the j-th slice belonging to the i-th scalable layer. That is, num_nodes in subgroup[i][j] indicates the number of nodes included in the geometry data unit. According to embodiments, the sum of all num_nodes in a geometry data unit specifies the total number of nodes in the geometry data unit.

bitstream_type[i][j] indicates the type of a bitstream included in the j-th slice belonging to the i-th scalable layer. According to embodiments, bitstream_type may indicate the type of a bitstream included in a slice. bitstream_type equal to 0 may indicate that the bitstream is an arithmetic entropy coding (AEC) bitstream. bitstream_type equal to 1 may indicate that the bitstream is a direct coding (DC) bitstream. bitstream_type equal to 2 may indicate that an AEC bitstream and a DC bitstream are present together in the slice.

slice_id[i][j] specifies an identifier for identifying the j-th slice belonging to the i-th scalable layer. That is, slice_id[i][j] may specify an indicator for distinguishing a slice or a data unit, and may deliver an indicator for a data unit (or called a slice) belonging to a slice layer.

According to embodiments, the information on the segmented (separated) slices and/or information related to direct coding of FIG. 38 may be included in any position in the GPS of FIG. 37.

FIG. 38 shows a syntax structure of a geometry data unit header (or referred to as a geometry slice header) according to embodiments.

The geometry data unit header according to the embodiments may include a slice_id field and a bitstream_type field.

slice_id specifies an identifier for identifying a data unit (i.e., a slice). That is, slice_id specifies an indicator for distinguishing a slice or a data unit, and may deliver an indicator for a data unit (or called a slice) belonging to a slice layer.

bitstream_type indicates the type of a bitstream included in a slice. According to embodiments, bitstream_type may indicate the type of a bitstream included in the slice. bitstream_type equal to 0 may indicate that the bitstream is an arithmetic entropy coding (AEC) bitstream. bitstream_type equal to 1 may indicate that the bitstream is a direct coding (DC) bitstream. bitstream_type equal to 2 may indicate that an AEC bitstream and a DC bitstream are present together in the slice.

According to embodiments, when the value of the geom_scalable_transmission_enable_flag field is 1, the geometry data unit header may further include a scalable_layer_id field, a num_tree_depth_in_data_unit field, and a bitstream_type field.

scalable_layer_id may specify an identifier of a scalable layer related to a data unit (i.e., slice). That is, it specifies an indicator for a scalable layer constituting scalable transmission. According to embodiments, when a scalable layer is composed of multiple slices, common information may be transmitted through the scalable_layer_id field in a parameter set, and other individual information may be transmitted through the data unit header of FIG. 43 according to slices.

When multiple subgroups are present in the scalable layer corresponding to scalable_layer_id, the geometry data unit header may further include a sub_group_id field.

sub_group_id specifies an identifier of a subgroup belonging to the scalable layer specified by scalable_layer_id. That is, sub_group_id specifies an indicator of a subgroup in the layer group indicated by layer_group_id. The range of subgroup_id is 0 to num_subgroups_minus1 [layer_group_id], where subgroup_id indicates the order of slices in the same layer_group_id.

num_tree_depth_in_data_unit may indicate the number of tree depths including nodes belonging to a data unit (i.e., a slice).

According to embodiments, the geometry data unit header includes an iteration statement repeated as many times as the value of num_tree_depth_in_data_unit. In an embodiment, i is initialized to 0, and is incremented by 1 each time the iteration statement is executed. The iteration statement is repeated until the value of i becomes equal to the value of num_tree_depth_in_data_unit. This iteration statement may include a tree_depth[i] field, a num_nodes[i] field, and a num_nodes in subgroup[i][sub_group_id] field.

tree_depth[i] may indicate the i-th tree depth. That is, tree_depth may indicate a tree depth.

num_nodes[i] may indicate the number of nodes included in the i-th tree depth. That is, num_nodes[i] may indicate the number of nodes belonging to the i-th tree depth (tree_depth) among the nodes belonging to a data unit.

num_nodes in subgroup[i][sub_group_id] indicates the number of nodes related to a data unit (i.e., a slice). That is, num_nodes in subgroup[i] indicates the number of nodes included in a subgroup indicated by sub_group_id. According to embodiments, the sum of all num_nodes in a geometry data unit specifies the total number of nodes in the geometry data unit.

num_points specifies that the number of points in an attribute data unit. The sum of all num_points in an attribute data unit specifies the total number of points in the attribute data unit.

According to embodiments, when bitstream_type is equal to 2, that is, an AEC bitstream and a DC bitstream are present together in the slice, the geometry data unit header may further include a dc_bitstream_offset field, a dc_bitstream_length field, and a dc_backward_enabled_flag field.

According to embodiments, dc_bitstream_offset and dc_bitstream_length may indicate the start/end positions of the DC bitstream and the total length of the DC bitstream in the slice. That is, when bitstream_type is equal to 2, an AEC bitstream and a DC bitstream may be present together in one slice. In this case, the start/end positions of the DC bitstream and the total length of the DC bitstream may be indicated.

dc_backward_enabled_flag equal to 1 may indicate that the DC bitstream is included in reverse order in the slice including both the AEC bitstream and the DC bitstream. In this case, the end of the bitstream of the slice may be the start of the DC bitstream, and dc_bitstream_offset may be the end of the DC bitstream. dc_backward_enabled_flag equal to 0 indicates that the DC bitstream is included in the same direction as the AEC bitstream in the slice including both the AEC bitstream and the DC bitstream. In this case, it may be seen that the DC bitstream starts from dc_bitstream_offset and the DC bitstream ends at the end of the entire bitstream (i.e., dc_bitstream_offset+dc_bitstream_length).

According to embodiments, the geometry data unit header may further include a ref_slice_id field.

Figure 20:
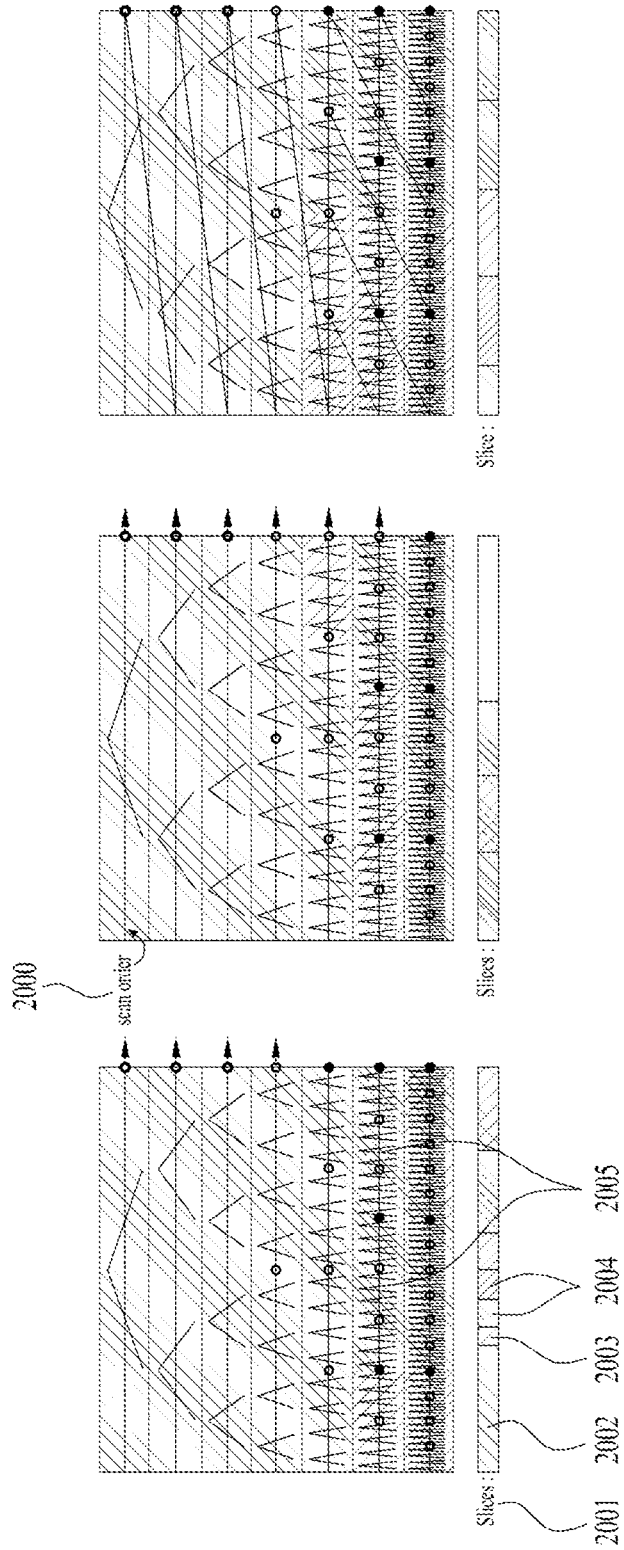
FIGS. 20A to 20C illustrate a method of configuring a slice including point cloud data according to embodiments.

The ref_slice_id field may be used to indicate a slice that must be preceded for decoding of the current slice (see, for example, the headers of FIGS. 19-21).

According to embodiments, the information about the segmented (separated) slices and/or information related to direct coding of FIG. 38 may be included in any position in the geometry slice header (i.e., the geometry data unit header).

FIGS. 39A and 39B illustrate a geometry coding layer structure according to embodiments.

Figure 47:
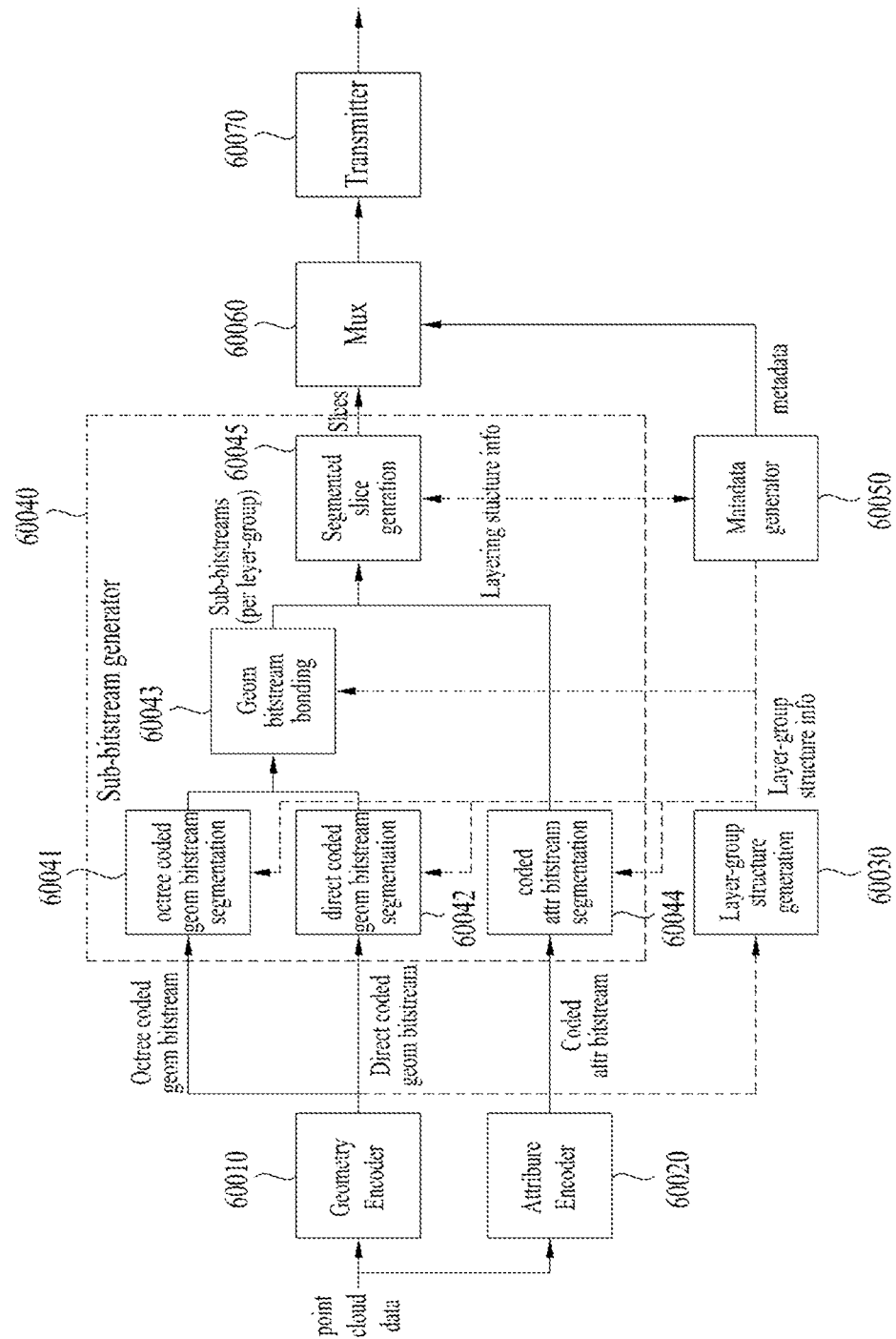
FIG. 47 shows a structure of a point cloud data transmission device according to embodiments.
Figure 55:
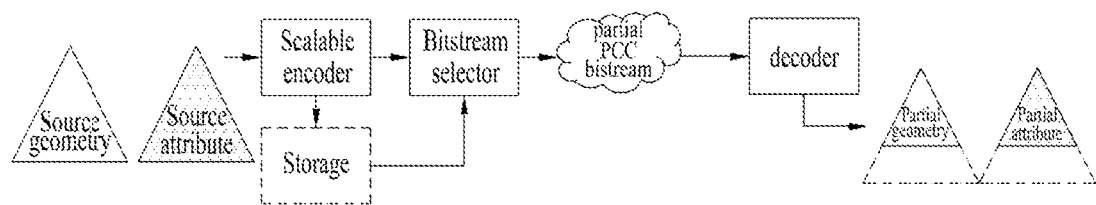
FIG. 55 illustrates a method for transmitting and receiving point cloud data according to embodiments.
Figure 62:
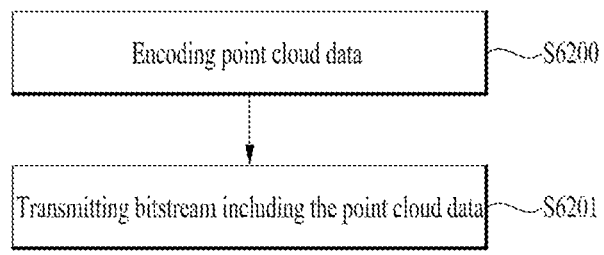
FIG. 62 illustrates a method for transmitting point cloud data according to embodiments.

The point cloud data transmission method/device according to the embodiments, which may correspond to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 47, the sub-bitstream classifier of FIG. 49, the encoder of FIGS. 55 and 56, the transmission method of FIG. 62, and the like, may generate a layer-based bitstream by encoding a point cloud in a layered structure as illustrated in FIGS. 16 to 19, 26 to 28, 34, 35, 36, and 39.

The point cloud data reception method/device according to embodiments, which may correspond to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 48, the sub-bitstream classifier of FIG. 49, the decoder of FIGS. 55 and 56, the decoder/renderer of FIGS. 57 to 60, the reception method of FIG. 63, and the like, may receive layer-based point cloud data and a bitstream and selectively decode data as illustrated in FIGS. 16 to 19, 26 to 28, 34, 35, 36, and 39.

The bitstream and point cloud data according to the embodiments may be generated based on coding layer-based slice segmentation. By slicing the bitstream at the end of the coding layer of the encoding process, the method/device according to the embodiments may select a related slice, thereby supporting scalable transmission or partial decoding.

FIG. 39A shows a geometry coding layer structure with 8 layers in which each slice corresponds to a layer group. Layer group 13900 includes coding layers 0 to 4. Layer group 2 3901 includes coding layer 5. Layer group 33902 is a group for coding layers 6 and 7. When a geometry (or attribute) has a tree structure having eight levels (depths), a bitstream may be hierarchically configured by grouping data corresponding to one or more levels (depths). Each group may be included in one slice.

FIG. 39B shows the decoded output when selecting 2 slices out of 3 groups. When the decoder selects group 1 and group 2, partial layers of levels (depth) 0 to 5 of the tree may be selected. That is, partial decoding of coding layers may be supported without accessing the entire bitstream by using the slices of the layer group structure.

For the partial decoding process according to the embodiments, the encoder may generate three slices generated based on the layer group structure. The decoder may perform partial decoding by selecting two slices from among the three slices.

A bitstream (FIG. 21) according to embodiments may include layer-based groups/slices 3903. Each slice may include a header including signaling information related to point cloud data (geometry data and/or attribute data) included in the slice. The reception method/device according to the embodiments may select partial slices and decode point cloud data included in a payload of the slices based on the header included in the slices.

The method/device according to the embodiments may further divide the layer group into several subgroups (subgroups) in consideration of use cases of spatial random access in addition to the layer group structure. The subgroups are mutually exclusive, and a set of subgroups may be the same as a layer group. Since the points of each subgroup form a boundary in the spatial domain, the subgroup may be represented by subgroup bounding box information. Based on spatial information, the layer group and subgroup structures may support spatial access. By efficiently comparing a region of interest (ROI) with the bounding box information about each slice, spatial random access within a frame or tile may be supported.

The method/device according to the embodiments may divide layer groups 1 to 3 3900, 3901, and 3902 into one or more subgroups.

Although FIGS. 39A and 39B show a geometry coding layer structure as an example, an attribute coding layer structure may be generated in a similar manner.

Figure 40:
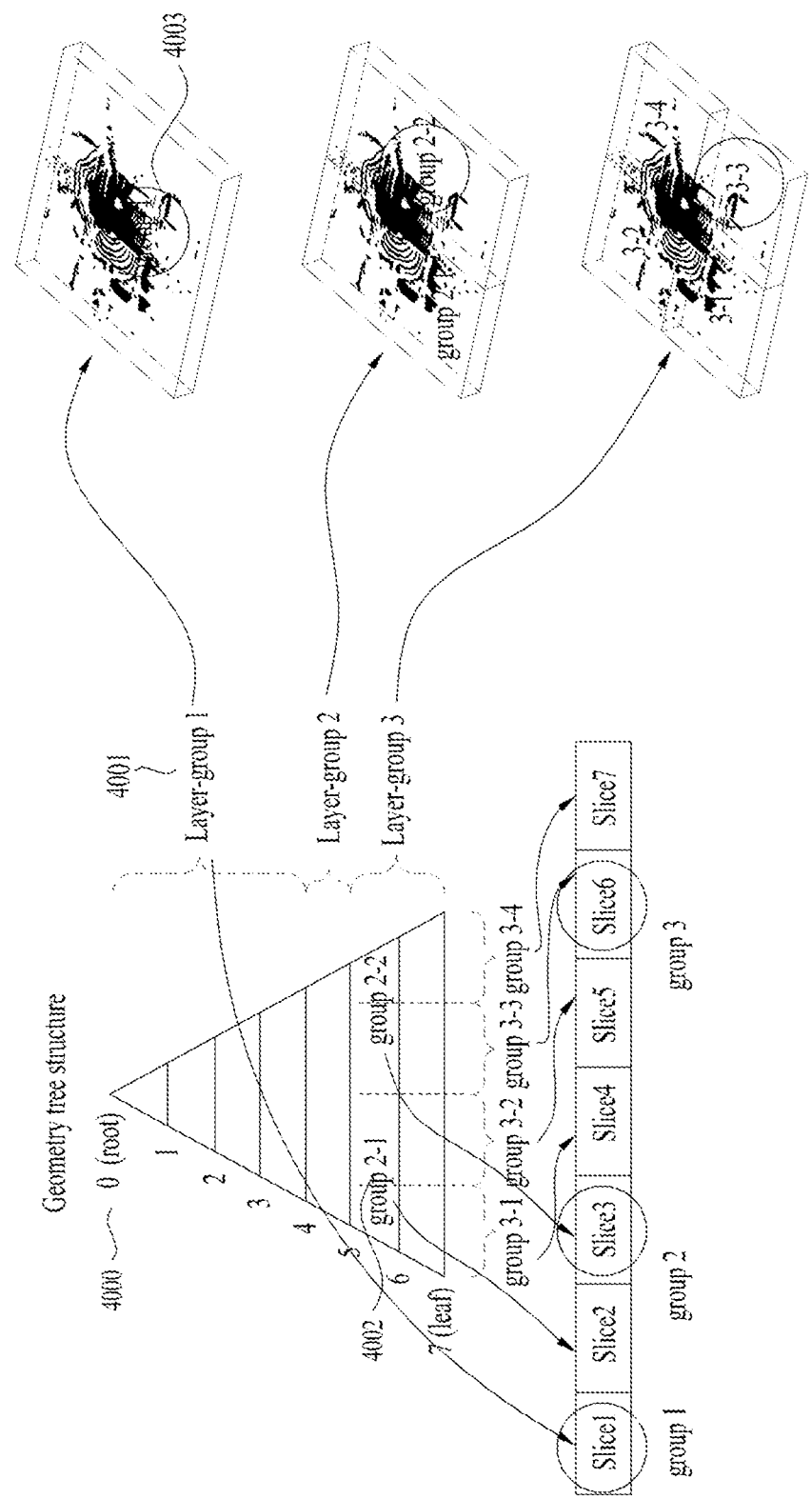
FIG. 40 illustrates a layer group structure and subgroup structure according to embodiments.

FIG. 40 illustrates a layer group structure and subgroup structure according to embodiments.

The layer structure-based point cloud data and bitstream shown in FIGS. 39A and 39B may represent a bounding box as shown in FIG. 40.

The subgroup structure and the bounding box corresponding to the subgroup are shown. Layer group 2 is divided into two subgroups (group2-1 and group2-2) and layer group 3 is divided into four subgroups (group3-1, group3-2, group3-3, and group3-4). The subgroups of layer group 2 and the subgroups of layer group 3 are included in different slices. Given slices of a layer group and subgroups with bounding box information, 1) the bounding box of each slice may be compared with the ROI, and 2) the slice whose subgroup bounding box correlates with the ROI may be selected and spatial access may be performed. Then, 3) the selected slice is selected. When the ROI is considered in region 3-3, slices 1, 3, and 6 are selected as subgroup bounding boxes of layer group 1 and subgroups 2-2 and 3-3 to cover the ROI region. For effective spatial access, it is assumed that there is no dependency between the subgroups of the same layer group. In live streaming or low-latency use cases, when each slice segment is received, the selection and decoding operations may be performed to increase temporal efficiency.

The method/device according to the embodiments may represent data as layers (which may be referred to as depths or levels) as a layer tree 4000 during geometry and/or attribute encoding. Point cloud data corresponding to layers (depths/levels) may be grouped into a layer group (or group) 4001 as in FIGS. 39A and 39B. Each layer group may be further divided (segmented) into subgroups 4002. A bitstream may be generated by configuring each subgroup as a slice. The reception device according to the embodiments may receive the bitstream, select a specific slice, decode a subgroup included in the slice, and decode a bounding box corresponding to the subgroup. For example, when slice 1 is selected, a bounding box 4003 corresponding to group 1 may be decoded. Group 1 may be data corresponding to the largest region. When the user wants to additionally view a detailed region for group 1, the method/device according to the embodiments may select slice 3 and/or slice 6, and may partially and hierarchically access the bounding box (point cloud data) of group 2-2 and/or group 3-3 for the detailed regions included in the region of group 1.

FIGS. 41A to 41D illustrate an output of layer group-based point cloud data according to embodiments.

The layer group-based point cloud data illustrated in FIG. 40 may be partially output as shown in FIGS. 41A to 41D.

The method/device according to the embodiments may display the point cloud data based on a group of coding layers for scalable transmission.

The coded data of each sequence containing point cloud data may be included in four slices corresponding to four layer groups of a leaf, leaf-1 and leaf-2, and a coding layer of the remaining coding layers. The test content of queen_200.ply for which the maximum tree depth is 10 is described as an example. The first layer group may include depths 0 to 6, the second layer group may include depth 7, the third layer group may include depth 8, and the last layer group may include depth 9.

That is, the leaf node may correspond to depth 9 and layer group 4, the leaf-1 node may correspond to depth 8 and layer group 3, and the leaf-2 node may correspond to depth 7 and layer group 2. Also, depths 0 to 6 may correspond to layer group 1.

A point cloud that is output when a layer group is skipped may be distributed as shown in FIGS. 41A to 41D. As the number of points decreases, the bitstream size and decoding time greatly decrease when the number of skipped_layer_groups increases. Because the full tree depth is selected by the transcoder after being encoded, the encoding time does not vary as much as the decoding time. Embodiments may be used to support a use case where a receiver with multiple decoding functions is supported with a single bitstream.

Figure 41A:
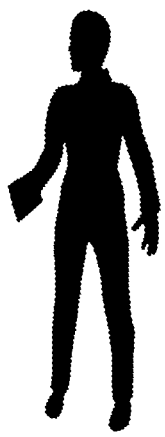
FIGS. 41A to 41D illustrate an output of layer group-based point cloud data according to embodiments.

FIG. 41A illustrates representation of all point cloud data having 10 depths. It can be seen that the positions and attributes of the points for an object are all represented.

Figure 41B:
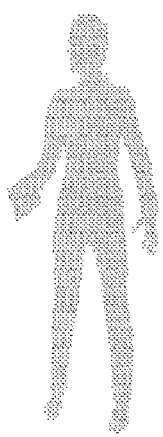

FIG. 41B illustrates representation of points corresponding to depths 0 to 8 while skipping a layer group corresponding to the points of depth 9, which is a leaf node, among depths 0 to 9.

Figure 41C:

FIG. 41C illustrates representation of points corresponding to depths 0 to 7 while skipping the leaf node and the leaf-1 node.

Figure 41D:
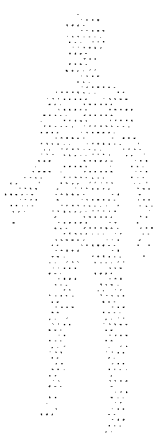

FIG. 41D illustrates representation of points corresponding to depths 0 to 6 while skipping the leaf node, the leaf-1 node, and the leaf-2 node.

FIG. 42 illustrates comparison of a result of layer-based point cloud representation according to embodiments.

In the case of skipping a layer group and performing partial decoding as shown in FIGS. 41A to 41D, a result as shown in FIGS. 41A to 41D may be obtained.

A coding overhead according to use of a slice of a layer group is shown in FIGS. 41A to 41D. A layer group parameter may be used to identify an effect of the method. As shown in FIGS. 41A to 41D, the loss due to the addition of the header is insignificant.

As the number of skipped_layer_groups increases, the number of represented tree depths decreases, and the number of output (represented) points also decreases. The bitstream size is also reduced. The encoding time does not change significantly when considered based on the time taken according to full-depth encoding and slice selection, but there may be subtle changes. The decoding time may be effectively reduced.

In decoding only a specific region desired by the user, decoding the entire region may be inefficient. Accordingly, the time taken for decoding may be reduced by selecting and decoding a slice based on a bitstream having a structure according to the embodiments.

Figure 43:
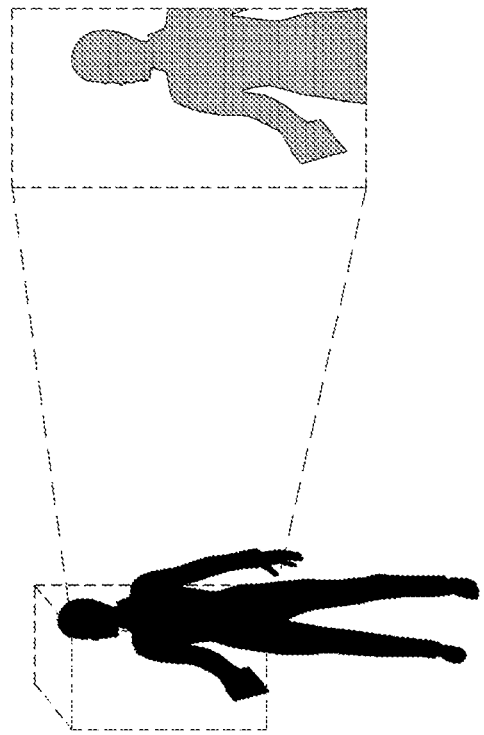
FIG. 43 illustrates an example of partial decoding according to embodiments.

FIG. 43 illustrates an example of partial decoding according to embodiments.

For partial decoding according to FIG. 40, the method/device according to the embodiments may display point cloud data based on a subgroup bounding box for spatial random access as shown in FIG. 43.

For example, subgroups may be applied in a layer-group structure in which layer-groups 1 to 4 each have maxDepth-3 layers, 1 layer, 1 layer, and 1 layer, respectively. For the last three layer groups, the bounding box may be partitioned into two parts on the x-axis, y-axis and z-axis to create subgroups. As a result, the number of subgroups in each of layer-groups 1, 2, 3, and 4 may be 1, 2, 4, and 8, respectively.

FIG. 43-(a) shows point cloud data in which the ROI is assumed to be hand.

FIG. 43-(b) shows an example of decoding output according to a bounding box and ROI.

Based on 4 layer groups and a subgroup structure, one of the 8 regions of the last layer group may be selected from the ROI. In the example of FIG. 43-(a), the ROI area of the test content of the point cloud data (queen_200.ply) is a tablet in the right hand. The slice selector (or receiver) compares the bounding box of each slice with the ROI and selects a slice having the ROI area. A result of decoding of the selected slice is shown in FIG. 43-(b). As the number of slices selected for the different subgroup structures is reduced from 15 to 4, the number of output points is reduced to ⅓ of the input points. Thus, the bitstream size and decoding time may be reduced, and different subgroup structures may produce different bitstream sizes.

In other words, in order to partially decode the ROI area and the bounding box in the proposed structure as shown in FIG. 40 instead of decoding the point cloud data of all layers for each depth, only relevant layer groups and subgroups of the layer groups may be selected and decoded.

FIG. 44 illustrates an example of a decoding effect according to a layer group structure and subgroup structure according to embodiments.

FIG. 44 shows the coding efficiency compared to anchors with an average loss of 3.9% for lossy operation and 0.3% for lossless operation. Coding loss occurs due to the discontinuity of subgroup boundaries located in the middle of layer groups, which may be a tradeoff for spatial random access.

The data shown in (a) of FIG. 44 may be point cloud data given as input to a method/device according to embodiments.

(b) of FIG. 44 shows an example of point cloud data output from the method/device according to the embodiments.

The method/device according to the embodiments may configure point cloud data into layer groups 0 to 4. Layer group 0 may include one layer corresponding to depth 0, and may have 8 points. Layer group 1 may include four layers corresponding to depths 1 to 4. Layer group 2 may include two layers corresponding to depth 5 and depth 6. The layers included in layer group 2 may be further divided into subgroups. For example, the layer of depth 5 may be divided into 4 subgroups. A total of 12711 points may be represented as subgroups through subgroup 1 (having 2871 points), subgroup 2 (having 2901 points), subgroup 3 (having 3606 points), and subgroup 4 (having 3333 points). Each layer included in layer group 2 may include four subgroups. Layer group 3 may include two layers corresponding to depths 8 and 9, and each of the layers may be divided into 8 subgroups.

(b) of FIG. 44 illustrates the effect of processing the point cloud data according to the layer group and ROI structure according to the embodiments. As the number of processed points is reduced, the bitstream size may be reduced, thereby increasing encoding and decoding efficiency.

FIG. 45 shows a geometry data unit header according to embodiments.

A slice of the bitstream in FIG. 21 may be referred to as a data unit. A slice and/or a data unit may mean an encoding/decoding unit. FIG. 45 shows a slice header presenting geometry related information included in a slice. FIG. 45 shows geometry related information included a data unit.

layer_group_enabled_flag equal to 1 specifies that the geometry bitstream of a frame or a tile is contained in multiple slices which is matched to a group of coding layers or a subgroup thereof. Layer_group_enabled_flag equal to 0 specifies that the geometry bitstream of a frame or a tile is contained in a single slice.

num_layer_groups_minus1 plus 1 specifies the number of layer-groups where the layer-group represents group of consecutive tree layers that are part of the geometry coding tree structure. num_layer_groups_minus1 shall be in the range of 0 to number of coding tree layers.

layer_group_id specifies the indicator of a layer-group of a frame or a tile. layer_group_id may be in the range of 0 to num_layer_groups_minus1.

dependent_slice_flag equal to 1 specifies that the slice is dependent on the slice which is indicated by ref_slice_id and ref_layer_group_id. dependent_slice_flag equal to 0 specifies that the slice is not dependent on the other slices and may be a start of the decoding of related slices.

ref_slice_id specifies the indicator of the reference slice. ref_slice_id may be in the range of slice_id used for the current frame or the current tile.

ref_layer_group_id specifies the indicator of the reference layer-group. ref_layer_group_id may be in the range of 0 to num_layer_group_minus1 of the current frame or the current tile.

num_layers_minus1 plus 1 specifies the number of coding layers contained in the i-th layer-group. The total number of layer-groups may be derived by adding all (num_layers_minus1[i]+1) for i equal to 0 to num_layer_groups_minus1.

layer_group_stream_len_bits plus 1 is the length in bits of the syntax element layer_group_stream_len.

layer_group_stream_len specifies the length of the current layer_group_stream.

subgroup_enabled_flag equal to 1 specifies that the current layer-group consist of subgroups which may be contained in multiple slices. subgroup_enabled_flag equal to 0 specifies that the current layer-group is contained in a single slice. The subgroups are mutually exclusive and the sum of subgroups is identical to the layer-group.

num_subgroups_minus1 plus 1 specifies the number of sub-groups in the layer group indicated by layer_group_id.

subgroup_id specifies the indicator of the subgroup of the layer group indicated by layer_group_id. subgroup_id may be in the range of 0 to num_subgroups_minus1 [layer_group_id]. Here, subgroup_id may represent the order of the slices in the same layer_group_id. When not present, subgroup_id is inferred to be 0.

ref_subgroup_id specifies the indicator of the reference subgroup of the layer-group indicated by ref_layer_group_id. ref_subgroup_id may be in the range of 0 to num_subgroup_id_minus1 of the current layer-group. When not present, subgroup_id is inferred to be 0.

num_points_bits_minus1 plus 1 is the length in bits of the syntax elements num_points.

num_points specifies the number of output point by decoding the current slice.

subgroup_bbox_origin_bits_minus1 plus 1 is the length in bits of the syntax elements subgroup_bbox_origin.

subgroup_bbox_origin specifies the origin of the subgroup bounding box of the subgroup indicated by subgroup_id of the layer-group indicated by layer_group_id.

subgroup_bbox_size_bits_minus1 plus 1 is the length in bits of the syntax elements subgroup_bbox_size.

subgroup_bbox_size specifies the origin of the subgroup bounding box of the subgroup indicated by subgroup_id of the layer-group indicated by layer_group_id.

The geometry data unit header according to the embodiments may further include the following.

gdu_geometry_parameter_set_id indicates the value of the active GPS gps_geom_parameter_set_id.

gdu_reserved_zero_3bits may be equal to zero in bitstreams following this version of this document. Other values of gdu_reserved_zero_3bits are reserved for future use in ISO/IEC. The decoder may ignore the value of gdu_reserved_zero_3bits.

slice_id identifies a slice to be referenced in other syntax elements.

slice_tag may be used to identify one or more slices with a specific value of slice_tag. If there is a tile inventory data unit, slice_tag is the tile ID. Otherwise, when the tile inventory data unit does not exist, the interpretation of slice_tag is specified by external means.

frame_ctr_lsb specifies the least significant bit of frame_ctr_lsb bits of the frame number counter. Consecutive slices with different values of frame_ctr_lsb form part of different output point cloud frames. Consecutive slices with the same value of frame_ctr_lsb without intermediate frame boundary marker data units form part of the same coded point cloud frame.

slice_entropy_continuation equal to 1 indicates that the entropy parsing state restoration process (XREF) should be applied to the GDU and all ADUs in the slice. slice_entropy_continuation equal to 0 specifies that the entropy parsing of the GDU and ADU of a slice is independent of other slices. When not present, slice_entropy_continuation is inferred to be 0. When the GDU is the first DU in the coded point cloud frame, slice_entropy_continuation equal to 0 is a requirement of bitstream conformance.

prev_slice_id is the same as the value of slice_id of the preceding GDU in bitstream order. The decoder may ignore slices in which prev_slice_id is present and not equal to the value of slice_id of the preceding slice.

slice_geom_origin_log_2 scale indicates a scaling factor of the slice origin. When not present, slice_geom_origin_log_2 scale is inferred to be gps_geom_origin_log_2 scale.

slice_geom_origin_bits_minus1 plus 1 specifies the length of each syntax element slice_geom_origin_xyz[k] in bits.

slice_geom_origin_xyz[k] indicates the k-th component of the quantized (x, y, z) coordinates of the slice origin.

SliceOriginStv[k]: When k=0, 2, the SliceOriginStv array specify the scaled value of slice_geom_origin_xyz substituted in the order of the coded geometry axes as follows.

SliceOriginStv[XyzToStv[k]]=slice_geom_origin_xyz[k] slice_geom_origin_log_2 scale slice_angular_origin_bits_minus1 plus 1 specifies the length of each syntax element slice_angular_origin_xyz[k] in bits.

slice_angular_origin_xyz[k] indicates the k-th component of the (x, y, z) coordinates of the origin used for processing of the angular coding mode. When not present, slice_angular_origin_xyz[k] is inferred to be 0.

The method/device according to the embodiments may generate an ROI as signaling information for slice segment selection. For example, the region resolution may be signaled based on subgroup_bbox_origin_bits_minus1, subgroup_bbox_origin[i], subgroup_bbox_size_bits_minus1, subgroup_bbox_size[i], num_layers_minus1, num_points, and the like.

FIG. 46 shows a geometry data unit footer according to embodiments.

The geometry data unit footer of FIG. 46 is included in the bitstream of FIG. 21.

The geometry data unit footer contains the following information.

occtree_lvl_point_cnt_minus1[lvl] plus 1 indicates the number of decoded points from the root to the lvl-th geometry tree level in the DU with occtree_depth_minus1 for lvl=0 . . . occtree_lvl_point_cnt_minus1[0] may be inferred to be 0. occtree_lvl_point_cnt_minus1 [occtree_depth_minus1] is inferred to be slice_numpoints_minus1.

slice_numpoints_minus1 plus 1 indicates the number of coded points in the DU. It is a requirement of bitstream conformance that slice_numpoints_minus1 plus 1 is equal to the number of decoded points of the DU. Decoders should not rely on bitstream conformance to avoid buffer overflows.

num_skipped_layer_groups specifies the number of skipped_layer_groups in the current frame or tile: num_encoded_layer_group=num_delivered_layer_group+num_skipped_layer_group.

num_skipped_layers specifies the number of skipped geometry coding layers in the current frame or tile: num_encoded_layers=num_delivered_layers+num_skipped_layers.

As a method of proposing a compressed bitstream for the full coding layer, when the data is divided into slices and transmitted, receivers with different capabilities may be supported. When slices are selectively decoded according to ROI or receiver capability, the receiver may select a slice directly or the transcoder may perform the selection. When the transcoder performs the selection, there is no information about the case of full decoding (e.g., the full coding layer depth, the total number of layer-groups, the total number of subgroups, etc.). In this case, the receiver may need the information in the decoding process. In this case, the information may be delivered directly, or num_skipped_layer_groups and num_skipped_layers may be delivered as information from which the information may be inferred.

FIG. 47 shows a structure of a point cloud data transmission device according to embodiments.

The point cloud data transmission method/device according to the embodiments of FIG. 47 corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 47, the sub-bitstream classifier of FIG. 49, the encoder of FIGS. 55 and 56, the transmission method of FIG. 62, and the like. Each component in FIG. 47 may correspond to hardware, software, a processor, and/or a combination thereof.

Operations of the encoder and the transmitter according to the embodiments are described below.

When point cloud data is input to the transmission device, a geometry encoder encodes position information (geometry data (e.g., XYZ coordinates, phi-theta coordinates, etc.)), and an attribute encoder encodes attribute data (e.g., color, reflectance, intensity, grayscale, opacity, medium, material, glossiness, etc.).

The compressed (encoded) data is divided into units for transmission. The data may be divided by a sub-bitstream generator 60040 into units suitable for selection of necessary information in the bitstream unit according to layered structure information and may then be packed.

According to embodiments, an octree coded geometry bitstream is input to an octree coded geometry bitstream segmentation part, and a direct coded geometry bitstream is input to a direct coded geometry bitstream segmentation part.

The octree coded geometry bitstream segmentation part divides the octree coded geometry bitstream into one or more groups and/or subgroups based on information about segmented (separated) slices and/or information related to direct coding generated by a layer-group structure generator. For details, refer to the description given above. Detailed description thereof will be skipped.

In addition, the direct coded geometry bitstream segmentation part divides the direct code geometry bitstream into one or more groups and/or subgroups based on the information about the segmented (separated) slices and/or information related to direct coding generated by the layer-group structure generator. For details, refer to the description given above. Detailed description thereof will be skipped.

An output of the octree coded geometry bitstream segmentation part and an output of the direct coded geometry bitstream segmentation part are input to a geometry bitstream bonding part.

The geometry bitstream bonding part performs a geometry bitstream bonding process based on the information about the segmented (separated) slices and/or information related to direct coding generated by the layer-group structure generator, and outputs sub-bitstreams to a segmented slice generator on a layer group-by-layer group basis. For example, the geometry bitstream bonding part performs a process of concatenating an AEC bitstream and a DC bitstream within a slice. Final slices are created by the geometry bitstream bonding part.

A coded attribute bitstream segmentation part divides the coded attribute bitstream into one or more groups and/or subgroups based on the information about the segmented (separated) slices and/or information related to direct coding generated by the layer-group structure generator. The one or more groups and/or subgroups of the attribute information may be linked with the one or more groups and/or subgroups for the geometry information, or may be independently generated. For details, refer to the description given above. Detailed description thereof will be skipped.

The segmented slice generator segments one slice into multiple slices according to the inputs received from the geometry bitstream bonding part and/or the coded attribute bitstream segmentation part based on information about segmented (separated) slices and/or direct coding related information generated by a metadata generator. Each sub-bitstream is transmitted through each slice segment. In this case, the AEC bitstream and the DC bitstream may be transmitted through one slice or may be transmitted through different slices.

A multiplexer multiplexes the output of the segmented slice generator 60045 and the output of the metadata generator 60050 for each layer, and provides a multiplexed output to the transmitter 60070. For the information about segmented (separated) slices and/or information related to direct coding generated by the layer-group structure generator 60030 and/or the metadata generator, refer to the description given above.

That is, as proposed in the present disclosure, when different types of bitstreams (e.g., an AEC bitstream and a DC bitstream) are included in one slice, the bitstreams (e.g., the AEC bitstream and DC bitstream) generated by the geometry encoder may be separated according to the purposes. Then, respective slices or adjacent information may be included in one slice according to the information about the segmented (separated) slices and/or information related to direct coding (i.e., layer-group information) generated by the layer-group structure generator and/or the metadata generator. According to embodiments, the information about the segmented (separated) slices and/or information related to direct coding (e.g., information such as bitstream type, bitstream_offset, bitstream_length, and a bitstream direction in addition to layer-group information according to each slice_id, layer information included in a layer-group, the number of nodes, layer depth information, and the number of nodes included in a subgroup) may be transmitted from the metadata generator. The information about the segmented (separated) slices and/or information related to direct coding (e.g., information such as bitstream_type, bitstream_offset, bitstream_length, and a bitstream direction in addition to layer-group information according to each slice_id, layer information included in a layer-group, the number of nodes, layer depth information, and the number of nodes included in a subgroup) may be signaled in the SPS, APS, GPS, geometry data unit header, attribute data unit header, or SEI message. For details of the information about the segmented (separated) slices and/or information related to direct coding (e.g., information such as bitstream_type, bitstream_offset, bitstream_length, and a bitstream direction in addition to layer-group information according to each slice_id, layer information included in a layer-group, the number of nodes, layer depth information, and the number of nodes included in a subgroup), refer to the description given above. Detailed description thereof will be skipped.

The sub-bitstream generator of FIG. 47 may generate point cloud data having the layer group related structure according to FIGS. 39A to 44 and may generate signaling information representing the layer group related structure according to FIGS. 45 and 46.

FIG. 48 shows a point cloud data reception device according to embodiments.

The operation of each component of the reception device of FIG. 48 may follow the operation of the corresponding component of the transmission device of FIG. 47, or a reverse process thereof.

The point cloud data reception method/device according to the embodiments of FIG. 48 may correspond to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 48, the sub-bitstream classifier of FIG. 49, the decoder of FIGS. 55 and 56, the decoder/renderer of FIGS. 57 to 60, the reception method of FIG. 63, and the like. Each component may correspond to hardware, software, a processor, and/or a combination thereof.

FIG. 48 is an embodiment of detailed functional configuration for receiving/decoding PCC data. When a bitstream is input, the receiver may process the bitstream for position information and the bitstream for attribute information separately. In this case, the sub-bitstream classifier may transmit the bitstreams to appropriate decoders based on the information in the bitstream header. Alternatively, in this process, the receiver may select a necessary layer. Geometry data and attribute data may be reconstructed from the classified bitstreams by the geometry decoder and attribute decoder, respectively, according to the characteristics of the data, and may then be converted into a format for final output by the renderer.

When different types of geometry bitstreams are included, each bitstream may be decoded separately through the bitstream splitter as described below. In this embodiment, the geometry decoder may process the octree coding-based arithmetic entropy coded bitstream and the direct coded bitstream separately. In this case, the bitstreams may be separated based on information about the bitstream type, bitstream_offset, bitstream_length, and bitstream direction. An operation of concatenating bitstream segments of the same type for the separated bitstreams may be included. This may be included as a process for processing bitstreams separated by layer-groups as continuous bitstreams. The bitstreams may be sorted in order based on layer-group information. A bitstream that may be processed in parallel may be processed by the decoder without the concatenation operation.

The receiver may receive a bitstream.

The demultiplexer may output point cloud data and metadata (signaling information) included in the bitstream.

The sub-bitstream classifier may select a slice, split the bitstream, and concatenate bitstream segments of the octree coded geometry bitstream and the direct coded geometry bitstream.

The metadata parser may provide information about slices and/or layer groups.

The slice selector may select one or more slices included in the bitstream.

The bitstream splitter may split the geometry bitstream. Geometry data may be coded based on an octree and/or may be coded directly.

The bitstream segment concatenator may concatenate the octree-coded geometry bitstream and the direct-coded geometry bitstream according to the encoding type. For the layer group-based geometry bitstream, bitstream segments including a plurality of groups/subgroups related to a decoding region may be concatenated.

The geometry decoder may decode the geometry bitstream to output geometry data.

The attribute decoder may decode attribute data included in the selected slice.

The renderer may render the point cloud data based on the geometry data and/or the attribution data.

FIG. 49 is a flowchart of a point cloud data reception device according to embodiments.

That is, FIG. 49 illustrates the operation of the sub-bitstream classifier shown in FIG. 48 in more detail. In other words, it is assumed that the geometry data and the attribute data are scalably transmitted from the transmitter.

The reception device receives data on a slice-by-slice basis, and the metadata parser delivers parameter set information such as the SPS, GPS, APS, and TPS (e.g., information about segmented (separated) slices and/or information related to direct coding). Based on the delivered information, scalability may be determined. When the data is scalable, the slice structure for scalable transmission is identified as shown in FIG. 49 (65011). First, the geometry slice structure may be identified based on information such as num_scalable_layers, scalable_layer_id, tree_depth_start, tree_depth_end, node_size, num_nodes, num_slices_in_scalable_layer, and slice_id carried in the GPS.

When aligned_slice_structure_enabled_flag is equal to 1 (65017), the attribute slice structure may also be identified in the same way (e.g., geometry is encoded based on an octree, attributes are encoded based on scalable LoD or scalable RAHT, and geometry/attribute slice pairs generated through the same slice partitioning have the same number of nodes for the same octree layer.

When the structures are identical, the range of geometry slice_id is determined according to the target scalable layer, and the range of attribute slice_id is determined by slice_id_offset. A geometry/attribute slice is selected according to the determined ranges (65012 to 65014, 65018, and 65019).

When aligned_slice_sturcutre_enabled_flag=0, the attribute slice structure may be separately identified based on the information such as num_scalable_layers, scalable_layer_id tree_depth_start, tree_depth_end, node_size, num_nodes, num_slices_in_scalable_layer, and slice_id delivered through the APS, and the range of the necessary attribute slice_id may be limited according to the scalable operation. Based on the range, a required slice may be selected through each slice_id before reconstruction (65019, 65020, and 65021). The geometry/attribute slice selected through the above process is transmitted to the decoder as an input.

The decoding process according to the slice structure has been described above based on the scalable transmission or the scalable selection of the receiver. However, when scalable_transmission_enabled_flag is equal to 0, the operation of ranging geom/attr slice id may be skipped and the entire slices may be selected such that they may be used even in the non-scalable operation. Even in this case, information about a preceding slice (e.g., a slice belonging to a higher layer or a slice specified by ref_slice_id) may be used through the slice structure information delivered through a parameter set such as the SPS, GPS, APS, or TPS (e.g., information about the segmented (separated) slices and/or information related to direct coding).

As described above, the bitstream may be received based on the scalable transmission, and the scalable bitstream structure may be identified based on the parameter information included in the bitstream. A geometry scalable layer may be estimated.

A geometry slice may be identified based on geom_slice_id.

A geometry slice may be selected based on slice_id.

The decoder may decode the selected geometry slice.

When aligned_slice_structure_enabled_flag included in the bitstream is equal to 1, the attribute slice ID corresponding to the geometry slice may be checked. An attribute slice may be accessed based on slice_id_offset.

An attribute slice may be selected based on slice_id.

The decoder may decode the selected attribute slice.

When aligned_slice_structure_enabled_flag is not equal to 1, an attribute scalable layer may be estimated. An attribute slice may be identified based on the attribute slice id.

An attribute slice may be selected based on slice_id.

In the present disclosure, when different types of geometry bitstreams (e.g., an AEC bitstream and a DC bitstream) are present, all slices included in the range for the different bitstreams may be selected in the slice selection operation. When the different types of bitstreams are included in one slice, the bitstreams may be separated based on offset information and length information, and the separated bitstreams may be subjected to a concatenation operation in which the bitstreams are concatenated into one bitstream for decoding according to layer-group order. This operation may be included as a process of processing bitstreams separated by layer-groups into continuous bitstreams, and the bitstreams may be sorted in order based on layer-group information. Bitstream that may be processed in parallel may be processed in the decoder without the concatenation operation.

The transmission device according to the embodiments has the following effects.

For point cloud data, the transmission device may divide and transmit compressed data according to a specific criterion. When layered coding according to the embodiments is used, the compressed data may be divided and transmitted according to layers. Accordingly, the storage and transmission efficiency on the transmitting side may be increased.

Referring to FIGS. 15 and 16, the geometry and attributes of the point cloud data may be compressed and provided. In the PCC-based service, the compression rate or the amount of data may be adjusted according to the receiver performance or transmission environment.

In the case where point cloud data is configured in one slice, when the receiver performance or transmission environment changes, 1) a bitstream suitable for each environment may be transcoded and stored separately, and may be selected at the time of transmission, or 2) or the transcoding operation may be needed prior to transmission. In this case, if the number of receiver environments to be supported increases or the transmission environment frequently changes, issues related to the storage space or a delay resulting from transcoding may be raised.

FIG. 50 illustrates an example of efficient processing of a main region of point cloud data by a point cloud data transmission/reception device according to embodiments.

The point cloud data transmission method/device according to the embodiments, such as the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 47, the sub-bitstream classifier of FIG. 49, the encoder of FIGS. 55 and 56, the transmission method of FIG. 62, the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 48, the sub-bitstream classifier of FIG. 49, the decoder of FIGS. 55 and 56, the decoder/renderer of FIGS. 57 to 60, and the reception method of FIG. 63, may support efficient encoding/decoding of a main region based on ROI or encoding/decoding having different resolutions according to regions. To this end, the slice segment structure according to the embodiments may be used. Accordingly, the method/device according to the embodiments may provide effects such as spatial random access, ROI based region-wise data resolution, and increase in receiver efficiency.

For example, when the object that is the target of the point cloud data is a person, the head region of the person may be the region of interest, and the leg region may not be the region of interest. Data corresponding to the region of interest needs to have a high data resolution, and data not corresponding to the region of interest may have a low data resolution. Thereby, efficient data processing may be implemented.

The method/device according to the embodiments may support use cases requiring low latency or low complexity, such as live streaming or devices exhibiting low performance, through a layer-group structure and corresponding slice partitioning. For a device exhibiting low performance, decoding may be burdensome when the number of points or coding layers is large. In this case, a partial bitstream may be received and decoded using the scalable transmission enabled by slice partitioning. Thereby, required time and complexity may be reduced. However, the quality of the output point cloud data may be deteriorated because detailed layers are skipped.

In addition, if region-wise decoding may be performed by the decoder, complexity may be reduced while maintaining high quality in the region of interest (ROI). By changing the decoding depth according to the ROI, that is, by decoding the entire coding layers for the ROI and decoding fewer coding layers for the non-ROI, both low-performance and high-performance devices may effectively generate point cloud data. This may be a major use case for spatial random access applications that aim to provide direct access to the ROI in an efficient manner. Embodiments include a slice partitioning method for supporting layer-group structure-based spatial access.

Figure 51:
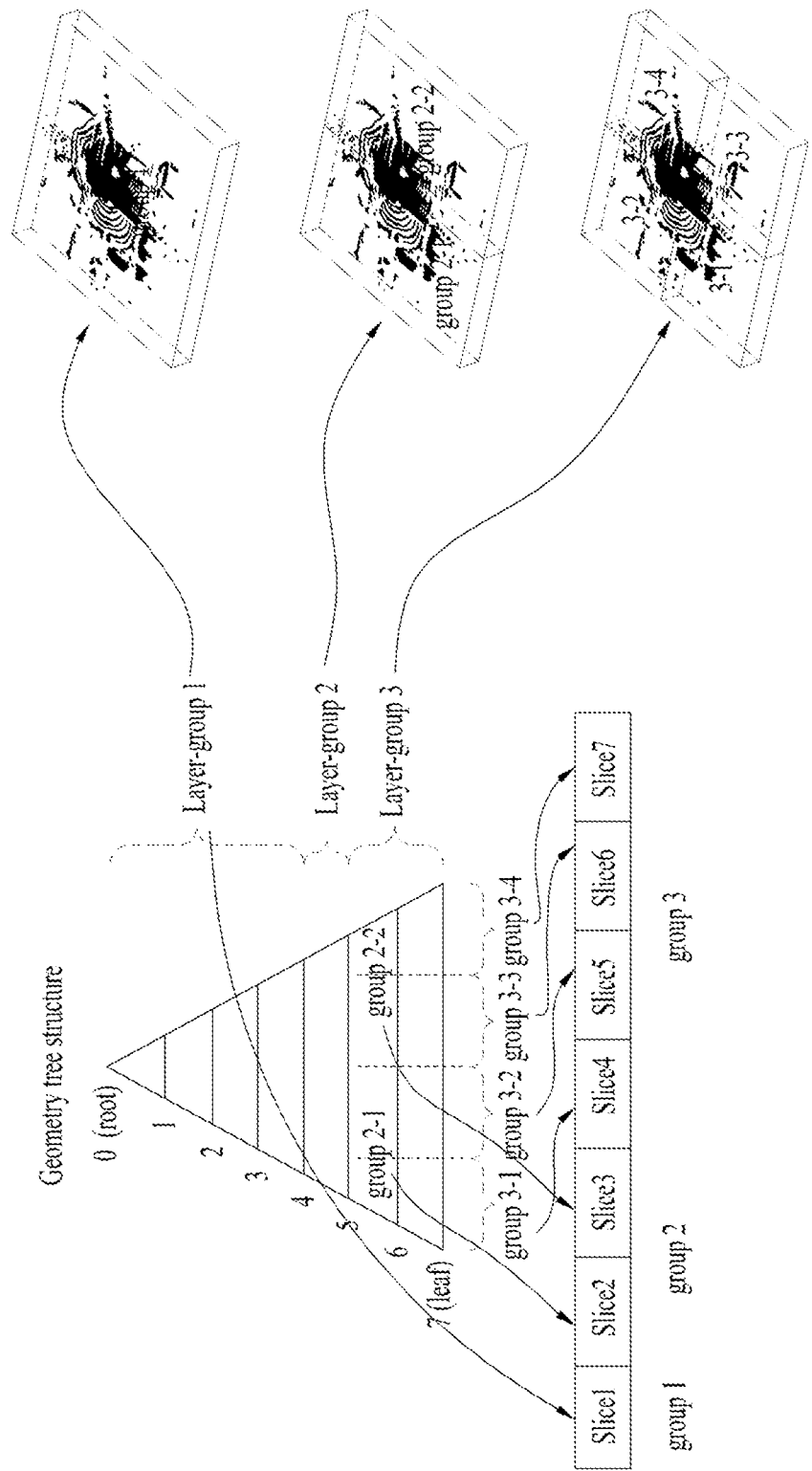
FIG. 51 shows a layer group structure and a subgroup bounding box according to embodiments.

FIG. 51 shows a layer group structure and a subgroup bounding box according to embodiments.

The point cloud data transmission method/device according to the embodiments, such as the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 47, the sub-bitstream classifier of FIG. 49, the encoder of FIGS. 55 and 56, the transmission method of FIG. 62, the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 48, the sub-bitstream classifier of FIG. 49, the decoder of FIGS. 55 and 56, the decoder/renderer of FIGS. 57 to 60, the reception method of FIG. 63, may apply slice segmentation in a layer group structure.

In this example, 8 coding layers are provided, and coding of a lower layer depends on the coded information (i.e. occupancy) of the previous layer. In generating slice segments, the coding layers are grouped into three different layer groups, and a set of layer groups is the same as the set of coding layers. Also, the last two layer groups are divided into several subgroups. Layer group 2 has two subgroups and layer group 3 has four subgroups. The layer groups or subgroups are contained in 7 different slice segments, respectively.

Through such slice partitioning, the point cloud data reception device according to the embodiments may select a slice required for an application program, thereby improving decoding and rendering efficiency. For example, when an application requires only data of subgroup 3-3, the receiver may select slice 6, which contains data for subgroup 3-3. In addition, considering the coding dependency between layers, preceding slices 1 and 3 for layer group 1 and subgroup 2-2 may be required. For the spatial access use case, it may be assumed that there is no dependency between subgroups of the same layer-group. Based on the slice partitioning, decoding complexity may be reduced due to fewer slices.

Subgroup Bounding Box According to Embodiments

Considering that the efficiency is obtained from slice selection before decoding, it is necessary to provide a description of the data of each slice in order to find a slice containing the target data. Embodiments propose that a signal be sent to a bounding box of data contained in a subgroup for the spatial access use case. FIG. 43 shows a subgroup bounding box proposed in each layer group. Considering the node size of each coding layer, the boundary of all layer groups is the same as the bounding box of a sequence or frame. In addition, it is assumed that subgroup division is performed within the boundary of the preceding subgroup. Thus, the bounding boxes of subgroups 2-1 and 2-2 are in the bounding box of layer group 1, and the bounding boxes of subgroups 3-1 and 3-2 and subgroups 3-3 and 3-4 may be in subgroups 2-1 and 2-2.

A subgroup bounding box for layer-group 1 may correspond to a frame and/or a bounding box.

For the lower layer-group, the upper subgroup bounding box may be divided. That is, the set of lower subgroup bounding boxes is the subgroup bounding box of the upper layer-group.

When a bounding box (group) of subgroup 3-1 is required, only box (group) 3-1, box (group) 2-1, and box (group) 1 may be decoded.

When there is a subgroup bounding box of each subgroup, spatial access may be performed by comparing the bounding box of each slice with the ROI, selecting a slice whose subgroup bounding box is correlated with the ROI, and then decoding the selected slice. For example, suppose the ROI is in subgroup 3-3. In this case, layer-group 1 and subgroups 2-2 and 3-3 may be selected by comparing the ROI with the subgroup bounding box. By decoding the corresponding slices 1, 3, and 6, efficient access to the ROI may be performed with high data resolution of subgroup 3-1 and low data resolution of other regions. For live streaming or low-latency usage, selection and decoding may be performed when receiving each slice segment.

The method/device according to the embodiments may signal subgroup bounding box information in a parameter set with a data unit header or layer_group_information to enable slice selection before decoding. Examples of the syntax of the above items are described below.

Information for slice selection according to embodiments may include not only a position range but also an attribute range, a normal vector range, and a type of attribute.

Signaling example according to embodiments: (Example of signaling information (FIGS. 53 to 55) included in the bitstream of FIG. 21)

According to an embodiment of the present disclosure, information on a separated slice may be defined in the parameter set as follows. It may be defined in a sequence parameter set, a geometry parameter set, an attribute parameter set, an SEI message, a geometry slice header, and an attribute slice header. Depending on the application and system, it may be defined in the corresponding or separate position to differently use the range and method to be applied. That is, a signal may have different meanings depending on the position where the signal is transmitted. When the signal is defined in the SPS, it may be equally applied to the entire sequence. When the signal is defined in the GPS, this may indicate that the signal is used for position reconstruction. When the signal is defined in the APS, this may indicate that the signal is applied to attribute reconstruction. When the signal is defined in the TPS, this may indicate that the signal is applied only to points within a tile. When the signal is delivered in a slice, this may indicate that the signal is applied only to the slice. In addition, the range and method to be applied may be defined in a corresponding position or a separate position depending on the application or system so as to be used differently. In addition, when the syntax elements defined below are applicable to multiple point cloud data streams as well as the current point cloud data stream, they may be carried in a superordinate parameter set.

While the embodiments define the information independently of the coding technique, the information may be defined in connection with the coding technique. In order to support regionally different scalability, the information may be defined in the tile parameter set. In addition, when syntax elements defined below are applicable not only to the current point cloud data stream but also to multiple point cloud data streams, they may be carried in a superordinate parameter set or the like.

Alternatively, a network abstract layer (NAL) unit may be defined and relevant information for selecting a layer, such as layer_id, may be delivered. Thereby, a bitstream may be selected at a system level.

Hereinafter, parameters (which may be referred to as metadata, signaling information, or the like) according to the embodiments may be generated in the process of the transmitter according to embodiments described below, and transmitted to the receiver according to the embodiments so as to be used in the reconstruction process.

For example, the parameters may be generated by a metadata processor (or metadata generator) of the transmission device according to the embodiments, which will be described later, and may be acquired by a metadata parser of the reception device according to the embodiments.

Slice segmentation in the layer group structure may be considered. In this example, there may be 8 coding layers where coding of lower layers is dependent on the coded information (e.g., occupancy) of the previous layers. In producing slice segments, the coding layers 3 different layer-groups, where the aggregation of the layer-groups may be equal to the set of coding layers. In addition, the second and third layer groups may be divided into multiple sub-groups. Layer group 2 may be divided into two subgroups, and layer group 3 may be divided into four subgroups. Each layer group or subgroup may be contained in a different slice segment.

Using the slice segments in the layer group structure, the receiver may generate different resolutions for respective regions through partial decoding. For example, one application that needs the data in subgroup 3-3 may be considered. In this case, the receiver may decode slice 6 but cannot decode slices 4, 5 and 7. Preceding slices are also needed due to ding dependency between layers. Based on the slice segmentation, the decoding complexity is reduced due to the small number of slices.

One of the important aspects of using slice segmentation in a spatial access use case is how the receiver finds the slices it needs for the ROI. In the present disclosure, it is necessary to provide description of the distribution of data in slices using subgroup bounding boxes. The proposed subgroup bounding boxes in each layer-group is illustrated. Considering the node size of each coding layer, the boundary of all layer-groups is identical to the bounding box of the sequence or the frame. Also, it is assumed that the subgroup division is performed within the boundary of the preceding subgroups. Therefore, the bounding box of subgroup 2-1 and 2-2 are in the bounding box of layer-group 1, and subgroup 3-1 and 3-2 and subgroup 3-3 and 3-4 are in the boundary of the subgroup 2-1 and 2-2, respectively.

When a subgroup bounding box is given, the spatial access may be performed by comparing the bounding box of each slice with ROI, selecting slices whose subgroup bounding box is correlated with ROI, and then decoding the selected slices. In this example, slices 1, 3 and 6 are selected because the ROI is in the subgroup bounding boxes of layer group 1 and subgroups 2-2 and 3-3, respectively. By decoding the selected slices, an output point cloud representing high data resolution for the ROI and low data resolution for other regions is generated. It is assumed that there is no dependency between subgroups in the same layer-group for effective spatial access. In the live streaming or low-latency use cases, selection and decoding may be performed when each slice segment is received, which may increase time efficiency.

FIG. 52 shows a geometry parameter set according to embodiments.

FIG. 53 shows an attribute parameter set according to embodiments.

The parameters in FIGS. 52 and 53 are generated and delivered in the bitstream of FIG. 21 by the encoder according to the embodiments of FIG. 1 and the like, and are parsed by the decoder according to the embodiments of FIG. 1 and the like.

num_layer_groups_minus1 plus 1 specifies the number of layer groups where the layer group represents a group of consecutive tree layers that are part of the geometry (or attribute) coding tree structure. num_layer_groups_minus1 may be in the range of 0 to the number of coding tree layers.

layer_group_id specifies the layer_group_identifier of the i-th geometry or attribute layer group.

num_tree_depth_minus1 plus 1 specifies the number of tree depth contained in the i-th layer-group. The total number of tree depth may be derived by adding all (num_tree_depth_minus1[i]+1) for i equal to 0 to num_layer_groups_minus1.

num_subgroups_minus1 plus 1 specifies the number of sub-groups in the i-th layer group.

subgroup_id specifies the indicator of the j-th subgroup of the i-th layer group indicated by layer_group_id.

subgroup_bbox_origin specifies the origin of the subgroup bounding box of the j-th subgroup of the i-th layer group. It may have a value close to the xyz origin among the 8 vertices of the bounding box.

subgroup_bbox_size specifies the size of the subgroup bounding box of the j-th subgroup of the i-th layer-group. It may have the distance from the bounding box origin to the maximum value along each axis. The unit indicating the origin and size may be represented based on the leaf node size. If another representation unit is used, it may be signaled.

aligned_layer_group_structure_flag equal to 1 specifies that the layer-group and subgroup structure of the attribute slices is identical to the geometry layer-group and subgroup structure. aligned_layer_group_structure_flag equal to 0 specifies that the layer-group and subgroup structure of the attribute slices may not be identical to the geometry layer-group and subgroup structure.

geom_parameter_set_id specifies the geometry parameter set identifier that contains the layer-group and subgroup structure information that is aligned with the attribute layer-group structure.

Number of child_subgroups (num_child_subgroups_minus1): Indicates the number of subgroups in the j-th subgroup of the i-th layer group.

child_subgroup_id specifies the identifier for the child_subgroup of the j-th subgroup of the i-th layer-group.

FIG. 54 shows a geometry data unit header and an attribute data unit header according to embodiments.

FIG. 54 shows parameter information included in the bitstream of FIG. 21.

For the parameters included in FIG. 54, refer to the description of FIGS. 52 and 53.

Referring to FIG. 15, the point cloud data transmission device according to the embodiments may provide the following effects.

For point cloud data, the transmission device may divide and transmit compressed data according to a criterion according to embodiments. For example, when layered coding is used, the compressed data may be divided and transmitted according to layers. In this case, the storage and transmission efficiency on the transmitting side may be increased.

FIG. 15 illustrates an embodiment in which the geometry and attributes of the point cloud data are compressed and provided. In the PCC-based service, the compression rate or the amount of data may be adjusted according to the receiver performance or transmission environment. In the case where point cloud data is bundled in one slice as in conventional cases, when the receiver performance or transmission environment changes, 1) a bitstream suitable for each environment may be transcoded and stored separately, and may be selected at the time of transmission, or 2) or the transcoding operation may be needed prior to transmission. In this case, if the number of receiver environments to be supported increases or the transmission environment frequently changes, issues related to the storage space or a delay resulting from transcoding may be raised.

FIG. 55 illustrates a method for transmitting and receiving point cloud data according to embodiments.

The point cloud data transmission method/device according to the embodiments, such as the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 47, the sub-bitstream classifier of FIG. 49, the encoder of FIGS. 55 and 56, the transmission method of FIG. 62, the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 48, the sub-bitstream classifier of FIG. 49, the decoder of FIGS. 55 and 56, the decoder/renderer of FIGS. 57 to 60, and the reception method of FIG. 63, may divide and transmit/receive point cloud data as shown in FIG. 55. Each component in FIG. 55 may correspond to hardware, software, a processor, and/or a combination thereof.

When the compressed data is divided and transmitted according to layers according to the embodiments, only a necessary part of the pre-compressed data may be selectively transmitted in the bitstream stage without a separate transcoding process. This scheme may be efficient in terms of storage space as only one storage space per stream is required. It also enables efficient transmission in terms of (bitstream selector) bandwidth because only the necessary layers are selected before transmission.

The point cloud data reception method/device according to the embodiments may provide the following effects.

FIG. 56 illustrates a method for transmitting and receiving point cloud data according to embodiments.

The point cloud data transmission method/device according to the embodiments, such as the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 47, the sub-bitstream classifier of FIG. 49, the encoder of FIGS. 55 and 56, the transmission method of FIG. 62, the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 48, the sub-bitstream classifier of FIG. 49, the decoder of FIGS. 55 and 56, the decoder/renderer of FIGS. 57 to 60, and the reception method of FIG. 63, may divide and transmit/receive point cloud data as shown in FIG. 56. Each component in FIG. 56 may correspond to hardware, software, a processor, and/or a combination thereof.

Embodiments include a method of dividing and transmitting compressed data according to a specific criterion for point cloud data. When layered coding is used, the compressed data may be divided and transmitted according to layers. In this case, the efficiency of the receiving side may be increased.

FIG. 56 illustrates the operations at the transmitting and receiving sides in the case of transmission of point cloud data composed of layers. In this case, when information for reconstructing the entire PCC data is delivered regardless of the receiver performance, the receiver needs to reconstruct the point cloud data through decoding and then select only data corresponding to a required layer (data selection or sub-sampling). In this case, since the transmitted bitstream is already decoded, a delay may occur in the receiver aiming at low latency or decoding may fail depending on the receiver performance.

According to embodiments, when a bitstream is divided into slices and delivered, the receiver may selectively deliver the bitstream to the decoder according to the density of point cloud data to be represented according to decoder performance or an application field. In this case, since selection is made before decoding, decoder efficiency may be increased, and decoders of various performances may be supported.

Accordingly, the method/device for transmitting and receiving point cloud data according to the embodiments may provide an efficient spatial random access to point cloud data based on the proposed operations and signaling schemes.

The method/device according to the embodiments may encode and decode point cloud data based on a layer-group based partition structure for large point cloud coding with low delay.

In particular, it may provide a compression structure for efficient storage and transmission of large point cloud data that is distributed wide and has a high density of points.

In addition, in the case of a large point cloud that is distributed wide and has a high density of points, a delay issue may be raised because there are many bitstreams that need to be processed to access a region of interest. The method/device according to the embodiments may address this delay issue.

For a hierarchical point cloud structure for compression of large point cloud data with low delay according to embodiments, a tile/brick/slice layer-group/slice subgroup, tile/slice layer-group/slice subgroup, slice layer-group/slice subgroup, or layer-group bbox→subgroup bbox relationship may be used.

FIG. 57 illustrates an efficient region-of-interest processing process according to embodiments.

The point cloud data transmission method/device according to the embodiments, such as the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 47, the sub-bitstream classifier of FIG. 49, the encoder of FIGS. 55 and 56, and the transmission method of FIG. 62, may support ROI processing as shown in FIG. 57. Also, the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 48, the sub-bitstream classifier of FIG. 49, the decoder of FIGS. 55 and 56, the decoder/renderer of FIGS. 57 to 60, the reception method of FIG. 63, and the like may support ROI processing as shown in FIG. 57.

The method/device according to the embodiments transmits the point cloud data based on a tile and slice structure. In the case of large data, which may contain multiple tiles, to access an ROI (circled region) 5700, a specific tile may be selected. Then, one of the slices included in the tile may be selected, and the entire point cloud data in the selected slice may be decoded. Thereafter, some regions may be obtained through rendering. In this case, since the volume of data contained in the tile and slice is large, it takes a lot of time to acquire the ROI.

The tile selector may receive a point cloud bitstream. The tile selector may select a tile bounding box based on the ROI.

The slice/brick selector may select a slice and/or brick bounding box based on the ROI.

The decoder may decode the selected slice and/or brick.

The renderer may render the point cloud data based on the ROI, and efficiently provide the point cloud data to the user in part.

For example, the entire point cloud data 5701 may include one or more tiles (tile bounding boxes) 5702.

The tile 5702 may be configured as a set of slices (which may be referred to as data units and/or bricks) 5703.

Slices and/or bricks may be represented as a tree structure extending through a hierarchical structure (layers, depths, and levels).

The reception method/device according to the embodiments may quickly decode a certain ROI 5704 of the point cloud data.

The time required for selection and decoding until the ROI 5704 is obtained by receiving the entire point cloud data 5802 may be more effectively reduced.

Figure 58:
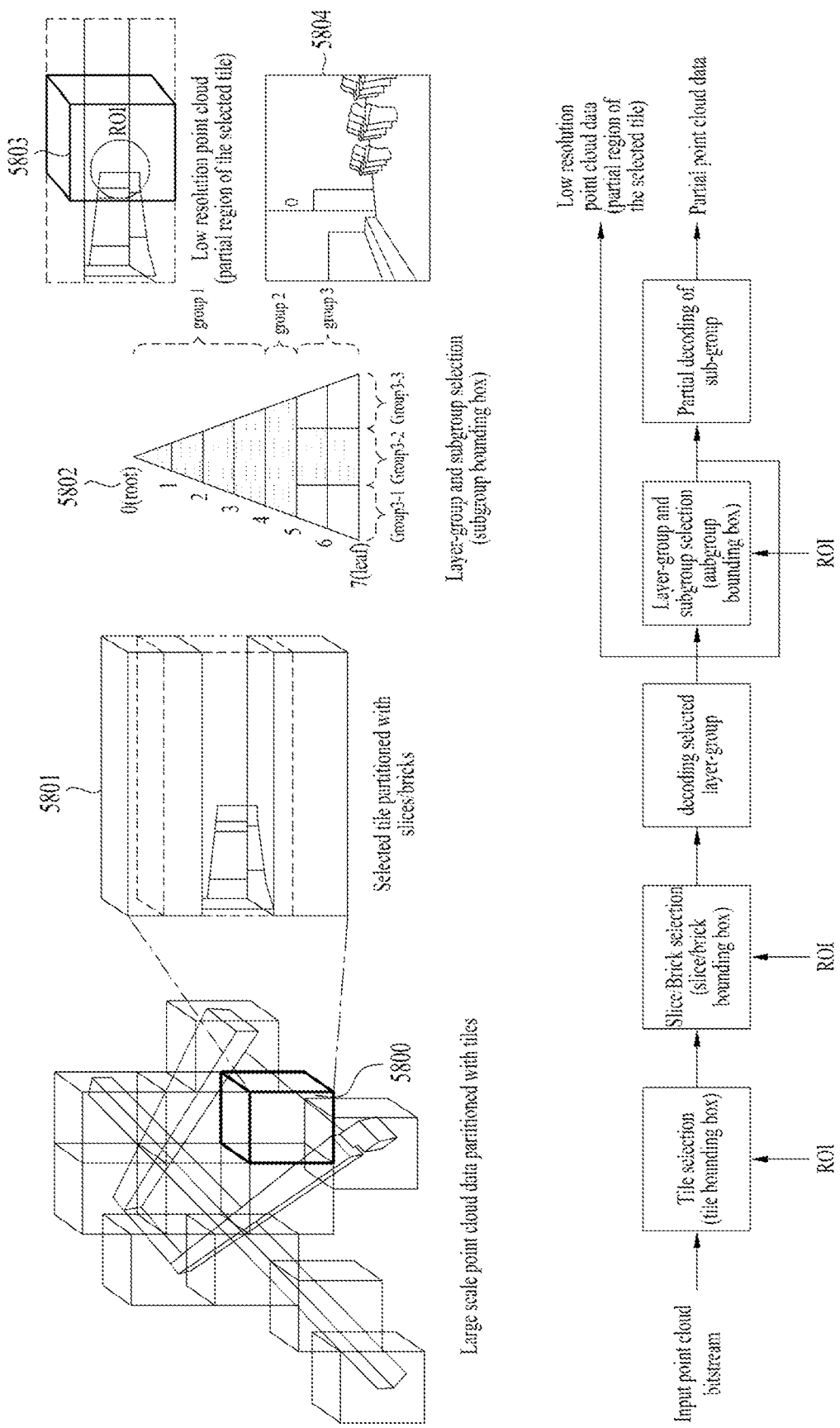
FIG. 58 illustrates an efficient region-of-interest processing process according to embodiments.

FIG. 58 illustrates an efficient region-of-interest processing process according to embodiments.

FIG. 58 illustrates an efficient ROI processing process like FIG. 57.

When the compression/reconstruction operation is performed based on the layer-group and subgroup structure of the point cloud data according to the embodiments, the delay factor may be reduced by selecting a tile/slice and then selecting only a subgroup related to the ROI among the data in the selected slice as shown in FIG. 58. In this case, the intermediate result of the upper layer-group may be used as low resolution point cloud data.

For example, the method/device according to the embodiments may quickly process the entire point cloud data 5800 based on an ROI 5801. The ROI 5801 may be a partial region of the entire point cloud data 5800. The ROI 5801 may include tile(s) partitioned into slices and/or bricks. The ROI 5801 may be represented as a layer group and subgroup structure 5802 for efficient processing. Layer group 1 may include the root node to depth (level) 4 (4 layers), layer group 2 may include depths (levels) 5 and 6, and layer group 3 may include the leaf node. The leaf node may include subgroups 3-1, 3-2, and 3-3. The number of layers and subgroups included in a group may vary according to embodiments, and FIG. 58 shows one example. The method/device according to the embodiments may select a layer group and a subgroup and process a subgroup bounding box for an ROI. As the depth (level) of the tree structure 5802 is closer to the root node, the point cloud data may increasingly correspond to a low-resolution point cloud 5803. A group including low-resolution point cloud data may represent a partial region of the selected tile. A subgroup may correspond to an ROI.

The method/device according to the embodiments may receive a point cloud data bitstream 5800 through a tile selector, and select a tile for partial decoding based on a tile bounding box and an ROI.

The slice/brick selector may select a slice and a brick based on a bounding box corresponding to the slice and brick.

The decoder may decode the selected layer group. The decoder may output the low resolution point cloud data 5803. The low resolution point cloud data 5803 represents a partial region of the selected tile.

The layer-group and subgroup selector may select a subgroup bounding box 5804.

That is, the method/device according to the embodiments may provide partial data 5804 and the entire data 5803 including the partial data together. The low resolution data may serve as map data for the ROI. The method/device may efficiently provide the partial data 5804 of the ROI with reference to the low resolution map data 5803. The low resolution data 5803 may serve as overview data.

Figure 59:
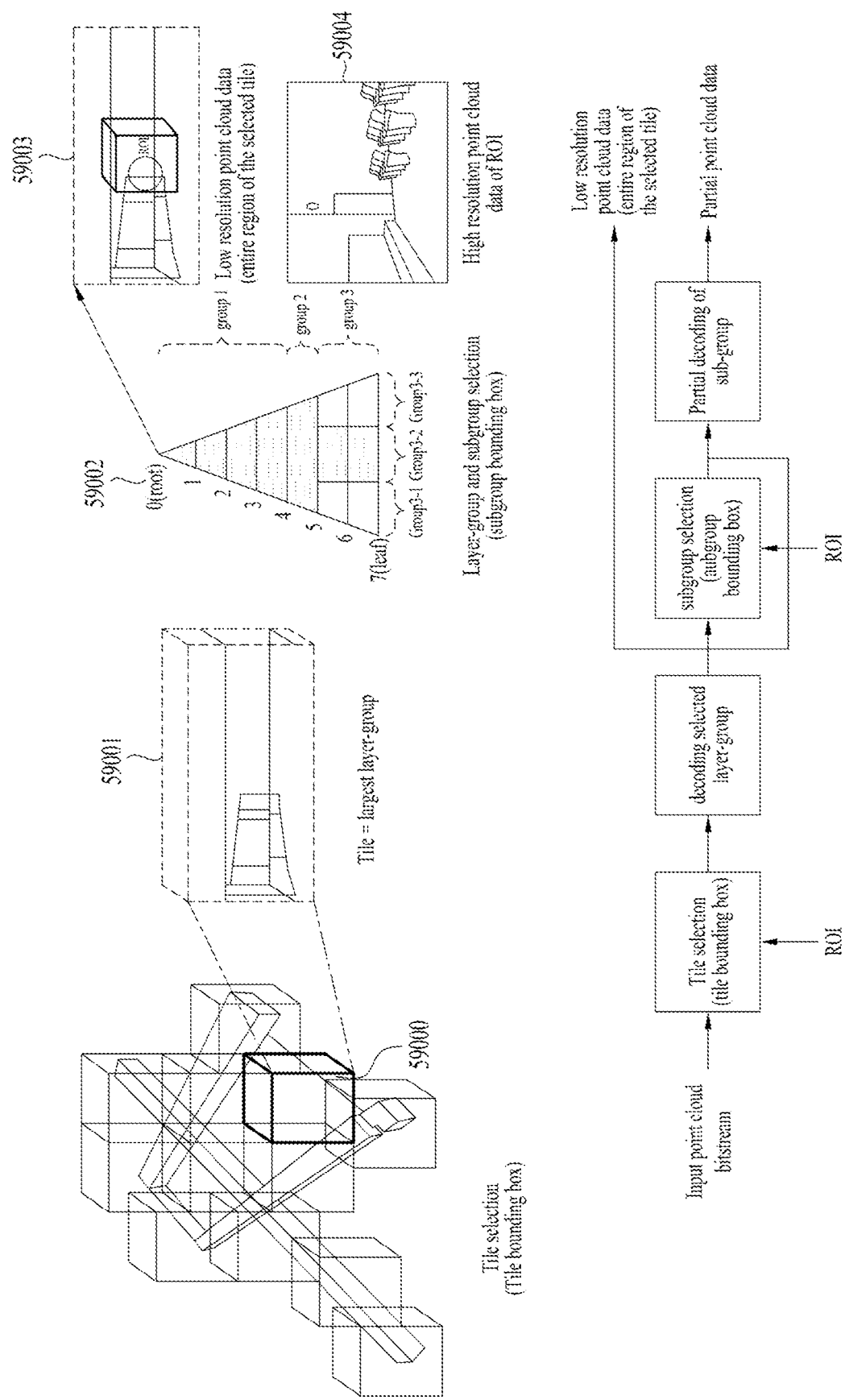
FIG. 59 illustrates an efficient region-of-interest processing process according to embodiments.

FIG. 59 illustrates an efficient region-of-interest processing process according to embodiments.

As in the case of FIG. 58, the method/device according to the embodiments may process and provide low resolution entire data and partial data together.

The method/device according to the embodiments may compress/reconstruct a tile based on a layer-group and/or subgroup structure. In this case, the result of decoding the upper layer-group may be low resolution point cloud data for the entire region belonging to the tile, and when even a subgroup related to the ROI is decoded, high resolution point cloud data for the ROI may be acquired. In this case, since the tile is directly decoded, the slice selection may be omitted. When the ROI is in the tile, the ROI may be switched without delay by additionally decoding the subgroup data while having the decoding information about the layer-group.

The method/device according to the embodiments may select a tile 59000 for a tile bounding box.

Tile 59000 may correspond to the largest layer-group 59001.

In a hierarchical tree structure 59002 including layer-groups and sub-groups, the method/device according to the embodiments may provide low resolution point cloud data 59003 corresponding to the entire region of the selected tile and high resolution point cloud data of an ROI together. The entire region may be quickly checked in low resolution, and the ROI may be quickly provided in high resolution.

The tile selector may select a tile related to the ROI in an input point cloud data bitstream based on the ROI.

The decoder may decode the selected layer-group. The decoder may output low resolution point cloud data for the entire region of the selected tile.

The subgroup selector may select a subgroup bounding box based on the ROI.

The subgroup partial decoder may output partial point cloud data for the selected subgroup.

FIG. 60 illustrates an efficient region-of-interest processing process according to embodiments.

As in the cases of FIGS. 58 to 59, the method/device according to the embodiments may process and provide low resolution entire data and partial data together.

The method/device according to the embodiments may compress the input image in a layer-group structure. In this case, spatial random access to each region may be efficiently supported by densely dividing layer-groups and subgroups. First, information in the form of overview/thumbnail about the entire data may be provided to the user through the result of the upper layer-group, and may be used for navigation of the entire data. When the user wants higher-resolution information, layer-group or subgroup data related to an ROI may be additionally decoded. Low-resolution information about a wide region related to the ROI may be provided through the intermediate process of additional decoding, and high-resolution local information about the ROI may be provided through additional subgroup decoding. In this case, the layer structure of layer-groups may replace the existing tile/brick/slice structure, and progressively provide specific information of high resolution from the entire information of low resolution according to the user's interest. In terms of decoding, the function of progressive decoding may be provided by decoding only as much information as necessary at a requested time, rather than decoding the entire data. Also, as resources required for decoding are reduced, a low-delay effect may be obtained. In addition, even in an environment in which the ROI is constantly changing, the delay according to the change in ROI may be reduced by using the information of the upper layer.

For example, the method/device according to the embodiments may represent all input point cloud data 6000 in a tree structure 6001. The tree structure 6001 may be composed of layer groups and subgroups, and enable layer-based access to ROI part data. A layer group and a subgroup may be selected based on a subgroup bounding box. A layer group 6002 including the highest layer(s) may correspond to point cloud data having a very low resolution, and represent information about the entire area of the content for navigating the content of the point cloud data. A sub-layer group belonging to a layer group or a subgroup 6003 of the layer group may represent a partial area of input content and correspond to point cloud data of low resolution. A subgroup 6001 of the sub-layer group may correspond to high-resolution point cloud data of the ROI. Both the entire area and the ROI area may be represented by the relationship between layers, the range of an area, various resolution settings, and the like. A low-resolution overview image of a wide area for high-resolution ROI data may also be provided.

The decoder may receive point cloud data and decode the point cloud data based on the layer groups. The decoder may output data for the entire area of the content at a low resolution. The decoder may output data about a partial area of the content at a low resolution.

The subgroup selector may select a subgroup based on the ROI.

The decoder may partially decode the selected subgroup and output partial point cloud data.

FIG. 61 shows layer_group_information according to embodiments.

the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 47, the sub-bitstream classifier of FIG. 49, the encoder of FIGS. 55 and 56, and the transmission method of FIG. 62, which correspond to the point cloud data transmission method/device according to the embodiments, may encode the point cloud data as shown in FIG. 21, generate related signaling information as in FIG. 61, and generate and transmit a bitstream.

the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 48, the sub-bitstream classifier of FIG. 49, the decoder of FIGS. 55 and 56, the decoder/renderer of FIGS. 57 to 60, and the reception method of FIG. 63, which correspond to the point cloud data reception method/device according to the embodiments may receive the bitstream as shown in FIG. 21 and reconstruct the point cloud data based on the signaling information shown in FIG. 61.

Each layer-group and subgroup may be divided and transmitted on a slice basis. In order to deliver the characteristics of each layer-group and subgroup to the receiver, layer_group_info may be defined as follows. layer_group_info may be transmitted in the bitstream of FIG. 45. The bitstream may include the hierarchical structure of layer-groups and subgroups, id, the number of points included, the position and range of the included area, the number of coding layers, interdependence, coding constraints (whether to reference the periphery, whether to use the context), referenced slice and frame information. The following is an example of layer_group_info included on the basis of a data unit. layer_group_info may be included on the basis of a parameter set, a frame, a sequence, a tile, a slice, or a point unit, or a separate layer-group unit may be defined and delivered.

layer_group_enabled_flag equal to 1 specifies that the geometry bitstream of a frame or a tile is contained in multiple slices which is matched to a group of coding layers or a subgroup thereof. layer_group_enabled_flag equal to 0 specifies that the geometry bitstream of a frame or a tile is contained in a single slice.

num_layer_groups_minus1 plus 1 specifies the number of layer-groups which represent groups of consecutive tree layers that are part of the geometry coding tree structure. num_layer_groups_minus1 may be in the range of 0 to the number of coding tree layers.

layer_group_id specifies the indicator of a layer-group of a frame or a tile. layer_group_id may be in the range of 0 to num_layer_groups_minus1.

dependent_slice_flag equal to 1 specifies that the slice is dependent on the slice which is indicated by ref_slice_id and ref_layer_group_id. dependent_slice_flag equal to 0 specifies that the slice is not dependent on the other slices and may be a start of the decoding of related slices.

ref_slice_id specifies the indicator of the reference slice. ref_slice_id may be in the range of slice_id used for the current frame or the current tile.

ref_layer_group_id specifies the indicator of the reference layer-group. ref_layer_group_id may be in the range of 0 to num_layer_group_minus1 of the current frame or the current tile.

num_layers_minus1 plus 1 specifies the number of coding layers contained in the i-th layer-group. The total number of layer-groups may be derived by adding all (num_layers_minus1[i]+1) for i equal to 0 to num_layer_groups_minus1.

layer_group_stream_len_bits plus 1 is the length in bits of the syntax element layer_group_stream_len.

layer_group_stream_len specifies the length of the current layer_group_stream.

subgroup_enabled_flag equal to 1 specifies the current layer-group consist of subgroups which may be contained in multiple slices. subgroup_enabled_flag equal to 0 specifies that the current layer-group is contained in a single slice. The subgroups are mutually exclusive and the sum of subgroups is identical to the layer-group.

num_subgroups_minus1 plus 1 specifies the number of sub-groups in the layer group indicated by layer_group_id.

subgroup_id specifies the indicator of the subgroup of the layer group indicated by layer_group_id. subgroup_id may be in the range of 0 to num_subgroups_minus1 [layer_group_id]. Here, subgroup_id may represent the order of the slices in the same layer_group_id. When not present, subgroup_id is inferred to be 0.

ref_subgroup_id specifies the indicator of the reference subgroup of the layer-group indicated by ref_layer_group_id. ref_subgroup_id may be in the range of 0 to num_subgroup_id_minus1 of the current layer-group. When not present, subgroup_id is inferred to be 0.

num_points_bits_minus1 plus 1 is the length in bits of the syntax elements num_points.

num_points specifies the number of output point by decoding the current slice.

subgroup_bbox_origin_bits_minus1 plus 1 is the length in bits of the syntax elements subgroup_bbox_origin.

subgroup_bbox_origin specifies the origin of the subgroup bounding box of the subgroup indicated by subgroup_id of the layer-group indicated by layer_group_id.

subgroup_bbox_size_bits_minus1 plus 1 is the length in bits of the syntax elements subgroup_bbox_size.

subgroup_bbox_size specifies the origin of the subgroup bounding box of the subgroup indicated by subgroup_id of the layer-group indicated by layer_group_id.

num_skipped_layer_groups specifies the number of skipped_layer_groups in the current frame or tile: num_encoded_layer_group=num_delivered_layer_group+num_skipped_layer_group.

num_skipped_layers specifies the number of skipped geometry coding layers in the current frame or tile: num_encoded_layers=num_delivered_layers+num_skipped_layers.

Accordingly, the method/device according to the embodiments may provide the effects described with reference to FIGS. 15, 56 and 57.

FIG. 62 illustrates a method for transmitting point cloud data according to embodiments.

S6200: The method for transmitting point cloud data according to the embodiments may include encoding point cloud data.

The encoding according to the embodiments may include the operations of the transmission device 10000 of FIG. 1, the point cloud video encoder 10002 of FIG. 1, encoding 20001 of FIG. 2, the encoder of FIG. 4, the transmission device of FIG. 12, the XR device 1430 of FIG. 14, the encoder of FIG. 15, the encoding of FIGS. 16 to 20, the bitstream generation of FIG. 21, the encoding and generation of related information according to FIGS. 26 to 40, 37 to 38, 45, 46, 52 to 54, and 61, the generation of a sub-bitstream structure according to FIG. 47, the ROI processing of FIGS. 50 and 51, and the encoder of FIGS. 55 and 56.

S6201: The method for transmitting point cloud data according to the embodiments may further include transmitting a bitstream including the point cloud data.

The transmission operation according to the embodiments may include the operations of the transmission device 10000 of FIG. 1, the transmitter 10003 of FIG. 1, the transmission 20002 of FIG. 2, the transmission device of FIG. 12, the XR device 1430 of FIG. 14, the encoder of FIG. 15, and the encoder of FIGS. 55 and 56.

FIG. 63 illustrates a method for receiving point cloud data according to embodiments.

S6300: The method for receiving point cloud data according to the embodiments may include receiving a bitstream including point cloud data.

The reception operation according to the embodiments may include the operations of the reception device 10004 of FIG. 1, the receiver 10005 of FIG., the reception according to the transmission 20002 of FIG. 2, the reception device of FIG. 13, the XR device 1430 of FIG. 14, the decoder of FIG. 15, and the decoder of FIGS. 55 and 56.

S6301: The method for receiving point cloud data according to the embodiments may further include decoding the point cloud data.

The decoding according to the embodiments may include the operations of the point cloud video decoder 10006 of FIG. 1, the decoding 20003 of FIG. 2, the decoder of FIGS. 10 and 11, the reception device of FIG. 13, the XR device 1430 of FIG. 15, the decoding according to FIGS. 16 to 20, the decoding based on FIGS. 21 to 25, 29 to 30, 37 to 38, 45 to 46, 52 to 54, and 61, the decoding according to FIGS. 26 to 40, the sub-bitstream structure based decoding of FIGS. 48 and 49, the ROI based decoding of FIGS. 50 and 51, the decoder of FIGS. 55 and 56, and the ROI decoding/rendering of FIGS. 57 to 60.

Referring to FIG. 1, a method for transmitting point cloud data according to embodiments may include encoding point cloud data; and transmitting a bitstream including the point cloud data.

Referring to FIGS. 39A and 39B, embodiments may support partial decoding based on a layer group structure. For example, the bitstream may include one or more units containing the point cloud data. The one or more units may include a group configured by grouping based on a layer of the point cloud data. The unit is a unit for encoding/decoding point cloud data, such as a slice and a data unit, and is used as a unit in which the point cloud data is included in the bitstream.

Referring to FIG. 40, regarding a layer group and/or subgroup (subgroup bounding box) according to embodiments, the group may include one or more layers containing the point cloud data. The group may include one or more subgroups, and the bitstream may include units including the subgroups. A group may be referred to as a layer group or the like.

Referring to FIG. 40, regarding the relationship between a group and a subgroup, the point cloud data may include layers from a layer for a root level to a layer for a leaf level. The layer for the root level may be included in a first group (layer group 1), and the point cloud data of the layer for the leaf level may be divided into subgroups. The bounding box for the first group may include bounding boxes for subgroups.

Referring to FIG. 45, regarding the geometry data unit header, the bitstream includes signaling information (which may be referred to as metadata, parameters, or the like) about the point cloud data included in the unit. The signaling information may include information about the number of groups of layers related to the point cloud data, ID information about the groups, and subgroup information about the groups.

Referring to FIG. 46, regarding the skip layer signaling information, the bitstream may further include information about the number of skipped groups and information about the number of skipped layers.

Referring to FIG. 59, regarding tile (and/or slice/brick)-based group generation and provision of an overview/ROI, the bitstream may groups including one or more layers including the point cloud data based on a tile. A first group of the groups may contain low-resolution point cloud data for an entire region of the tile, and a subgroup of a second group of the groups includes high-resolution point cloud data related to a region of interest of the tile. The first group and the second group may be interpreted as terms referring to specific groups among the groups.

Referring to FIG. 60, regarding generation of the entire image group and provision of an overview/ROI, the bitstream may include one or more groups including one or more layers containing the point cloud data. A first group of the groups may contain an entire region of the point cloud data of a low resolution, and a subgroup of a second group of the groups may contain a region of interest of the point cloud data of a high resolution.

A device for transmitting point cloud data according to embodiments corresponding to the transmission method may include an encoder configured to encode point cloud data, and a transmitter configured to transmit a bitstream including the point cloud data.

A method for receiving point cloud data according to embodiments corresponding to the transmission method may include receiving a bitstream including point cloud data, and decoding the point cloud data.

The received bitstream may include one or more units containing the point cloud data. The one or more units may include a group configured by grouping based on a layer of the point cloud data. With the reception method, partial decoding of the point cloud data, which is based on the layer structure included in the bitstream, may be efficiently performed.

The group may include one or more layers containing the point cloud data. The group may include one or more subgroups, and the bitstream may contain units including the subgroups. Accordingly, with the reception method, partial decoding of the point cloud data may be efficiently performed.

The point cloud data may include a layer for a root level to a layer for a leaf level. The layer for the root level may be included in a first group, and the point cloud data of the layer for the leaf level may be segmented into subgroups. A bounding box for the first group may include bounding boxes for the subgroups. Accordingly, with the reception method, partial decoding of the point cloud data may be efficiently performed.

The bitstream may include the point cloud data based on one or more layers, the one or more layers being included in grouped groups. The point cloud data may be partially decoded based on the groups and a subgroup related to the groups.

Accordingly, by configuring the bitstream for each layer, the receiver is allowed to perform selective decoding and may selectively decode a main region. Also, partial access may be enabled based on a subgroup, which identifies a layer group, and signaling information about the subgroup. In addition, the receiver may efficiently provide an ROI by acquiring an overview for the ROI.

The embodiments have been described in terms of a method and/or a device, and the description of the method and the description of the device may be applied complementary to each other.

Although the accompanying drawings have been described separately for simplicity, it is possible to design new embodiments by combining the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In the present disclosure, "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to perform the related operation or interpret the related definition according to a specific condition when the specific condition is satisfied.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related details have been described in the best mode for carrying out the embodiments.

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

What is claimed is:

1. A method of encoding point cloud data, the method comprising:
    encoding geometry data of point cloud data based on a layer group of one or more layers including one or more depths of an octree;
    encoding attribute data of the point cloud data based on the layer group; and
    transmitting a bitstream including the point cloud data,
    wherein the bitstream includes information for representing a number of layer groups, information for representing an identifier of a layer group, information for representing whether the layer group includes one or more subgroup, and information for representing a bounding box for a subgroup, and
    wherein a number of missing layers of a subgroup is acquired based on information in the bitstream.

2. The method of claim 1, wherein the bitstream includes one or more units containing the point cloud data,
    wherein the one or more units comprise a group configured by grouping based on a layer of the point cloud data.

3. The method of claim 2, wherein the group comprises one or more layers containing the point cloud data,
    wherein the group comprises one or more subgroups, and
    wherein the bitstream contains units including the subgroups.

4. The method of claim 3, wherein the point cloud data includes a layer for a root level to a layer for a leaf level,
    wherein the layer for the root level is included in a first group,
    wherein the point cloud data of the layer for the leaf level is segmented into subgroups, and
    wherein a bounding box for the first group includes bounding boxes for the subgroups.

5. The method of claim 1, wherein the bitstream includes groups including one or more layers containing the point cloud data based on a tile,
    wherein a first group of the groups contains low-resolution point cloud data for an entire region of the tile, and
    wherein a subgroup of a second group of the groups includes high-resolution point cloud data related to a region of interest of the tile.

6. The method of claim 1, wherein the bitstream includes one or more groups including one or more layers containing the point cloud data,
    wherein a first group of the groups contains an entire region of the point cloud data of a low resolution, and
    wherein a subgroup of a second group of the groups contains a region of interest of the point cloud data of a high resolution.

7. A device of encoding point cloud data, comprising:
    a memory; and
    at least one processor connected to the memory, the at least one processor is configured to:
    encode geometry data of point cloud data based on a layer group of one or more layers including one or more depths of an octree;
    encode attribute data of the point cloud data based on the layer group; and
    transmit a bitstream including the point cloud data,
    wherein the bitstream includes information for representing a number of layer groups, information for representing an identifier of a layer group, information for representing whether the layer group includes one or more subgroup, and information for representing a bounding box for a subgroup, and
    wherein a number of missing layers of a subgroup is acquired based on information in the bitstream.

8. A method of decoding point cloud data, the method comprising:
    receiving a bitstream including point cloud data;
    decoding geometry data of the point cloud data based on a layer group of one or more layers including one or more depths of an octree; and
    decoding attribute data of the point cloud data based on the layer group,
    wherein the bitstream includes information for representing a number of layer groups, information for representing an identifier of a layer group, information for representing whether the layer group includes one or more subgroup, and information for representing a bounding box for a subgroup, and wherein a number of missing layers of a subgroup is acquired based on information in the bitstream.

9. The method of claim 8, wherein the bitstream includes one or more units containing the point cloud data,
wherein the one or more units comprise a group configured by grouping based on a layer of the point cloud data.

10. The method of claim 9, wherein the group comprises one or more layers containing the point cloud data,
wherein the group comprises one or more subgroups, and
wherein the bitstream contains units including the subgroups.

11. The method of claim 10, wherein the point cloud data includes a layer for a root level to a layer for a leaf level,
wherein the layer for the root level is included in a first group,
wherein the point cloud data of the layer for the leaf level is segmented into subgroups, and
wherein a bounding box for the first group includes bounding boxes for the subgroups.

12. The method of claim 8, wherein the bitstream includes the point cloud data based on one or more layers, the one or more layers being included in grouped groups;
wherein the point cloud data is partially decoded based on the groups and a subgroup related to the groups.

13. A device of decoding point cloud data, comprising:
a memory; and
at least one processor connected to the memory, the at least one processor is configured to:
receive a bitstream including point cloud data;
decode geometry data of the point cloud data based on a layer group of one or more layers including one or more depths of an octree; and
decode attribute data of the point cloud data based on the layer group,
wherein the bitstream includes information for representing a number of layer groups, information for representing an identifier of a layer group, information for representing whether the layer group includes one or more subgroup, and information for representing a bounding box for a subgroup,
wherein a number of missing layers of a subgroup is acquired based on information in the bitstream.

* * * * *